US012420393B2

(12) United States Patent
Leimbach et al.

(10) Patent No.: US 12,420,393 B2
(45) **Date of Patent: *Sep. 23, 2025**

(54) FASTENER DRIVING TOOL USING A GAS SPRING

(71) Applicant: Kyocera Senco Industrial Tools, Inc., Cincinnati, OH (US)

(72) Inventors: Richard L. Leimbach, Cincinnati, OH (US); Thomas A. McCardle, Cincinnati, OH (US); Danny L. Bolender, Sardinia, OH (US); Steve Dickinson, Cincinnati, OH (US); Joseph R. Knueven, Cincinnati, OH (US); Robert L. Lance, Jr., Midland, OH (US); Dan Stoltz, Sardinia, OH (US); Michael V. Petrocelli, Bethel, OH (US)

(73) Assignee: Kyocera Senco Industrial Tools, Inc., Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/541,450

(22) Filed: Dec. 15, 2023

(65) Prior Publication Data

US 2024/0139923 A1 May 2, 2024

Related U.S. Application Data

(60) Continuation of application No. 17/571,811, filed on Jan. 10, 2022, now Pat. No. 11,845,167, which is a (Continued)

(51) Int. Cl.

| | |
|---|---|
| ***B25C 1/04*** | (2006.01) |
| ***B25C 1/06*** | (2006.01) |
| ***B25C 5/13*** | (2006.01) |

(52) U.S. Cl.

CPC .............. *B25C 1/047* (2013.01); *B25C 1/041* (2013.01); *B25C 1/06* (2013.01); *B25C 5/13* (2013.01); *B25C 1/04* (2013.01)

(58) Field of Classification Search

CPC ........... B25C 1/047; B25C 1/041; B25C 1/06; B25C 5/13; B25C 1/04

See application file for complete search history.

(56) References Cited

U.S. PATENT DOCUMENTS

| | | | |
|---|---|---|---|
| 860,536 | A | 7/1907 | Ellingham |
| 1,774,967 | A | 9/1930 | Ellis |

(Continued)

FOREIGN PATENT DOCUMENTS

| | | |
|---|---|---|
| DE | 1503164 | 3/1970 |
| DE | 8711784 | 8/1987 |
| GB | 1559571 | 1/1980 |

OTHER PUBLICATIONS

International Search Report, PCT/US2008/078408, 10 pages (Dec. 8, 2008).

(Continued)

*Primary Examiner* — Michelle Lopez

(74) *Attorney, Agent, or Firm* — Frederick H. Gribbell; Russell F. Gribbell; William E. Crouse

(57) ABSTRACT

A portable linear fastener driving tool is provided that drive staples, nails, or other linearly driven fasteners. The tool uses a gas spring principle, in which a cylinder filled with compressed gas is used to quickly force a piston through a driving stroke movement, while a driver also drives a fastener into a workpiece. The piston/driver is then moved back to its starting position by use of a rotary-to-linear lifter, and the piston again compresses the gas above the piston, thereby preparing the tool for another driving stroke. The driver has protrusions along its edges that contact the lifter, which lifts the driver during a return stroke. A pivotable (Continued)

latch is controlled to move into either an interfering position or a non-interfering position with respect to the driver protrusions, and acts as a safety device, by preventing the driver from making a full driving stroke at an improper time.

23 Claims, 45 Drawing Sheets

Related U.S. Application Data continuation of application No. 16/398,944, filed on Apr. 30, 2019, now Pat. No. 11,241,776, which is a continuation of application No. 15/583,202, filed on May 1, 2017, now Pat. No. 10,478,954, which is a continuation of application No. 14/077,313, filed on Nov. 12, 2013, now Pat. No. 9,676,088, which is a division of application No. 13/770,481, filed on Feb. 19, 2013, now Pat. No. 8,602,282, which is a continuation of application No. 12/913,049, filed on Oct. 27, 2010, now Pat. No. 8,387,718, which is a division of application No. 12/243,693, filed on Oct. 1, 2008, now Pat. No. 8,011,441.

(60) Provisional application No. 60/977,678, filed on Oct. 5, 2007.

(56) References Cited

U.S. PATENT DOCUMENTS

| | | | |
|---|---|---|---|
| 2,575,455 | A | 11/1951 | Lang |
| 2,814,041 | A | 11/1957 | Haley |
| 2,933,290 | A | 4/1960 | Ryder |
| 3,150,488 | A | 9/1964 | Haley |
| 3,589,588 | A | 6/1971 | Vasku |
| 3,636,707 | A | 1/1972 | Saari |
| 3,847,322 | A | 11/1974 | Smith |
| 3,878,902 | A | 4/1975 | Matsuo |
| 3,913,685 | A | 10/1975 | Enstrom |
| 3,924,692 | A | 12/1975 | Saari |
| 4,203,353 | A | 5/1980 | Bernham et al. |
| 4,215,808 | A | 8/1980 | Sollberger et al. |
| 4,530,455 | A | 7/1985 | Vornberger |
| 4,741,518 | A | 5/1988 | Wallis |
| 4,834,278 | A | 5/1989 | Lin |
| 4,953,774 | A | 9/1990 | Lai |
| 5,199,627 | A | 4/1993 | Christensen |
| 5,503,319 | A | 4/1996 | Lai |
| 5,605,268 | A | 2/1997 | Hayashi |
| 5,720,423 | A | 2/1998 | Kondo et al. |
| 6,533,156 | B1 | 3/2003 | Chang |
| 6,669,072 | B2 | 12/2003 | Burke |
| 6,938,811 | B2 | 9/2005 | Ehmig et al. |
| 6,997,367 | B2 | 2/2006 | Hu |
| 7,040,521 | B2 | 5/2006 | Kolodziej et al. |
| 7,225,961 | B1 | 6/2007 | Lee |
| 7,225,962 | B2 | 6/2007 | Porth et al. |
| 7,494,036 | B2 | 2/2009 | Shima |
| 11,845,167 | B2 * | 12/2023 | Leimbach ................. B25C 5/13 |
| 2003/0218042 | A1 | 11/2003 | Odoni et al. |
| 2005/0082334 | A1 | 4/2005 | Hu |
| 2005/0217875 | A1 | 10/2005 | Forster |
| 2006/0180631 | A1 | 8/2006 | Pedicini |
| 2006/0261127 | A1 | 11/2006 | Wolf |
| 2007/0007319 | A1 | 1/2007 | Simonelli |
| 2007/0045377 | A1 | 3/2007 | Towfighi |
| 2008/0041914 | A1 | 2/2008 | Simonelli |
| 2008/0067213 | A1 | 3/2008 | Shima |
| 2008/0190988 | A1 | 8/2008 | Pedicini |

OTHER PUBLICATIONS

Two-page "Tool Assembly" drawing of Senco Model No. SN952XP pneumatic tool; dated Mar. 4, 2008; representative of earlier tools in public use before 2006; Admitted Prior Art.

One-page magnified view of "Tool Assembly" drawing of Senco Model No. SN952XP pneumatic tool; Mar. 4, 2008; representative of earlier tools in public use before 2006; Admitted Prior Art.

European Search Report for EP 08 83 4872, Nov. 19, 2015.

Sixteen page Operating Instructions for Senco AirFree 41 Cordless Finish Nailer; Sep. 7, 2001. Note: this is an old "flywheel" tool—see U.S. Pat. No. 6,669,072.

Four page Parts Reference Guide for Senco AirFree 41 Cordless Finish Nailer; 2004. Note: this is an old "flywheel" tool—see U.S. Pat. No. 6,669,072.

Four page Parts Reference Guide for Senco Cordless Finish 41 15 ga. Finish Nailer; 2008. Note: this is an old "flywheel" tool—see U.S. Pat. No. 6,669,072.

* cited by examiner

FASTENER DRIVING TOOL USING A GAS SPRING

CROSS-REFERENCE TO RELATED APPLICATIONS

The present application is a continuation of Ser. No. 17/571,811, titled FASTENER DRIVING TOOL USING A GAS SPRING, filed on Jan. 10, 2022 (which will issue on Dec. 19, 2023 as U.S. Pat. No. 11,845,167); which is a continuation of Ser. No. 16/389,944, titled FASTENER DRIVING TOOL USING A GAS SPRING, filed on Apr. 30, 2019; which is a continuation of Ser. No. 15/583,202, titled FASTENER DRIVING TOOL USING A GAS SPRING, filed on May 1, 2017, now U.S. Pat. No. 10,478,954 (issued on Nov. 19, 2019); which is a continuation of Ser. No. 14/077,313, titled FASTENER DRIVING TOOL USING A GAS SPRING, filed on Nov. 12, 2013, now U.S. Pat. No. 9,676,088; which is a divisional of Ser. No. 13/770,481, titled FASTENER DRIVING TOOL USING A GAS SPRING, filed on Feb. 19, 2013, now U.S. Pat. No. 8,602, 282; which is a continuation of Ser. No. 12/913,049, titled METHOD FOR CONTROLLING A FASTENER DRIVING TOOL USING A GAS SPRING," filed on Oct. 27, 2010, now U.S. Pat. No. 8,387,718; which is a divisional of Ser. No. 12/243,693, titled "METHOD FOR CONTROLLING A FASTENER DRIVING TOOL USING A GAS SPRING," filed on Oct. 1, 2008, now U.S. Pat. No. 8,011, 441; which claims priority to provisional patent application Ser. No. 60/977,678, titled "FASTENER DRIVING TOOL USING A GAS SPRING," filed on Oct. 5, 2007.

BACKGROUND OF THE INVENTION

1. Field of the Invention

The present invention relates to linear fastener driving tools, and, more particularly, directed to portable tools that drive staples, nails, or other linearly driven fasteners. The invention is specifically disclosed as a gas spring linear fastener driving tool, in which a cylinder filled with compressed gas is used to quickly force a piston through a driving stroke movement, while also driving a fastener into a workpiece. The piston is then moved back to its starting position by use of a rotary-to-linear lifter, which again compresses the gas above the piston, thereby preparing the tool for another driving stroke. A driver member is attached to the piston, and has protrusions along its edges that are used to contact the lifter member, which lifts the driver during a return stroke. A pivotable latch is controlled to move into either an interfering position or a non-interfering position with respect to the driver protrusions, and acts as a safety device, by preventing the driver from making a full driving stroke at an improper time. In alternative embodiments, the fastener driving tool uses a different type of driving device, such as a mechanical spring, to force the driver into a driving stroke.

2. Description of the Related Art

An early air spring fastener driving tool is disclosed in U.S. Pat. No. 4,215,808, to Sollberger. The Sollberger patent used a rack and pinion-type gear to "jack" the piston back to its driving position. A separate motor was to be attached to a belt that was worn by the user; a separate flexible mechanical cable was used to take the motor's mechanical output to the driving tool pinion gear, through a drive train.

Another air spring fastener driving tool is disclosed in U.S. Pat. No. 5,720,423, to Kondo. This Kondo patent used a separate air replenishing supply tank with an air replenishing piston to refresh the pressurized air needed to drive a piston that in turn drove a fastener into an object.

Another air spring fastener driving tool is disclosed in published patent application no. US2006/0180631, by Pedicini, which uses a rack and pinion to move the piston back to its driving position. The rack and pinion gear are decoupled during the drive stroke, and a sensor is used to detect this decoupling. The Pedicini tool uses a release valve to replenish the air that is lost between nail drives.

What is needed in the art is a portable fastener driving tool that is electrically powered, but which uses a gas spring principle of operation to drive a fastener into an object, and also uses few moving parts, which allows for simplicity of operation and provides a substantially gas-tight system for containing the pressurized gas for the gas spring.

SUMMARY OF THE INVENTION

Accordingly, it is an advantage of the present invention to provide a fastener driving tool that operates on a gas spring principle, in which the cylinder that contains the moving piston and driver is substantially surrounded by a pressure vessel (as a main storage chamber) to increase the storage space of the pressurized gases needed for the gas spring effect.

It is another advantage of the present invention to provide a fastener driving tool that uses a gas spring principle to provide a quick downward driving stroke, and uses a rotary-to-linear lifter having a cam-shaped perimeter surface and multiple cylindrical protruding pins that lift the fastener driver element and the piston back to the initiating firing (or driving) position.

It is a further advantage of the present invention to provide a fastener driving tool that operates on a gas spring principle, in which the tool has a cylinder displacement volume and also includes a main storage chamber, and in which a volumetric ratio of the main storage chamber's volume with respect to the cylinder's displacement volume is at least 2.0:1.

It is still a further advantage of the present invention to provide a fastener driving tool that operates on a gas spring principle, in which there is a "working storage volume" comprising a combination of a main storage chamber and a cylinder displacement volume, and in which there is no gas replenishment system on-board the tool for allowing a user to replenish the charge gases of the tool's working storage volume, thereby reducing opportunities for gas leaks.

It is yet another advantage of the present invention to provide a fastener driving tool that uses a gas spring principle that uses a rotary-to-linear lifter to move the driver back to its firing (or driving) position, in which there can be a variable driving stroke by use of multiple rotations of the lifter member.

It is still another advantage of the present invention to provide a fastener driving tool that operates on a gas spring principle, in which, for a first embodiment, a movable latch is controlled by a solenoid to disengage from multiple teeth of the driver element during a driving stroke, but also will tend to engage the teeth of the driver element as a safety interlock, and also at the maximum driver element displacement just before a driving stroke is to occur, so that the movable latch engages the driver teeth until the user activates the tool.

It is still another advantage of the present invention to provide a fastener driving tool that operates on a gas spring principle, in which, for a second embodiment, a gearbox is provided that is essentially self-locking from its output side, or has a one-way feature, and thus the gearbox/lifter combination holds the driver in position just before a driving stroke.

It is a yet further advantage of the present invention to provide a fastener driving tool that operates on a gas spring principle which includes a system controller that allows operation in either a "bottom firing mode" or a "trigger firing mode."

It is a still further advantage of the present invention to provide a fastener driving tool that operates on a gas spring principle in which the system controller has error correction capability, including the capability of recovering from a jam of the driver element, without having to completely disable the tool.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method for controlling a fastener driving tool is provided, in which the method comprises the following steps: (a) providing a fastener driving tool that includes: (i) a housing, (ii) a system controller, (iii) a fastener driving mechanism that moves a driver member toward an exit end of the mechanism, (iv) a prime mover that moves a lifter member which moves the driver member away from the exit end of the mechanism, (v) a latch control device that moves a latch member which has a catching surface, (vi) a safety contact element, (vii) a user-actuated trigger, and (vii) a fastener; (b) initiating a driving cycle by pressing the exit end against a workpiece and actuating the trigger, thereby: (i) causing the latch control device to activate, which moves the catching surface of the latch member to a position that does not interfere with movements of the driver member; and (ii) causing the fastener driving mechanism to force the driver member to move toward the exit end and drive the fastener into the workpiece; (c) actuating the prime mover, thereby moving the lifter member and causing the driver member to move away from the exit end toward a ready position; and (d) then de-activating the latch control device, which allows a mechanical biasing of the latch member to move the catching surface of the latch member to a position that interferes with movements of the driver member.

In accordance with another aspect of the present invention, a method for controlling a fastener driving tool is provided, in which the method comprises the following steps: (a) providing a fastener driving tool that includes: (i) a housing; (ii) a system controller; (iii) a safety contact element; (iv) a user-actuated trigger; (v) a fastener; (iv) a prime mover that moves a lifter member which moves a driver member away from an exit end of the mechanism; and (vii) a fastener driving mechanism that moves the driver member toward the exit end of the mechanism, the fastener driving mechanism including: (A) a hollow cylinder comprising a cylindrical wall with a movable piston therewithin, the hollow cylinder containing a displacement volume created by a stroke of the piston, and (B) a main storage chamber that is in fluidic communication with the displacement volume of the cylinder, wherein the main storage chamber and the displacement volume are initially charged with a pressurized gas; (b) selecting, by a user, an operating mode of the driving cycle to be one of: a "bottom firing mode," and a "restrictive firing mode;" wherein: (i) if the restrictive firing mode is selected, the tool will operate if the safety contact element has been actuated before the trigger actuator has been operated; and (ii) if the bottom firing mode is selected, the tool will operate if both: (A) the trigger actuator has been operated, and (B) the safety contact element has been actuated, in either sequence; (c) initiating a driving cycle by pressing the exit end against a workpiece and actuating the trigger, thereby causing the fastener driving mechanism to force the driver member to move toward the exit end and drive a fastener into the workpiece; and (d) actuating the prime mover, thereby moving the lifter member and causing the driver member to move away from the exit end toward a ready position.

In accordance with yet another aspect of the present invention, a fastener driving tool is provided, which comprises: (a) a housing that contains a prime mover, and a system controller; (b) a fastener driving mechanism that includes: (i) a hollow cylinder having a movable piston therewithin, the hollow cylinder having a first end and a second, opposite end, the hollow cylinder containing a displacement volume created by a stroke of the piston, the displacement volume being initially charged with a pressurized gas; (ii) a guide body that is substantially adjacent to the second end of the cylinder, the guide body having a receiving end, an exit end, and a passageway therebetween, the receiving end being proximal to the second end of the cylinder, the guide body being configured to receive a fastener that is to be driven from the exit end; (iii) an elongated driver member that is in mechanical communication with the piston, the driver member having a driving surface that is sized and shaped to push a fastener into an external workpiece, wherein the passageway of the guide body allows the driver member to pass therethrough toward the exit end during a driving stroke, and allows the driver member to pass therethrough away from the exit end during a lifting interval; (A) the driver member having a first longitudinal edge; (B) the driver member having a first plurality of spaced-apart protrusions along the first longitudinal edge; and (iv) a lifter member that exhibits an outer shape that defines a perimeter of the lifter member's surface: (A) the lifter member being movable, under command of the system controller, by the prime mover; (B) the lifter member having a discontinuous contact surface that, at predetermined locations along the discontinuous contact surface, makes contact with the first plurality of spaced-apart protrusions of the driver member such that, under first predetermined conditions, the lifter member is moved in a first direction and thereby causes the driver member to be moved from its driven position toward its ready position; and (C) the lifter member being positionable by the prime mover, under second predetermined conditions, such that the discontinuous contact surface of the lifter member does not mechanically interfere with the first plurality of spaced-apart protrusions along the first longitudinal edge of the driver member during the driving stroke, in which the driver member moves from its ready position toward its driven position; (c) a safety contact element that extends to the exit end of the guide body, and which is movable between an actuated position when the safety contact element is pressed against the external workpiece, and a non-actuated position when the safety contact element is not pressed against the external workpiece; (d) a trigger actuator that is user-actuated; (e) a trigger position sensor; and (f) a safety contact element position sensor; wherein the cylinder and piston act as a gas spring, under the second predetermined conditions, to move the driver member from its ready position toward its driven position, using the pressurized gas acting on the piston, while the driver member's driving surface contacts a fastener and moves the fastener toward the exit end of the guide body.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The terms "first" and "second" preceding an element name, e.g., first pin, second pin, etc., are used for identification purposes to distinguish between similar elements, and are not intended to necessarily imply order, nor are the terms "first" and "second" intended to preclude the inclusion of additional similar elements.

Reference will now be made in detail to the present preferred embodiment of the invention, an example of which is illustrated in the accompanying drawings, wherein like numerals indicate the same elements throughout the views.

Figure 1:
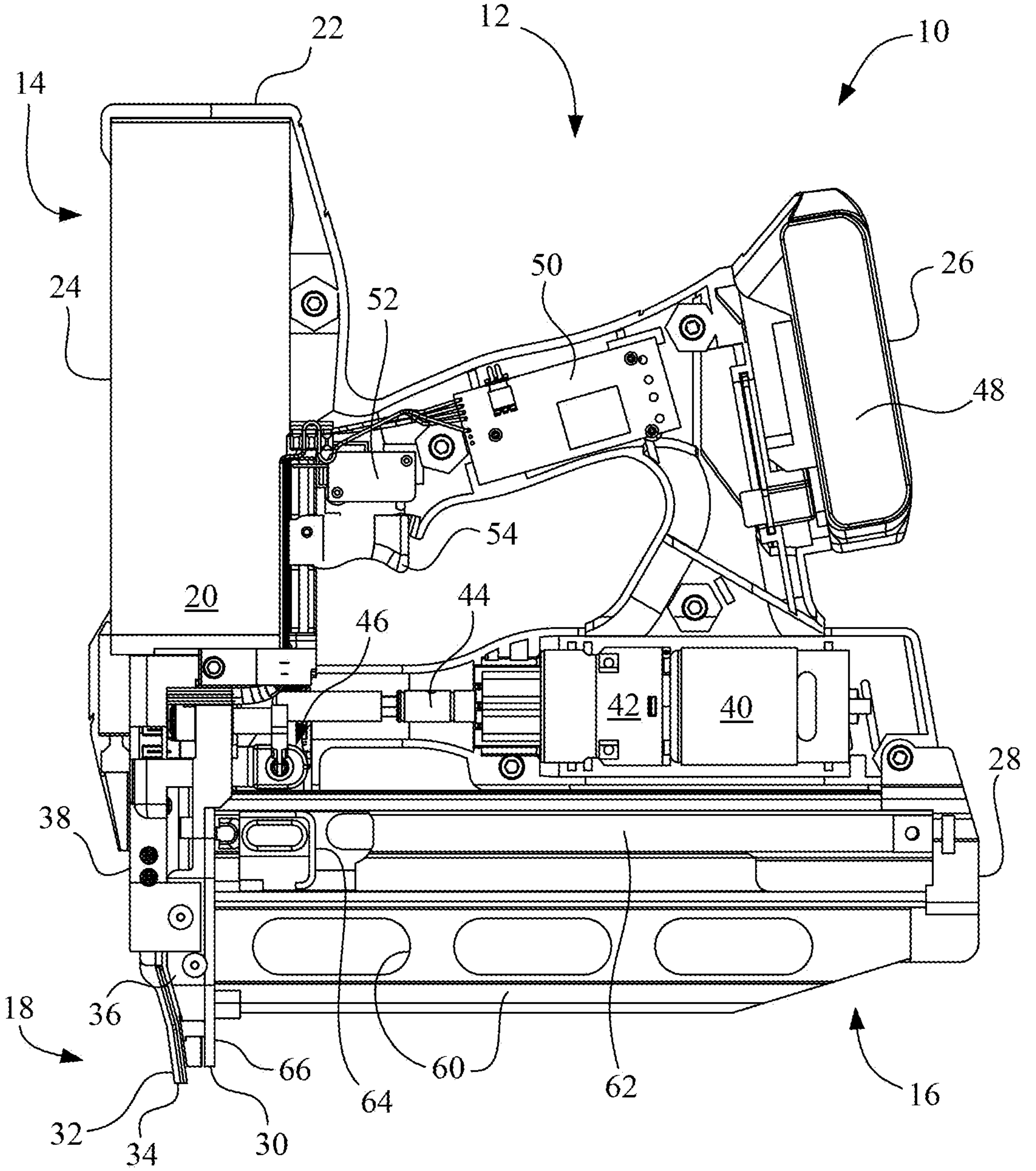
FIG. 1 is a side view in partial cross-section of a first embodiment of a fastener driving tool constructed according to the principles of the present invention.

Referring now to FIG. 1, a first embodiment of a fastener driving tool is generally designated by the reference numeral 10. This tool 10 is mainly designed to linearly drive fasteners such as nails and staples. Tool 10 includes a handle portion 12, a fastener driver portion 14, a fastener magazine portion 16, and a fastener exit portion 18.

A "left" outer cover of the driver portion is indicated at 20. A "top" cover is indicated at 22, while a "front" outer cover or "housing" of the driver portion is indicated at 24. A "rear" cover for the handle portion is indicated at 26 (which is also the battery pack cover), while a "rear" cover of the magazine portion is indicated at 28. It will be understood that the various directional nomenclature provided above is with respect to the illustration of FIG. 1, and the first embodiment fastener driving tool 10 can be used in many other angular positions, without departing from the principles of the present invention.

The area of the first embodiment tool 10 in which a fastener is released is indicated approximately by the reference numeral 30, which is the "bottom" of the fastener exit portion of tool 10. Before the tool is actuated, a safety contact element 32 extends beyond the bottom 30 of the fastener exit, and this extension of the safety contact element is depicted at 34, which is the bottom or "front" portion of the safety contact element. Other elements that are depicted in FIG. 1 include a guide body 36 and a front cover 38, which are in mechanical communication with the magazine portion 16.

Reference numeral 60 indicates a magazine housing, while reference numeral 62 indicates a fastener track through which the individual fasteners run therethrough while they remain within the magazine portion 16. A feeder carriage 64 is used to feed an individual fastener from the magazine into the drive mechanism area, and a back plate 66 is used to carry an individual fastener while it is being driven. In the illustrated embodiment, the feeder carriage 64 positions a fastener to a position within the guide body that is coincident with the path of the driver member 90, so that when the driver 90 moves through a driving stroke, its driving end will basically intercept the fastener and carry that fastener to the exit end of the tool 10, essentially at the bottom portion 30 of the tool's exit area.

The first embodiment fastener driving tool 10 also includes a motor 40 which acts as a prime mover for the tool, and which has an output that drives a gearbox 42. An output shaft 44 of the gearbox drives a lifter drive shaft 102 (see FIG. 2). A solenoid 46 is depicted on FIG. 1, and further details of its operation are discussed below. A battery 48 is attached near the rear of the handle portion 12, and this battery provides electrical power for the motor 40 as well as for a control system.

A printed circuit board that contains a controller is generally designated by the reference numeral 50, and is placed within the handle portion 12 in this embodiment. A trigger switch 52 is activated by a trigger actuator 54. As can been seen by viewing FIG. 1, the handle portion 12 is designed for gripping by a human hand, and the trigger actuator 54 is designed for linear actuation by a person's finger while gripping the handle portion 12. Trigger switch 52 provides an input to the control system 50. There are also other input devices for the controller, however those input devices are not seen in FIG. 1.

The controller will typically include a microprocessor or a microcomputer device that acts as a processing circuit. At least one memory circuit will also typically be part of the controller, including Random Access Memory (RAM) and Read Only Memory (ROM) devices. To store user-inputted information (if applicable for a particular tool model), a non-volatile memory device would typically be included, such as EEPROM, NVRAM, or a Flash memory device.

Figure 2:
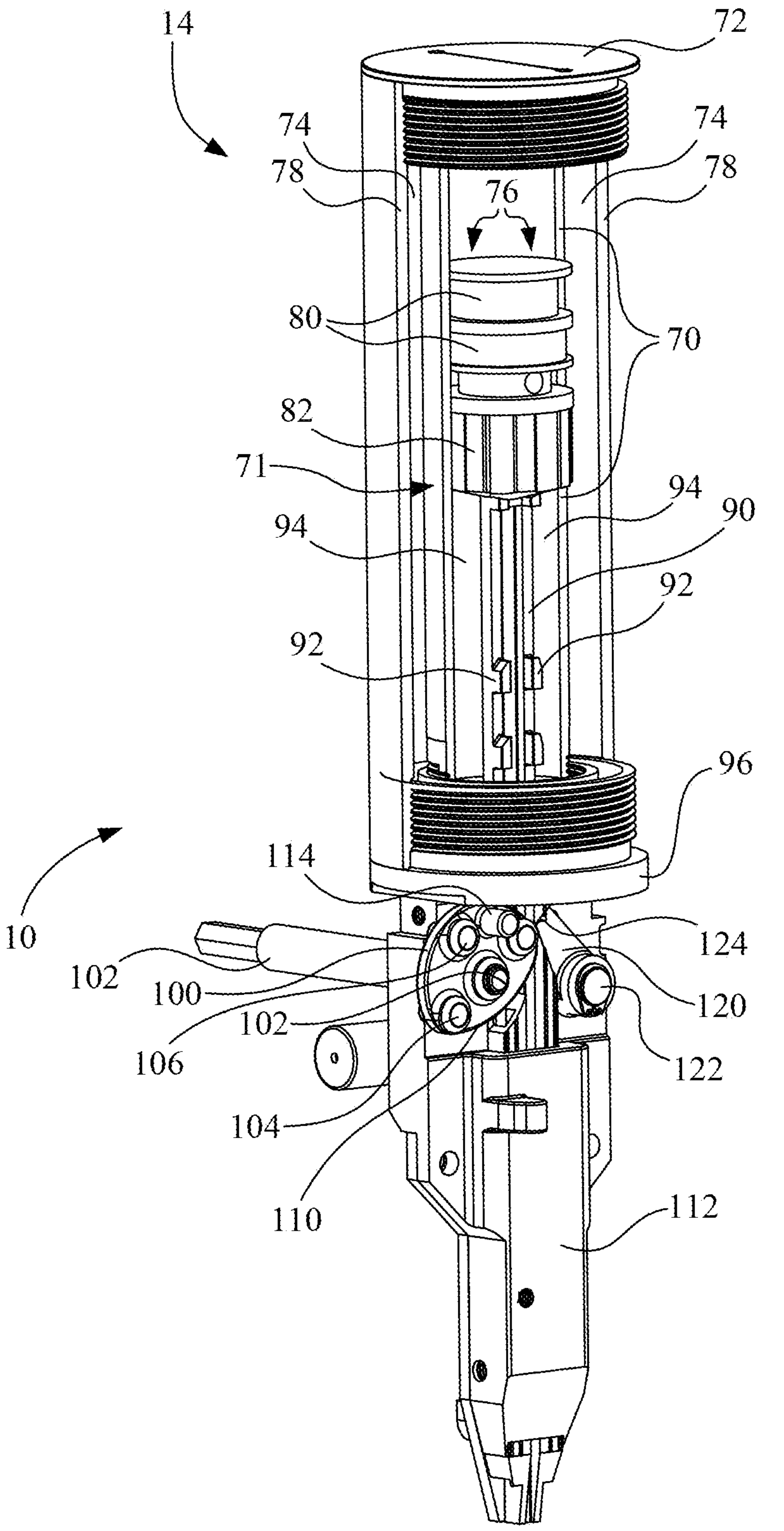
FIG. 2 is a perspective view mainly from the side, but also from above, and in partial cross-section, of the gas spring cylinder mechanism of the first embodiment fastener driving tool of FIG. 1.

Referring now to FIG. 2, a working cylinder subassembly is designated by the reference numeral 71, and this is included as part of the fastener driver portion 14. On FIG. 2, the working cylinder 71 includes a cylinder wall 70, and within this cylinder wall 70 is a piston 80, a movable piston stop 82, and a stationary piston stop 84 (see FIG. 3). Part of the piston mechanism of this embodiment includes a piston seal 86, a piston guide ring 88, and a piston scraper 89 (see FIG. 10). Surrounding, in the illustrated embodiment, the cylinder wall 70 is a main storage chamber 74 (also sometimes referred to herein as a "pressure vessel storage space") and an outer pressure vessel wall 78 (which corresponds to the "front" cover 24 of FIG. 1, along the left portion of this view). At the top (as seen on FIG. 2) of the fastener driver portion 14 is a top cap 72 for the cylinder mechanism.

Also within the fastener driver portion 14 are mechanisms that will actually drive a fastener into a solid object. This includes a driver 90, a cylinder "venting chamber" 94 (which would typically always be at atmospheric pressure), a driver track 98 (see FIG. 4), a rotary-to-linear lifter 100, and a latch 120. The driver 90 is also sometimes referred to herein as a "driver member" and the rotary-to-lifter 100 is also sometimes referred to herein as a "lifter member," or simply as a "lifter." Driver 90 is rather elongated, and as an individual element can best be seen in FIGS. 6 and 7. There are multiple "teeth" 92 that are positioned along the driver. In the illustrated embodiment, these teeth 92 are spaced-apart not only in a transverse direction from the elongated centerline of driver 90, but they are also spaced-apart from one another along the outer longitudinal edges of the driver 90. The positions of teeth 92 are clearly illustrated in FIGS. 6 and 7. It will be understood that the precise positions for the teeth 92 could be different from those illustrated for the driver 90 without departing from the principles of the present invention.

There is a cylinder base 96 that mainly separates the gas pressure portions of the fastener driver portion 14 from the mechanical portions of that driver portion 14. The venting of air from the cylinder venting chamber 94 passes through the cylinder base 96, as seen at a vent 150 (see FIG. 3). The mechanical portions of FIG. 2 begin with a rotary-to-linear lifter 100 which was briefly mentioned above, along with a lifter drive shaft 102. Drive shaft 102 protrudes through the center portions of the fastener driver portion 14 and through the center of the lifter 100, and this shaft is used to rotate the lifter, as desired by the control system.

Figure 12:
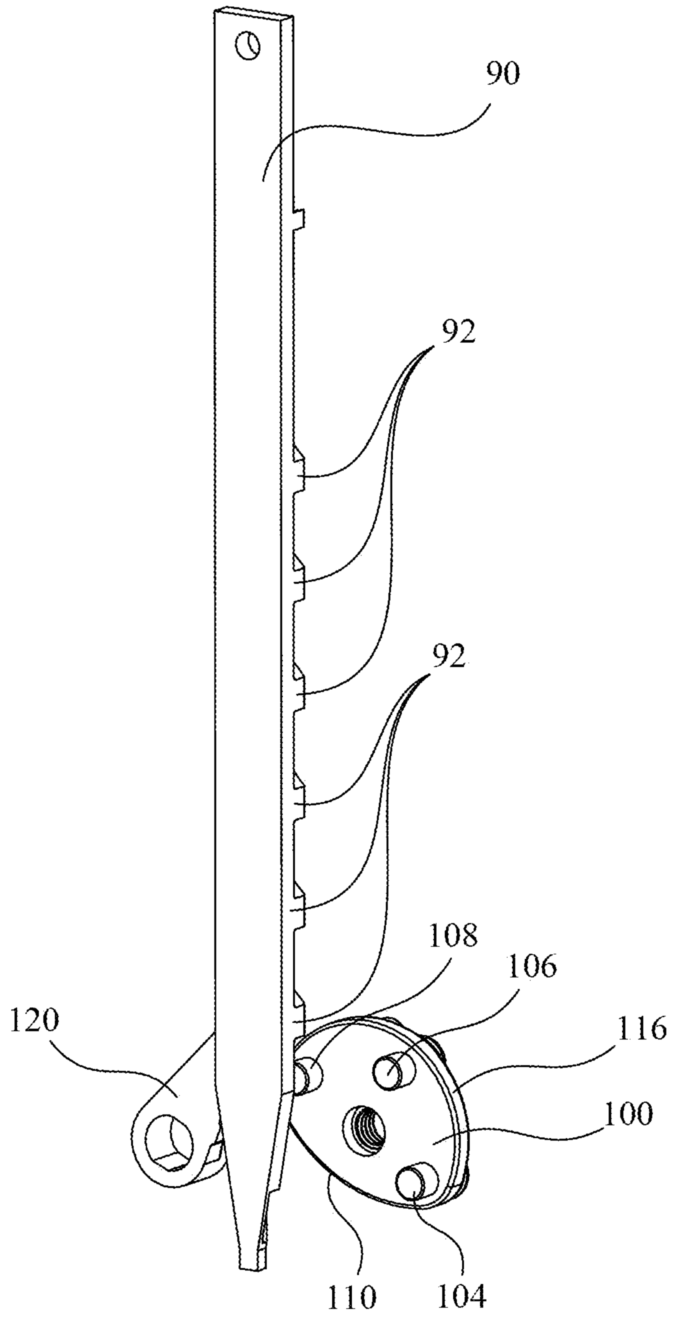
FIG. 12 is a perspective view from the opposite side of the rotary-to-linear lifter, used in the first embodiment fastener driving tool of FIG. 1.

Lifter 100 is not designed with an entirely circular outer perimeter, but instead is arcuate and portions of its perimeter exhibit an eccentric shape of a cam (see FIG. 12). A portion of the lifter's outer perimeter is mainly circular for about half of a circle (designated by the reference numeral 116), but the other half of the lifter's outer perimeter is more eccentric, which provides an elliptical surface that is designated by the reference numeral 110. The rotary-to-linear lifter 100 also includes three cylindrical protrusions (or "extensions") that will also be referred to herein as "pins." The first such pin ("pin 1") is designated 104, the second pin ("pin 2") is designated 106, while the third pin ("pin 3") is designated 108. These pins are all viewed on FIG. 12. Furthermore, there is a fourth cylindrical pin ("pin 4") that protrudes from the opposite side of the lifter 100, which fourth pin is designated 114, and which can be viewed on several of the other figures, namely FIGS. 2-8.

It should be noted that FIGS. 2-8 also depict a "back" side of the first three pins 104, 106, and 108, in which these views essentially show a "boss portion" of those pins. These boss portions of the pins 104, 106, 108 are not entirely necessary for the proper functioning of the rotary-to-linear lifter 100, however, the boss portions are illustrated in the figures of this patent document for ease of description. (In other words, the surface of the lifter 100 could be perfectly smooth at those locations rather than exhibiting a "boss.") It should be understood that the "working side" of these three pins 104, 106, and 108 is on the opposite side of the lifter 100 in the views of FIGS. 2-8, and this working side is directly illustrated in FIG. 12. When discussing these pins 104, 106, and 108 with respect to FIGS. 2-8 in this written description, it is with reference to the "boss side" of those pins; however, the effects of the "working side" of those pins is discussed in some detail with respect to other structures that are also illustrated on FIGS. 2-8. It should also be noted that pins 104, 106, 108, and 114 are illustrated as having circular cross-sectional shapes, which is desirable for this embodiment, although other cross-sectional shapes could instead be used without departing from the principles of the present invention, particularly for the fourth pin 114.

The latch 120 that was briefly noted above is depicted on FIG. 2, and has a latch shaft 122 protruding therethrough, and this shaft rotates the latch 120 as determined by the controller. Latch 120 includes a latch "catching surface" at 124, and this will be more fully explained below. In FIG. 2, there is an internal cover 112 that is a portion of the back plate 66, and hides some of the other mechanical components that will be visible in other views.

In FIG. 2, the piston 80 is not quite at its uppermost or top-most position, and a gas pressure chamber 76 can be seen above the top-most area of the piston, near the piston seal 86. It will be understood that the gas pressure chamber 76 and the main storage chamber (or storage space) 74 are in fluidic communication with one another. It will also be understood that the portion to the interior of the cylinder wall 70 forms a displacement volume that is created by the stroke of the piston 80. In other words, the gas pressure chamber 76 is not a fixed volume, but this chamber will vary in volume as the piston 80 moves up and down (as seen in FIG. 2). This type of mechanical arrangement is often referred to as a "displacement volume," and that terminology will mainly be used herein for this non-fixed volume 76.

It will be further understood that the main storage chamber 74 preferably comprises a fixed volume, which typically would make it less expensive to manufacture; however, it is not an absolute requirement that the main storage chamber actually be of a fixed volume. It would be possible to allow a portion of this chamber 74 to deform in size and/or shape so that the size of its volume would actually change, during operation of the present invention, without departing from the principles of the present invention.

In the illustrated embodiment for the first embodiment fastener driving tool 10, the main storage chamber 74 substantially surrounds the working cylinder 71. Moreover, the main storage chamber 74 is annular in shape, and it is basically co-axial with the cylinder 71. This is a preferred configuration of the illustrated first embodiment, but it will be understood that alternative physical arrangements could be designed without departing from the principles of the present invention.

Figure 3:
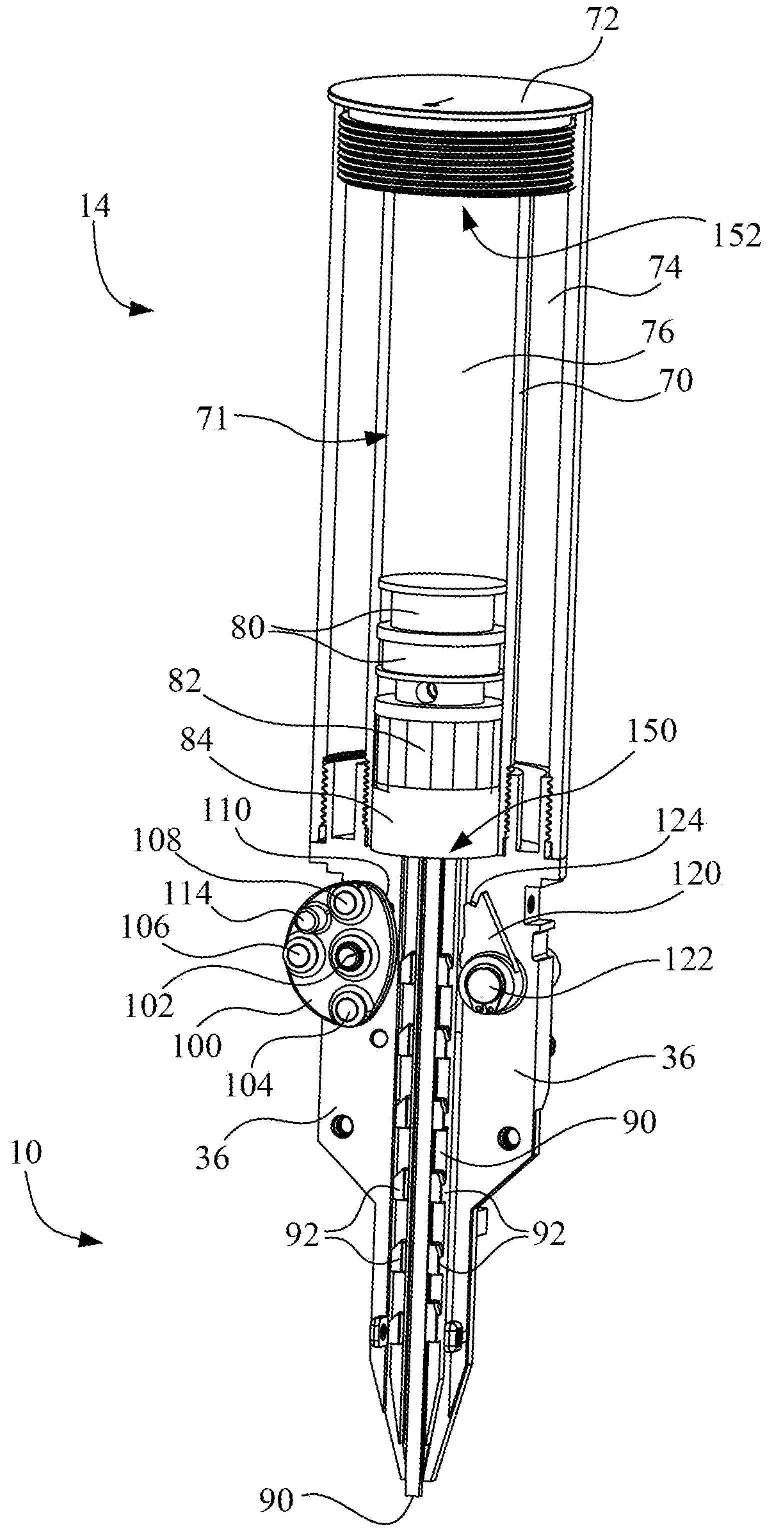
FIG. 3 is another perspective view from the side and somewhat from above and in partial cross-section of the gas spring cylinder portion of the first embodiment fastener driving tool of FIG. 1, better showing the driver mechanism, with the piston at its lowest "driven" position.

Referring now to FIG. 3, the piston is depicted at its bottom-most travel position, and in this configuration, the displacement volume 76 and the main storage chamber 74 are at their largest combined volumes, while the cylinder venting chamber 94 is at its minimum volume. This bottom position is also sometimes referred to herein as the "driven position."

In FIG. 3, the movable piston stop 82 is now in contact with the stationary piston stop 84, which is why the cylinder venting chamber 94 is at its minimum (or zero) volume. In FIG. 3, the driver 90 is also at its bottom-most travel position, and its lower-most tip can be seen extending out the exit port at the bottom of the guide body 36.

In FIG. 3, the rotary-to-linear lifter 100 and the latch 120 are in their respective positions at the end of a firing (driving) stroke, and the latch 120 has its latching surface 124 in a location that will not interfere with the teeth 92 of the driver 90. This is necessary so that the driver 90 can make a linear stroke from its top-most position to its bottom-most position. However, the latch 120 will later be slightly rotated by the latch shaft 122 (which is spring-loaded) so that its catching surface 124 will be able to interfere with the teeth 92.

In the configuration depicted on FIG. 3, the fastener driving tool 10 has been used to drive a fastener, and the tool now must cause the driver 90 to be "lifted" back to its top-most position for a new firing (driving) stroke. This is accomplished by rotating the lifter 100, which is actuated by the motor 40, through its gearbox 42, etc.

As rotary-to-linear lifter 100 rotates counterclockwise (as seen in FIG. 3) at least one of its pins 104, 106, or 108 will come into contact with one of the teeth 92 along the left side (as seen in FIG. 3) of the driver 90. This will cause the driver 90 to be "lifted" upward (as seen in FIG. 3). As the lifter 100 rotates, one of the teeth 92 will be in contact with one of the rotating pins 104, 106, 108 throughout a portion of the rotational travel of the lifter, and the "next" pin will then come into contact with the "next" tooth 92 so that the driver 90 continues to be moved upward. This will remain true until the eccentric cam surface 110 comes into play, and since there are no "working" lifter pins protruding along that surface, the driver 90 will not continue to be driven upward while the eccentric cam surface 110 is positioned along the right portion (as seen in FIG. 3) of the rotary-to-linear lifter 100. However, when this occurs, the latch 120, which is spring-loaded, will have its latch catching surface 124 in a proper location to "catch" the closest tooth 92 along the right-hand side (as seen in FIG. 3) of the driver 90, thereby preventing the driver from falling downward for any significant distance. After this occurs, the "next" lifter pin (which will be the pin 104) will then come along and again make contact with one of the teeth 92 along the left-hand side (as seen in FIG. 3) of the driver 90, thereby continuing to lift the driver toward the top (as seen in FIG. 3) of the cylinder 71.

Figure 4:
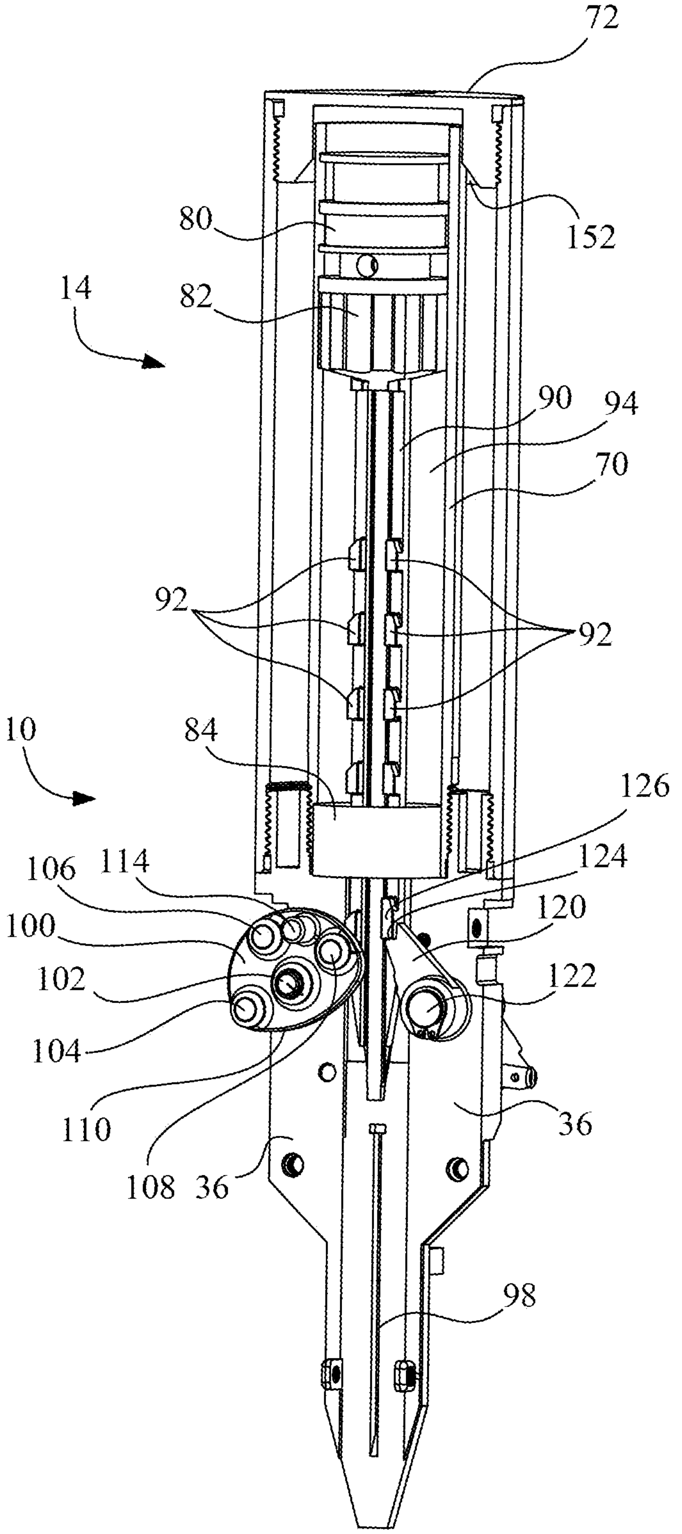
FIG. 4 is another perspective view from the side and somewhat from above and in partial cross-section of the gas spring cylinder portion of the first embodiment fastener driving tool of FIG. 1, in which the driver and piston are near their top-most position, but still latched and not quite ready for firing (driving).

In the illustrated embodiment of the first embodiment fastener driving tool 10, the rotary-to-linear lifter 100 makes two complete rotations to lift the driver 90 from its bottom-most position to its top-most position. (The upper position is also sometimes referred to herein as the "ready position.") At the end of the second rotation, the parts will be configured as illustrated in FIG. 4. The piston 80 is once again near the top of the cylinder 71, and the combined volumes of the main storage chamber 74 and displacement volume 76 have now been reduced to a smaller volume, which means their gases are under a greater pressure, since the gas that was above the piston and in chamber 74 was compressed during the lift of the driver. (As noted above, the actual volume of the main storage chamber 74 does not change in the illustrated embodiment.) During the lift of the driver, the latch 120 was "engaged" with the teeth 92, however, the latch has a smooth surface in one direction that allows the teeth 92 to push the latch out of the way during the upward lift of the driver. This is much like a ratchet-type action, remembering that the latch is spring-loaded so as to act in this manner.

In FIG. 4, the "last" tooth 126 along the right-hand side (as seen in FIG. 4) of the driver 90 is engaged with the latch catching surface 124, and so latch 120 now prevents the driver from being moved downward (as seen in this view). The third pin 108 is still in contact with the lower-most tooth 92 along the left-hand side (as seen in FIG. 4) of the driver 90, at this point in the rotational travel of the rotary-to-linear lifter 100. There is a sensor which, in the illustrated embodiment, is a limit switch 130 (see FIG. 8), that detects the rotational movements of the lifter 100. This sensor detects the fourth pin 114, as discussed below in greater detail.

When the sensor 130 detects the fourth pin 114 a first time (in this embodiment), the control system turns off the solenoid 46, which will then allow the latch 120 to engage the right-hand teeth (in these views) of the lifter 100. Note that the solenoid can also be turned off earlier during the lift, if desired. When sensor 130 detects this pin 114 a second time (in this embodiment), the current to the motor 40 is turned off, and the motor thus is de-energized and stops the lifting action of the driver 90. As described herein, the solenoid 46 acts as a latch actuator.

Due to the gas pressure above the piston 80, the driver/piston subassembly will drift downward (in these views) a small distance until the tooth 126 contacts the latch surface 124. This is the position illustrated in FIG. 4 of these components, and this configuration is considered to be the "rest" position of the tool. Although the gas pressure in the combined main storage chamber 74 and displacement volume 76 is at its maximum, the latch 120 prevents the driver from being moved further downward, so the piston is essentially locked in this position until something else occurs. In a preferred mode of the invention, the pressure vessel may be pressurized at about 100 PSIG to 120 PSIG.

Figure 5:
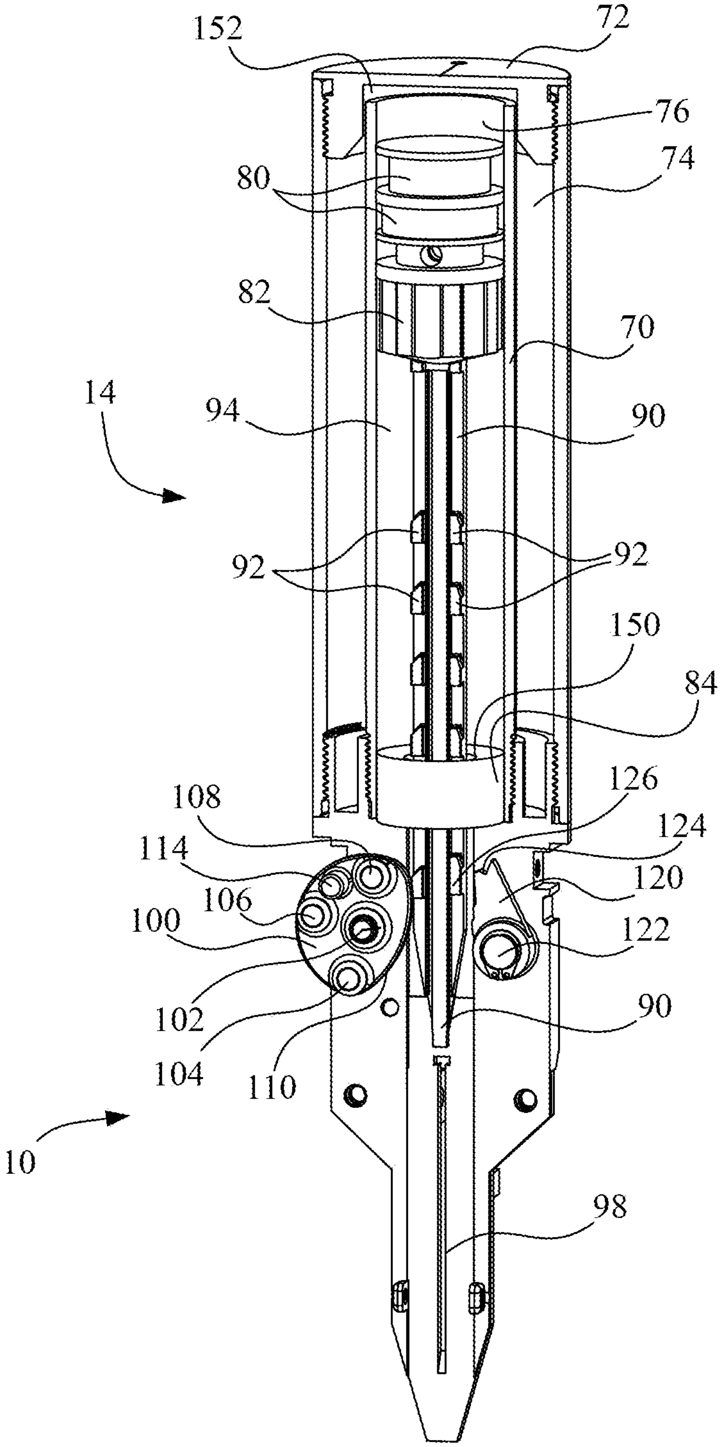
FIG. 5 is another perspective view from the side and somewhat from above and in partial cross-section of the gas spring cylinder portion of the first embodiment fastener driving tool of FIG. 1, in which the driver and piston are near their top-most position, in which the mechanism is now unlatched and ready for firing (driving).
Figure 6:
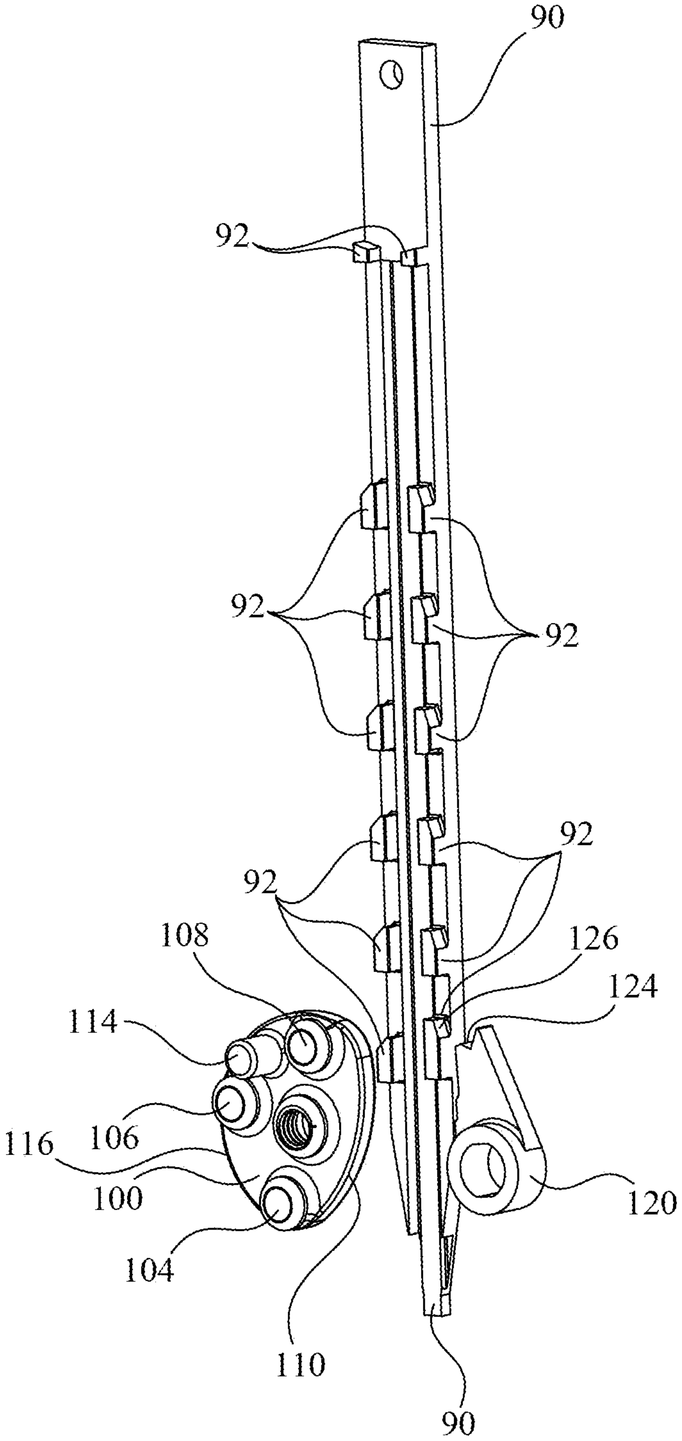
FIG. 6 is a perspective view of driver, rotary-to-linear lifter, and latch portions of the driver mechanism for the first embodiment fastener driving tool of FIG. 1.
Figure 7:
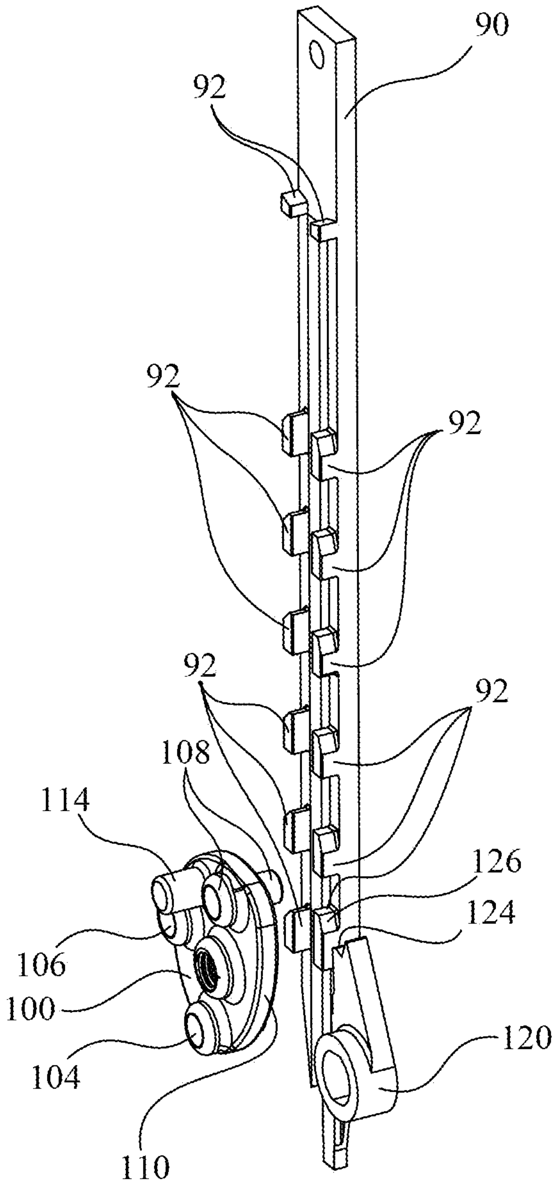
FIG. 7 is another perspective view from a different angle of the same components of FIG. 6.

When it is time to drive a fastener, the next action in the illustrated first embodiment is to cause the motor 40 to become energized once again. This occurs by two independent actions by the user: in some modes of the invention, these two independent actions can occur in either order. (There is also an optional "restrictive mode" of operation, in which the two independent actions must occur in a specific order.) These two actions are: pressing the nose 34 of the safety contact element 32 against a solid surface, and depressing the trigger actuator 54. The trigger actuator will cause the trigger switch 52 to change state, which is one condition that will start sending current to the motor 40. The safety contact element 32 has an upper arm 134 (see FIG. 8) that will be moved as the nose 34 is pushed into the tool 10, and this upper arm 134 will actuate another sensor which, in the illustrated embodiment, is a second limit switch 132 (see FIG. 8). When both of these actions are occurring simultaneously, current is delivered to the motor 40 which will once again turn the rotary-to-linear lifter 100 a short distance. Also, the controller will energize the solenoid 46, which will rotate the latch 120 a small angular distance clockwise (as seen in FIG. 5) to disengage the latch catching surface 124 from one of the teeth 92 of the driver 90. More specifically, this would be the "last" tooth 126 as seen in FIG. 5. Note that FIGS. 6 and 7 show details of the same structure depicted in FIG. 5 at different perspective angles.

It should be noted that the rotary motion of the lifter 100 will cause a small upward movement of the driver 90 so that the latch 120 can easily disengage from the "last" tooth 126 of the driver 90. Thus, there will not be a binding action that might otherwise cause the mechanism to jam.

Now that all this has occurred, the latch 120 is in its disengaged position so that its catching surface 124 will not interfere with any of the teeth 92 along the right-hand side (as seen in FIG. 5) of the driver 90; also the eccentric cam surface 110 is now facing the teeth 92 along the left-hand side (as seen in FIG. 5) of the driver 90, and none of the three "working" pins of the lifter will interfere with those left-hand teeth 92. Once the driver tooth "drops off" the last lifting pin 108, the driver 90 is quickly thrust downward in a linear stroke, due to the high gas pressure within the main storage chamber 74 and displacement volume 76. (This is the "gas spring" effect.) Along the way, the driver 90 will pick up a fastener that is waiting at the feeder carriage 64, and drive that fastener along the back plate 66 to the exit area at the bottom (at the area 30 on FIG. 1). After this action has occurred, the driver 90 will be situated at its lower-most position, as viewed in FIG. 3.

The pressure of the gas in the combined main storage chamber 74 and displacement volume 76 is sufficiently high to quickly force the driver 90 downward, and such pneumatic means is typically much faster than a nail driving gun that uses exclusively mechanical means (such as a spring) for driving a fastener. This is due to the "gas spring" effect caused by the high gas pressure within the main storage chamber 74 and displacement volume 76 that, once the driver is released, can quickly and easily move the driver 90 in a downward stroke.

As the driver 90 is being moved downward, the piston 80 and the movable piston stop 82 are forcing air (or possibly some other gas) out of the cylinder venting chamber 94 that is below the piston. This volume of air is moved through a vent to atmosphere 150, and it is desired that this be a low resistance passageway, so as to not further impede the movement of the piston and driver during their downward stroke. The gas above the piston is not vented to atmosphere, but instead remains within the displacement volume 76, which is also in fluidic communication with the main storage chamber 74.

One aspect of the present invention is to provide a rather large storage space volume to hold the pressurized gas that is also used to drive the piston downward during a driving stroke of the driver 90. There is a fluidic passage 152 between the upper portion of the cylinder and the main storage chamber 74. (In the illustrated first embodiment, the cylinder wall 70 does not extend all the way to the "top" cap 72.) It is preferred that the volume of the main storage chamber be larger than the total volume of the cylinder working spaces (i.e., the displacement volume) by a volumetric ratio of at least 2.0:1, and more preferably at least 3.0:1. This will allow for a powerful stroke, and a quick stroke.

The illustrated first embodiment of the present invention allows for both a quick firing (or driving) stroke time and also a fairly quick "lifting" time to bring the driver back to its upper position, ready for the next firing (driving) stroke. Both of these mechanical actions can sequentially occur in less than 340 milliseconds (combined time), and allow a user to quickly place fasteners into a surface. In one operating mode of the present invention, the human user can hold the trigger in the engaged position and quickly place a fastener at a desired location merely by pressing the nose (or "bottom") of the tool against the working surface to actuate the fastener driver and place the fastener. Then the user can quickly remove the fastener driver tool from that surface, and move it to a second position along the work surface, while still depressing the trigger the entire time, and then press the nose (or bottom) of the tool against the working surface at a different position, and it will drive a fastener at that "different" position. This is referred to as a "bottom fire" capability, and when using the illustrated embodiment it can occur virtually as fast as a human can place the tool against a surface, then pick up the tool and accurately place it against the surface at a different position, and thereby repeat these steps as often as desired until emptying the magazine of fasteners. This type of mode of operation will be discussed in greater detail below in connection with the logic flow chart starting at FIG. 13, with respect to the control system of the fastener driving tool 10.

Figure 8:
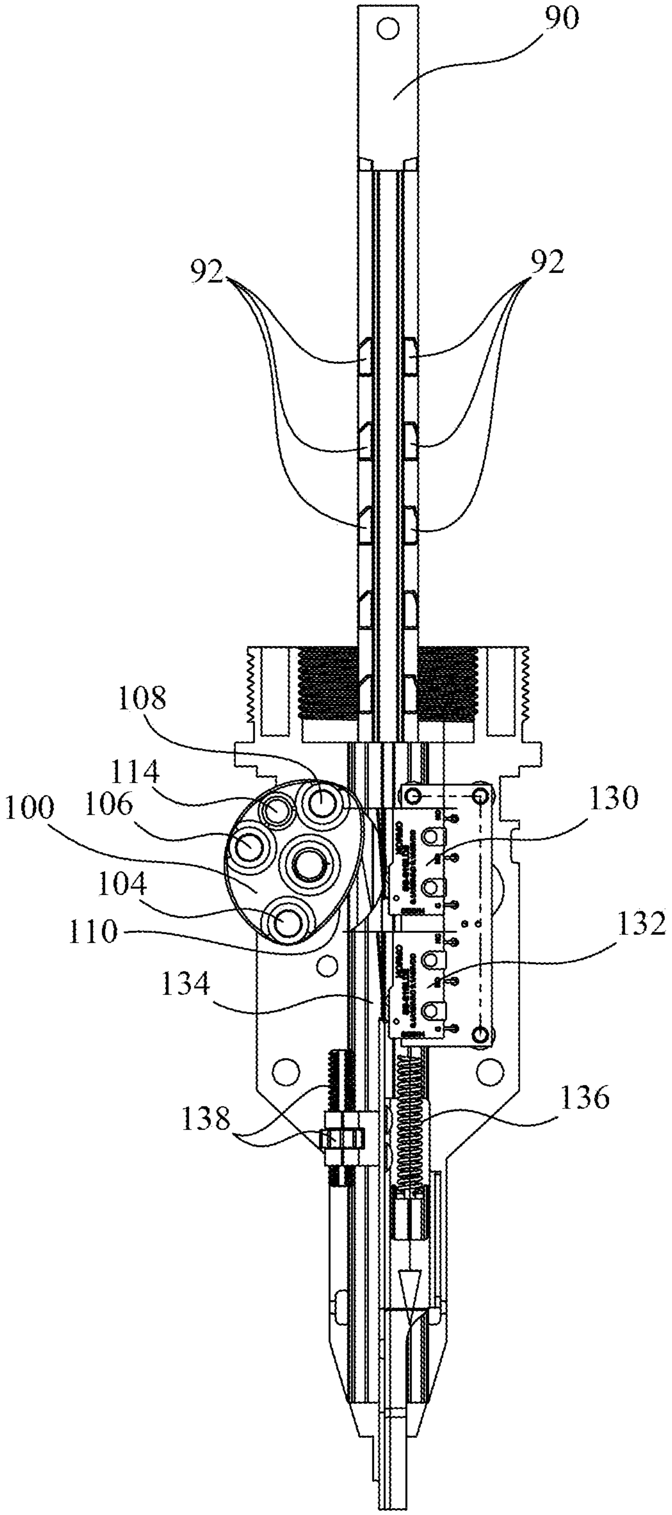
FIG. 8 is a side view in partial cross-section of major portions of the driving mechanisms for the first embodiment fastener driving tool of FIG. 1.

Referring now to FIG. 8, another side sectional view is provided that shows some of the elements beneath the latch and other portions of the first embodiment fastener driving tool 10. There are two electromechanical limit switches 130 and 132. The limit switch 130 detects movements of the fourth pin 114 of the rotary-to-linear lifter 100 (as noted above). The limit switch 132 detects movement of the upper arm 134, which is a portion of the safety contact element 32 that is pushed rearward (or "up" in these views) with respect to the overall tool 10 when the nose of the tool is pressed against a working surface. These limit switches provide electrical input signals to the controller, which is discussed below in greater detail. It will be understood that other types of sensors could be used instead of electromechanical limit switches, such as optoelectrical sensors, or magnetic sensors, including a Hall-effect switch, or even a metal-sensing proximity switch.

Also viewed on FIG. 8 is a return spring 136, which causes the safety contact element 32 to be pushed back downward (in this view) once the user releases the nose of the tool 10 from the working surface. In addition, there is a depth of drive adjustment at 138.

Figure 9:
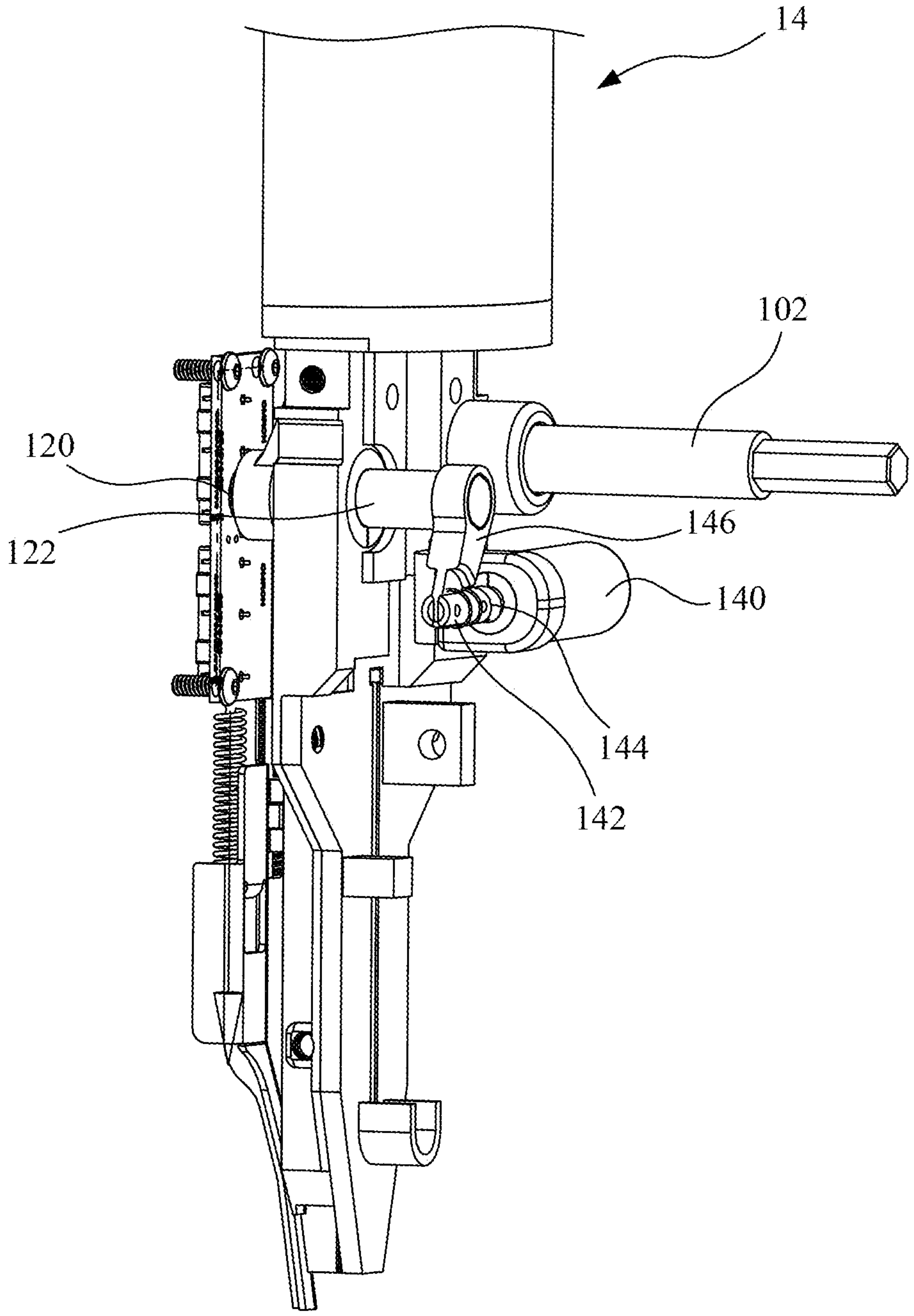
FIG. 9 is a perspective view mainly from the left side, but angled to better see the details of the latch mechanism including its solenoid, for the first embodiment fastener driving tool of FIG. 1.

Referring now to FIG. 9, further details of the solenoid are viewed. In FIG. 9, the solenoid 140 has a plunger 142 that will move linearly either in or out from the main coil body of the solenoid 140. When the solenoid is energized, it pulls the plunger 142 in toward the solenoid body 140, which rotates a solenoid arm 146 (part of the solenoids "linkage"), which in turn rotates the latch shaft 122 that also rotates the latch 120 a small arcuate distance. This causes the latch 120 to disengage from the teeth 92 of the driver 90. On the other hand, when the solenoid 140 becomes de-energized, the plunger will be pushed out by the plunger spring 144, which will rotate the solenoid arm 146 a short distance, and that in turn rotates the latch shaft 122 and the latch 120. This will tend to cause the latch to engage the teeth 92 along the right-hand side (as seen in FIG. 5) of the driver 90. However, since this is a spring action, the teeth 92 can slide against the surface of the latch 120 and move the latch out of the way if the teeth are attempting to move upward along with the driver 90. However, the spring action of the solenoid plunger spring will be strong enough to push the latch 120 into its engaged position, and any teeth 92 attempting to move downward will be caught by the catching surface 124 of the latch 120.

This "catching" action of the latch 120 has more than one benefit. In the first place, the latch holds the tooth 126 (which is the "bottom tooth" along the right-hand side of the driver as seen in FIG. 5) in place when the piston has been lifted to its top or "firing" position. The driver cannot be fired until the latch 120 is moved out of the way, as discussed above. On the other hand, if there is some type of jam or an improper use of the tool by a user such that the driver 90 does not totally complete its travel during a firing (driving) stroke, the latch 120 will also prevent a misfire from occurring at an inconvenient time.

More specifically, if the driver jams during a drive stroke, and if a person tries to clear the jam, and if there was no precaution taken to prevent the remainder of the stroke from occurring at that moment, then possibly an injury could occur when the driver 90 suddenly becomes released from its jammed condition. In other words, a fastener could be driven during the attempt to clear the jam, and that fastener would likely be directed somewhere that is not the original target surface. In the present invention, the latch 120 will have its solenoid 140 become de-energized once the jam occurs (because solenoid 140 will de-energize after a "timeout" interval occurs), and therefore the latch 120 will be engaged and the catching surface 124 will be in a position to interfere with the downward movement of the driver teeth 92. By use of this configuration, the driver could only move a short distance even if the jam was suddenly cleared, because the latch catching surface 124 will literally "catch" the "next" tooth 92 that unexpectedly comes along during a downward travel of the driver 90. This makes the tool much safer in situations where a complete driver stroke has not occurred.

The process for controlling the solenoid and the moments when the solenoid will either be energized or de-energized are discussed below in connection with the flow chart that begins on FIG. 13.

With respect to various types of firing (or driving) modes, a "trigger fire" mode is where the user first presses the tool nose against a working surface, and then depresses the trigger actuator 54. It is the trigger being depressed that causes the drive stroke to occur in this situation. With respect to a "bottom fire" mode, the trigger is actuated first, and then the user presses the nose of the tool against a work surface, and it is the work surface contact that causes the drive stroke to occur. As discussed above, the user can continue to hold the trigger down while pressing against and releasing the tool from the work surface multiple times, and obtain quick multiple firing strokes (or driving strokes), thereby quickly dispensing multiple fasteners into the working surface at various locations.

There is also an optional "restrictive firing mode," in which the nose of the tool must be first placed against a working surface before the trigger is pulled. If the sequence of events does not unfold in that manner, then the drive stroke will not occur at all. This is strictly an optional mode that is not used by all users, and certainly in not all situations.

With regard to alternative embodiments of the present invention, an exemplary fastener driving tool can be made with a main storage chamber volume of about twelve cubic inches and a cylinder displacement volume of about 3.75 cubic inches. This would provide a volumetric ratio of the main storage chamber versus the displacement volume of about 3.2:1. As discussed above, it is desirable for the volumetric ratio of the main storage chamber's volume to the displacement volume to be at least 2.0:1, and it could be much higher if desired by the fastener driving tool's designer.

The working pressure in the system could be around 120 PSIG, and should probably be at least 100 PSIG for a quick-firing tool. By the term "working pressure" the inventors are referring to the pressure in the displacement volume 76 (and main storage chamber 74) at the time the piston 80 is at its "ready" position, which is when it is at (or proximal to) its uppermost travel position as illustrated in FIGS. 2-5.

It should be noted that other gases besides air can be used for the main storage chamber and the displacement volume, if desired. While air will work fine in many or most applications, alternative gases could be used as the "charge gas," such as carbon dioxide or nitrogen gas. Moreover, the use of nitrogen gas can have other benefits during the manufacturing stage, such as for curing certain adhesives, for example.

In the illustrated first embodiment, there is no fill valve on the fastener driving tool 10 at the storage tank (main storage chamber) 74. This is a preferred mode of the present invention, although an optional fill valve could be provided, if desired by a tool designer. The design of the preferred mode of the present invention is such that the charge gas should not significantly leak from the tool, and therefore a fill valve would not be required.

Another feature of the present invention is that a variable stroke is possible by causing the rotary-to-linear lifter 100 to be rotated a multiple number of times to create a shorter or longer firing (driving) stroke, if desired. In the illustrated first embodiment, the lifter 100 makes a complete rotation two times to lift the piston from its lower-most position to its top-most position. This number of rotations of the lifter could be increased to three times or four times if desired, or even could be decreased to a single turn for a shorter stroke tool, if desired.

Another possible variation is to use a composite sleeve for the internal cylinder wall 70, which would make contact with the seals of the piston 86. In addition, the outer pressure vessel wall 78 could also be made of a composite material, if desired. The use of a carbon fiber composite, for example, would decrease weight, but would maintain the desired strength.

Figure 10:
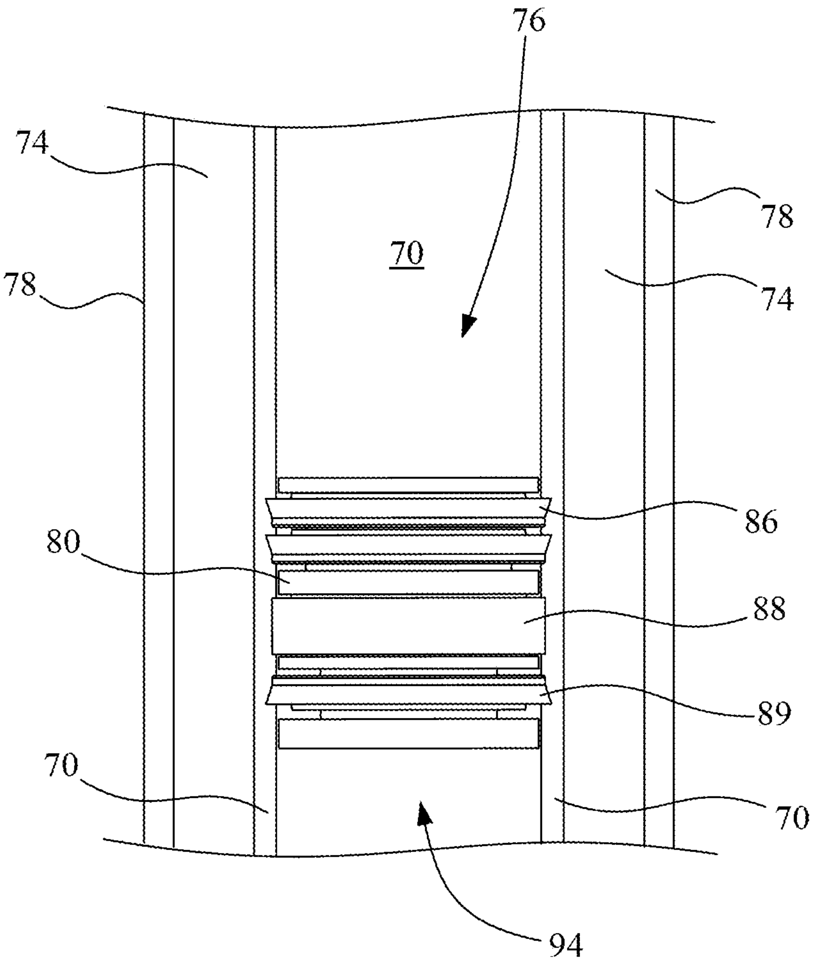
FIG. 10 is an elevational side view in cross-section of some of the details of the cylinder/piston components for the first embodiment fastener driving tool of FIG. 1.

Referring now to FIG. 10, some of the details of a first piston arrangement are illustrated in cross-section for one of the embodiments of the present invention. The piston is depicted at the reference numeral 80. A piston seal 86 is near the upper end (in this view) of the piston 80, and a piston scraper 89 is near the lower end (in this view) of the piston. A piston guide ring 88 is located at a central region of the piston, and essentially surrounds that middle portion of the piston.

Figure 11:
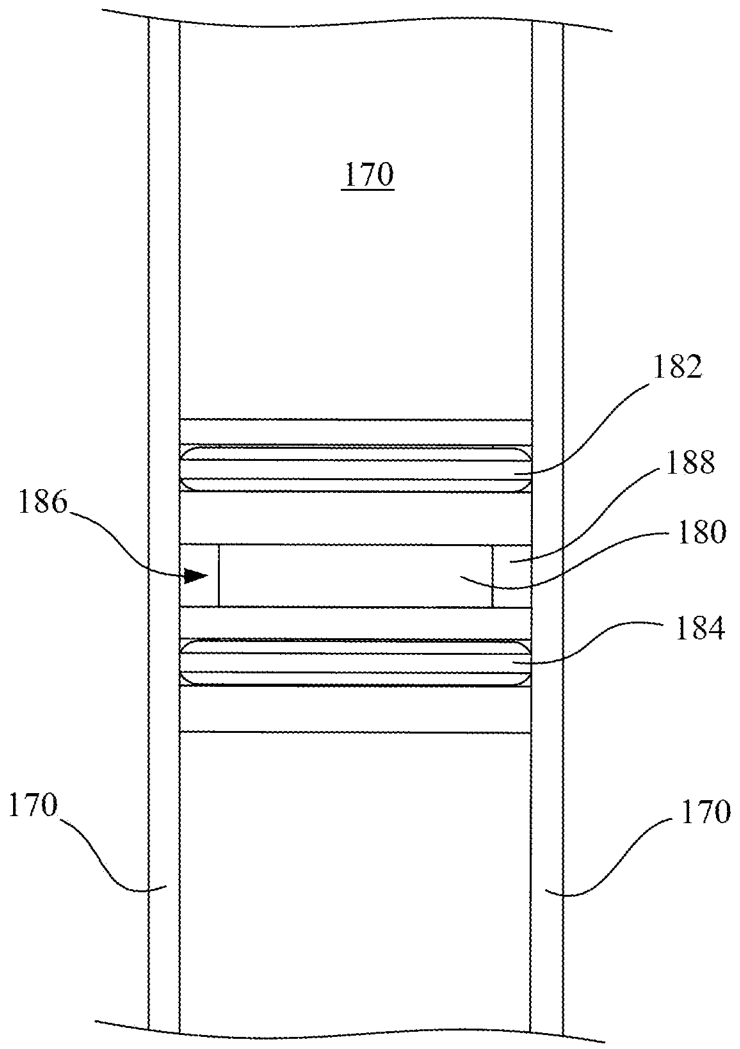
FIG. 11 is an elevational side view in cross-section of some of the details of the cylinder/piston components for an alternative embodiment that could be used with the first embodiment fastener driving tool of FIG. 1.

Referring now to FIG. 11, some of the details of a second piston arrangement are illustrated in cross-section for an alternative embodiment of the present invention. The second embodiment piston is designated by the reference number 180. There are upper and lower seals at 182 and 184, respectively. Between these seals is an annular space 186 that is at least partially filled with lubricating fluid, such as oil. This oil will tend to lubricate the movements of the piston 180 along the inner surface of the alternative cylinder wall 170. The seals 182 and 184 are designed to hold the oil 188 within the annular space 186 indefinitely, or at least to lose the oil only at a very slow rate.

Referring now to FIG. 12, the opposite side (compared to FIGS. 3-5) of the rotary-to-linear lifter 100 is illustrated. The three pins 104, 106, and 108 are directly seen in this view, and this is the "working side" of those three pins, which make contact with the teeth 92 of the driver 90. FIG. 12 shows the positional relationship of these three pins with respect to the lifter 100 and the center position for the lifter drive shaft 102, in an exemplary embodiment of the present invention. In addition, FIG. 12 shows the semi-circular outer shape of a first part of the perimeter of the lifter at 116, and the more elliptical outer shape of a second part of the perimeter of the lifter at 110, as discussed above. The outer shape of the perimeter portions (at 110 and 116) define an outer perimeter of a surface from which these pins 104, 106, and 108 protrude.

Figure 13A:
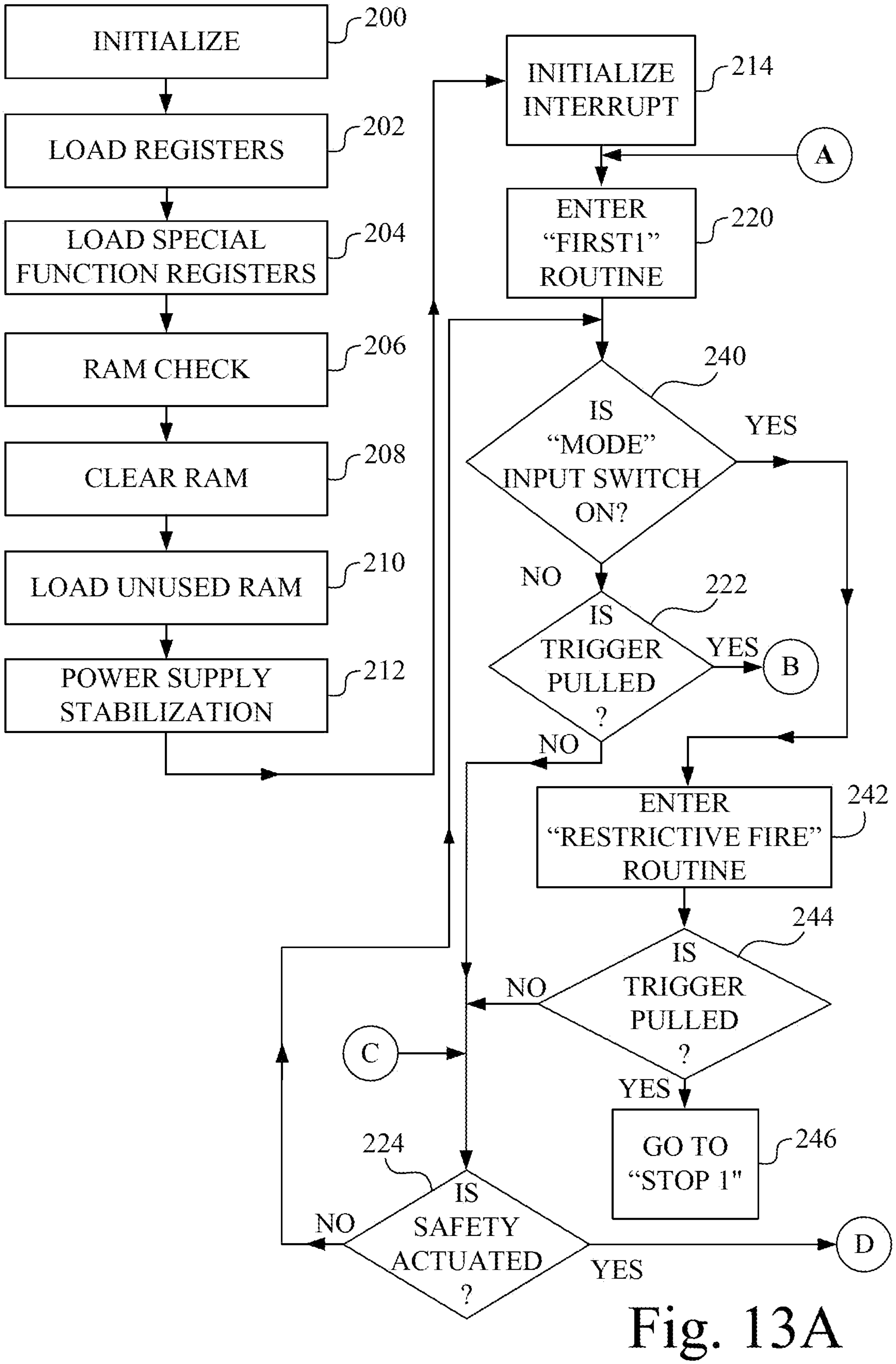
FIG. 13A and FIG. 13B (as a group, sometimes referred to hereinbelow as a "FIG. 13") are a first portion of a flow chart showing some of the important logical steps performed by the controller of the first embodiment fastener driving tool of FIG. 1.
Figure 13B:
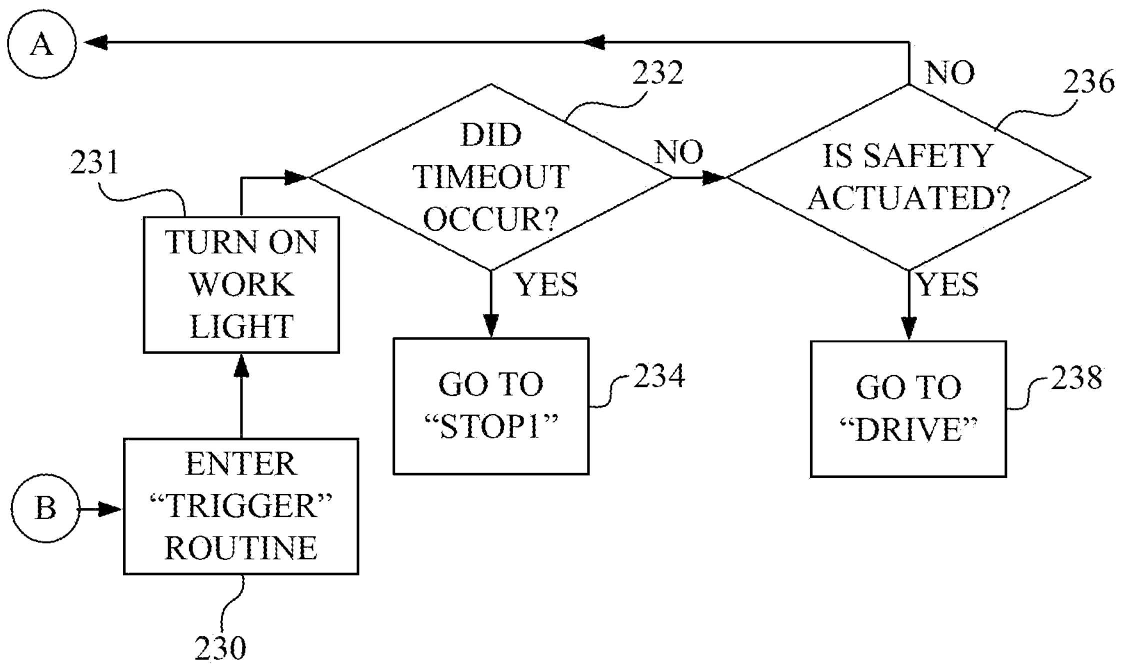
Figure 13B:
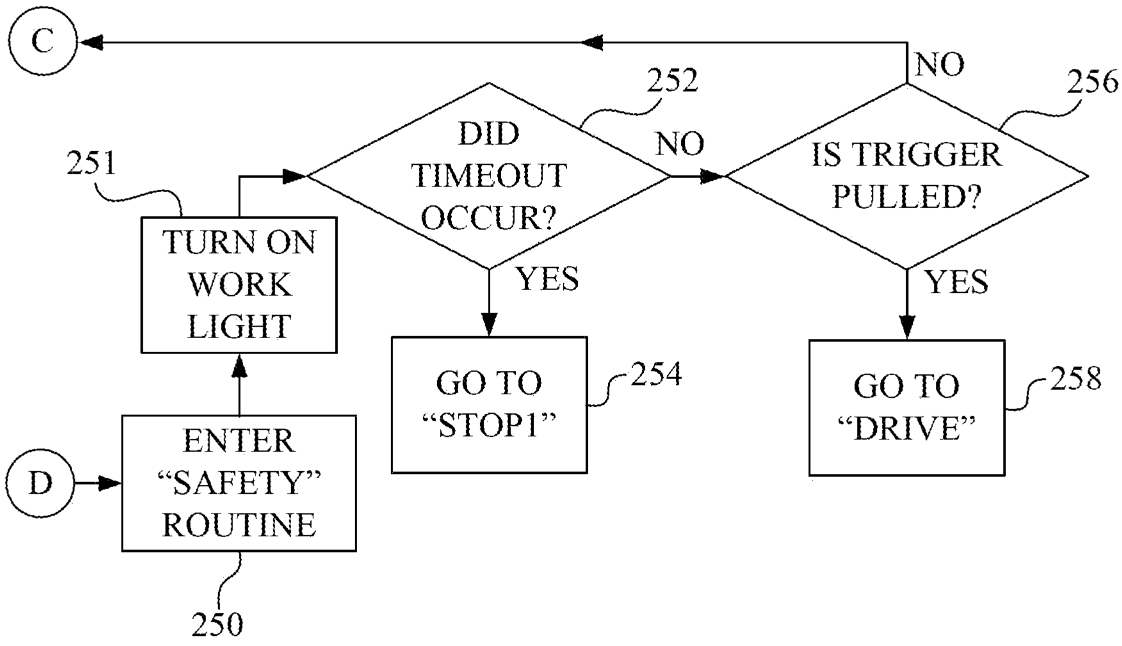

Referring now to FIG. 13, a logic flow chart is provided to show some of the important steps used by a system controller for the fastener driving tool 10 of the illustrated embodiment for the present invention. Starting at an initializing step 200, a step 202 loads registers with predetermined values, and a step 204 loads special function registers with predetermined values. A step 206 now "checks" the RAM (Random Access Memory) to be sure it is functioning properly, and then a step 208 clears the RAM. A step 210 now loads unused RAM with predetermined values, based on the software coding for the system controller (typically in firmware or hard-coded).

A step 212 now determines the stability of the system electrical power supply. And then a step 214 initializes the interrupts that will be used for the controller. The controller is now ready to enter into an operational routine.

At a step 220, the control logic enters a "FIRST 1" routine. A decision step 240 now determines whether or not a "mode" selector switch has been activated. (Note, this mode switch would typically be only an optional feature for a driving tool 10, and many tools will not include this mode switch at all.) If the answer is NO, then the logic flow is directed to a decision step 222. On the other hand, if the mode selector switch was turned "on," then the logic flow is directed to a step 242 in which the tool enters a "restrictive fire" routine. The logic flow is directed now to a decision step 244 that determines if the trigger has been pulled. If the answer is NO, then the logic flow is directed to a decision step 224. On the other hand, if the trigger has been pulled, then the logic flow is directed to a step 246 that will further direct the logic flow to the "STOP 1" function (or routine) at step 380 on FIG. 15. It should be noted that, in the "restrictive fire" mode of operation, the trigger cannot be pulled first; instead the nose of the fastener driving tool must be pushed against the solid surface before the trigger is pulled.

If the answer at step 240 was NO, the decision step 222 now determines whether or not the trigger has been pulled. If the answer is YES, the logic flow is directed to a step 230 in which the logic flow enters a "TRIGGER" routine. A step 231 turns on a "work light" which is a small electric lamp (e.g., an LED) that illuminates the workpiece where the fastener is to be driven.

Figure 15:
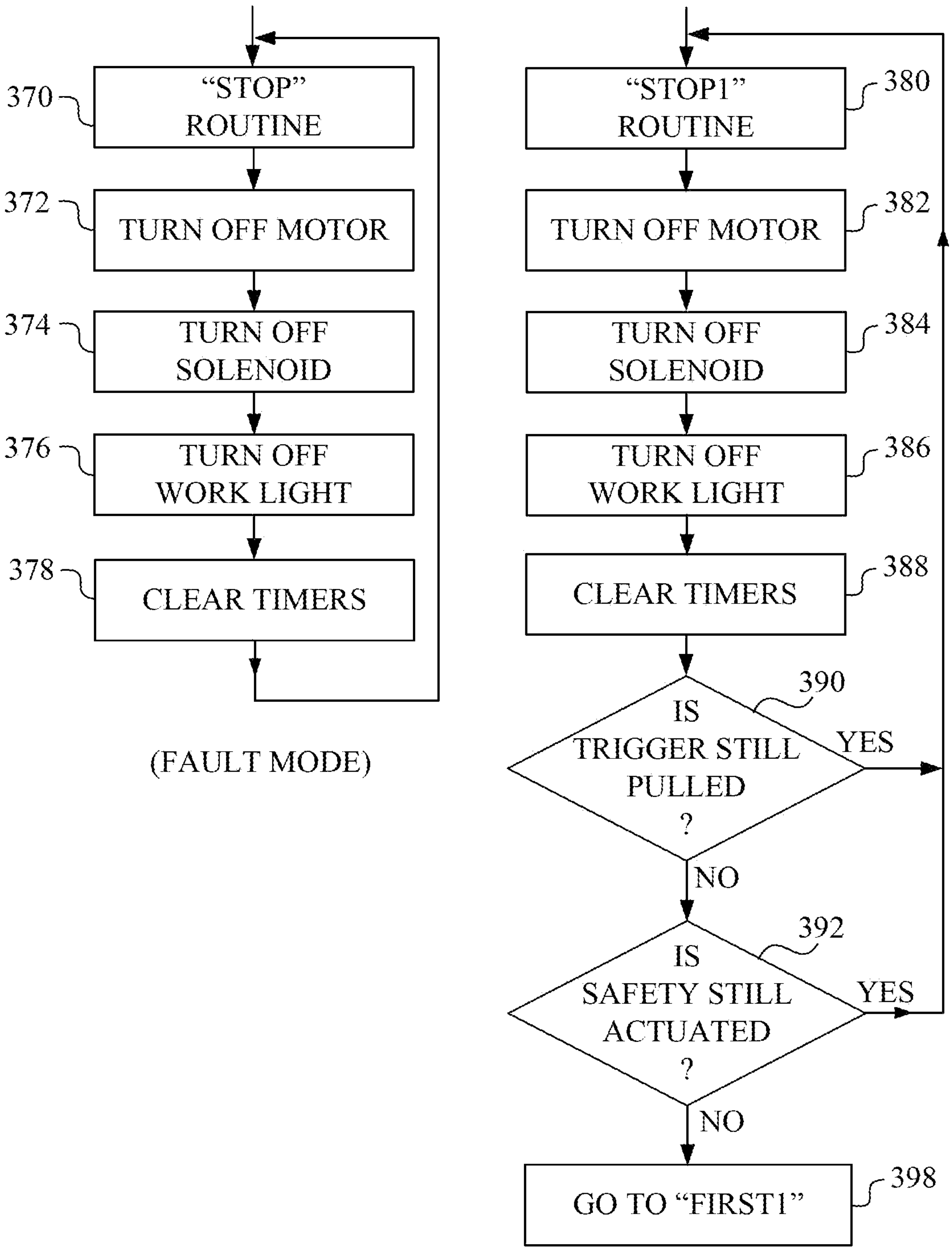
FIG. 15 is a third portion of the flow chart starting at FIG. 13A.

A decision step 232 now determines whether or not a predetermined timeout has occurred, and if the answer is YES, a step 234 directs the logic flow to a "STOP 1" routine, that is illustrated on FIG. 15 at a step 380. What this actually means is that a user pulled the trigger, but then did not actually use the tool against a solid surface, and rather than having the tool ready and primed to fire a fastener at any moment for an indefinite period of time, a predetermined amount of time will pass (i.e., the "timeout" interval), and once that has occurred, the system will be basically deactivated in the STOP 1 mode. This is not a permanent stoppage of the functioning of the tool, but is only temporary. Note that the "timeouts" are interrupt driven, in an exemplary embodiment of the present invention.

If the timeout has not occurred at decision step 232, then a decision step 236 determines if the safety has been actuated. If the answer is NO, then the logic flow is directed back to the FIRST 1 routine 220. On the other hand, if the safety has been actuated at step 236, then the logic flow is directed to a step 238 that will send the logic flow to a "DRIVE" routine, which is on FIG. 14 at a step 260. This will be discussed below in greater detail.

If, either at step 222 or step 244, the trigger was not yet pulled, then the logic flow is directed to the decision step 224. When the logic flow reaches decision step 224, the logic now determines whether or not the safety has been actuated. This step determines whether or not the safety contact element 32 has been pressed against a solid object to an extent that actuates the sensor (e.g., limit switch 132), which means that the tool is now pressed against a surface where the user intends to place a fastener. If the answer is NO, the logic flow is directed back to the mode switch query at decision step 240. However, if the answer is YES, the logic flow is directed to a step 250 in which the controller enters a "SAFETY" routine.

Once at the SAFETY routine at step 250, a step 251 turns on the "work light," which is the same lamp/LED that was discussed above in reference to step 231. A decision step 252 now determines whether or not a timeout has occurred, and if the answer is YES, the logic flow is directed to a step 254 that directs the logic flow to the "STOP 1" function at step 380 on FIG. 15. This temporarily stops the tool from operating. On the other hand, if the timeout has not yet occurred, the logic flow is directed to a decision step 256 that determines whether the trigger has been pulled. If the answer is NO, the logic flow is directed back to the decision step 224. On the other hand, if the answer is YES, the logic flow is directed to a step 258 that causes the tool to enter the "DRIVE" mode of operation at step 260 on FIG. 14.

As can be seen by reviewing the flow chart of FIG. 13, unless the tool 10 is in the restrictive fire mode (at step 242), the tool can be actuated with either one of the two important triggering steps occurring first: i.e., the trigger could be pulled before the safety is actuated, or vice versa.

Figure 14A:
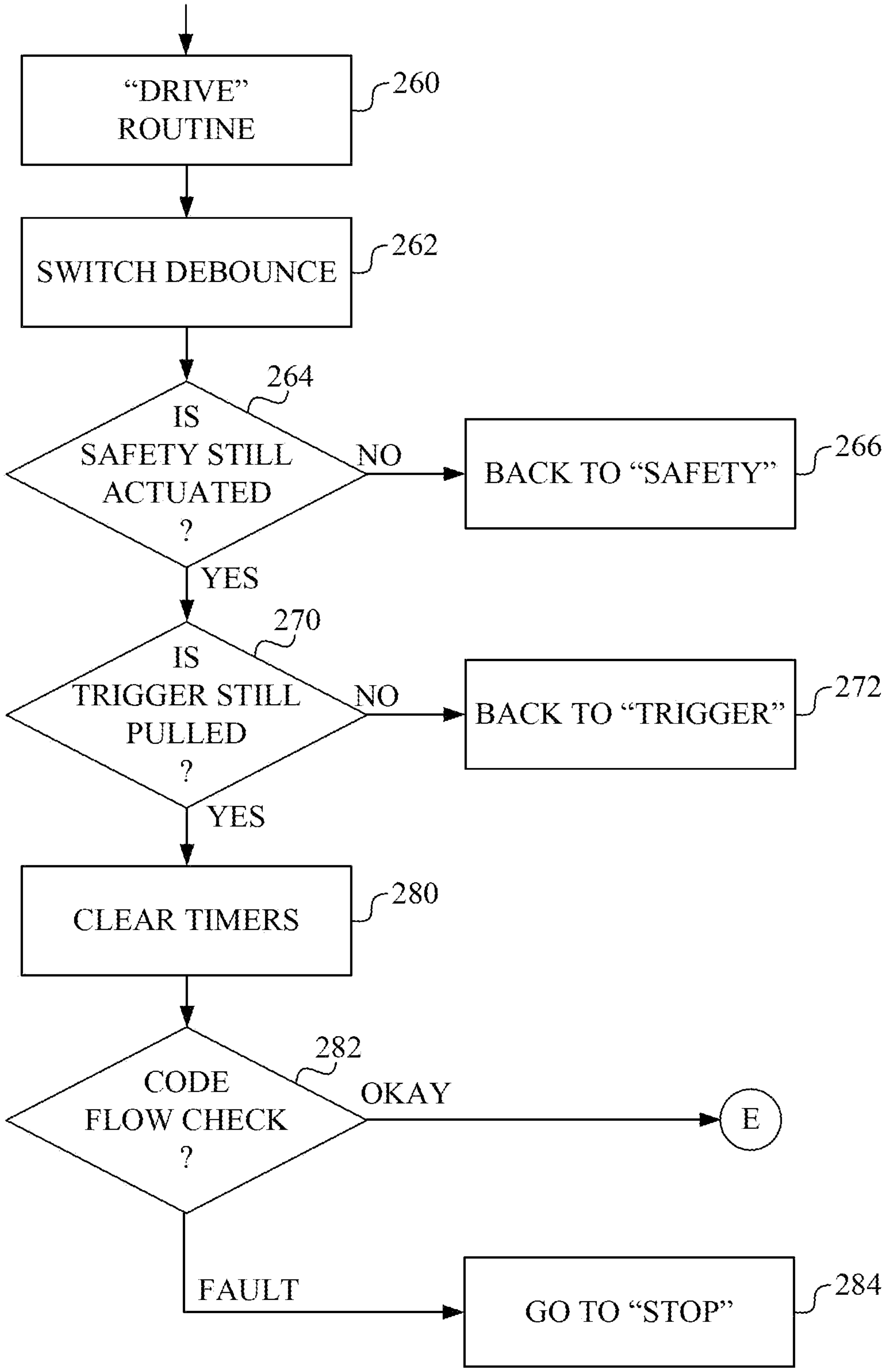
FIG. 14A, FIG. 14B, and FIG. 14C (as a group, sometimes referred to hereinbelow as a "FIG. 14") are a second portion of the flow chart starting at FIG. 13A.
Figure 14B:
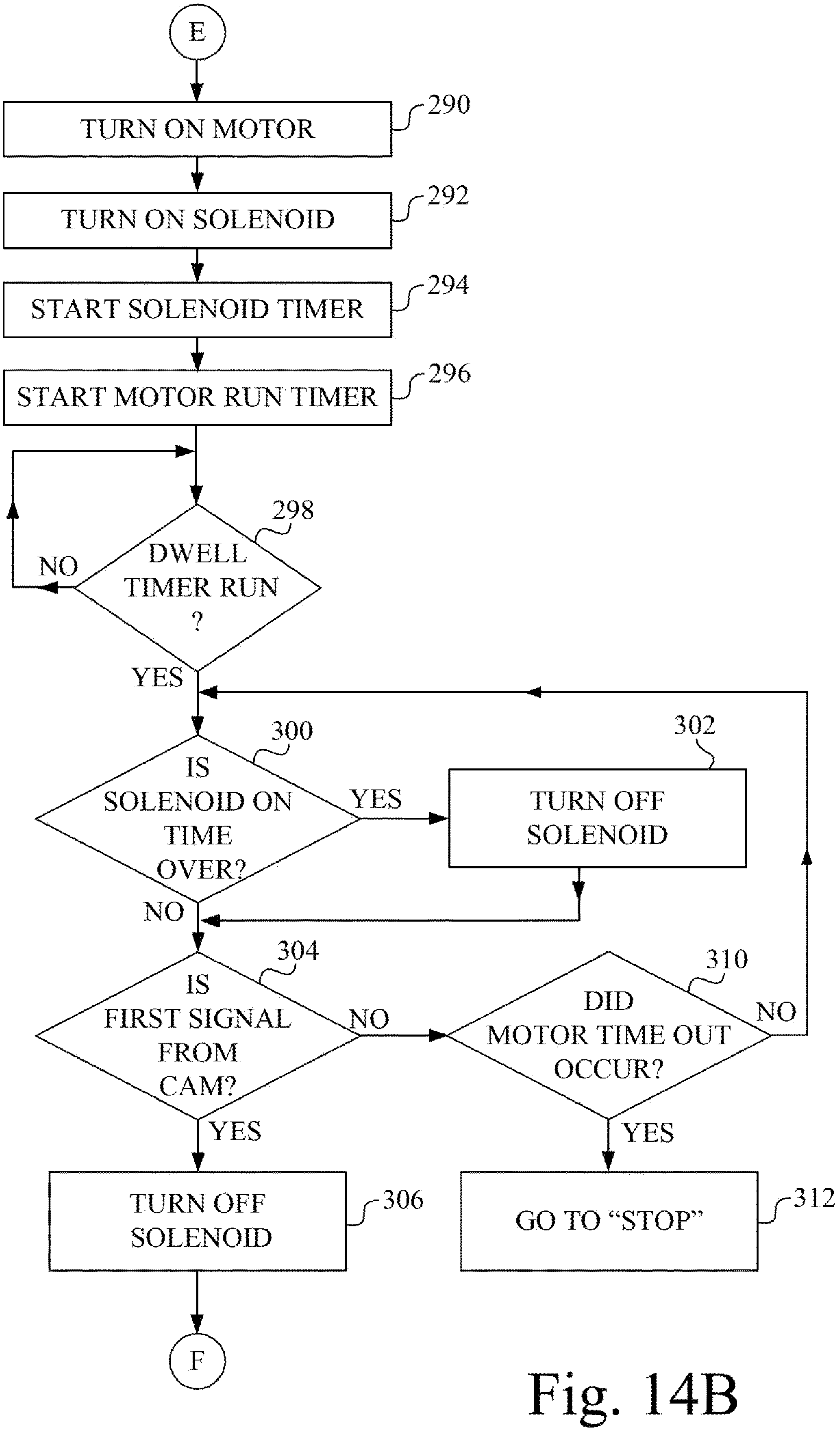
Figure 14C:
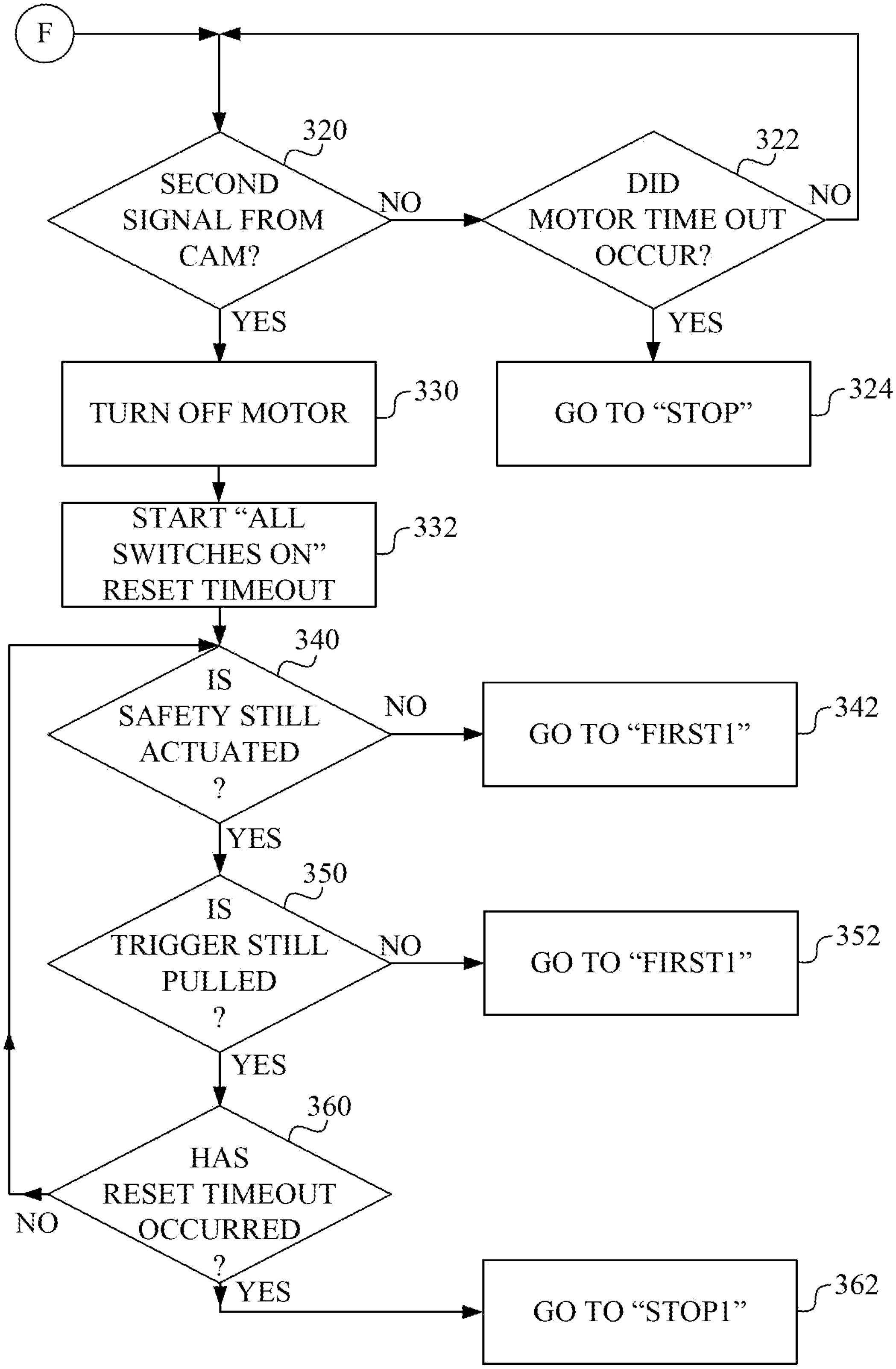

Referring now to FIG. 14, the logic flow from FIG. 13 is directed to the "DRIVE" routine 260 from two other steps on FIG. 13: these are step 238 and step 258. Once at the DRIVE routine 260, a switch debounce step 262 is executed to determine whether or not one or both of the triggering elements was somehow only actuated intermittently. If so, the system designers have determined that the tool should not operate until it is more certain that the input switches have actually been actuated. To do this, the logic flow is directed to a decision step 264 to determine if the safety is still actuated. If the answer is NO, then the logic flow is directed to a step 266 that sends the logic flow back to the SAFETY routine at step 250. On the other hand, if the safety still is actuated at step 264, then the logic flow is directed to a decision step 270 to determine if the trigger is still being pulled. If the answer is NO, then the logic flow is directed to a step 272 that sends the logic flow back to the TRIGGER routine at step 230.

On the other hand, if decision steps 264 and 270 are both answered affirmatively, then a step 280 clears the operational timers, and the logic flow is then directed to a decision step 282 that determines if the software code flow is within certain parameters. This is a fault-checking mode of the software itself, and if the system does not determine a satisfactory result, then the logic flow is directed to a step 284 that sends the logic flow to a "STOP" routine at a step 370 on FIG. 15. This will ultimately turn the tool off and require a safety inspection of the tool, or at least have the tool reset. However, the tool does not need to be completely disabled, and after the safety inspection and tool reset procedure, the tool will be ready to use again without being sent to a service center. In an exemplary mode of the invention, the code flow check step determines if a correct number resides in a register or memory location; this number is the result of being incremented at predetermined executable steps of the software for the system controller.

If the software code flow check is within acceptable parameters at decision step 282, then the logic flow is directed to a step 290 that turns on the motor, and then a step 292 that turns on the solenoid. A step 294 now starts the solenoid timer and a step 296 now starts the motor run timer. As will be discussed below, these timers will be periodically checked by the system controller to make sure that certain things have occurred while the solenoid is on and while the motor is running Otherwise, after a predetermined maximum amount of time, the motor will be turned off and the solenoid will be turned off due to these timers actually timing out, which should not occur if the tool is being used in a normal operation, and if the tool is functioning normally.

In addition to the solenoid and motor run timers discussed above, a "dwell timer" is used to allow the tool to begin its normal operation before any further conditions are checked. This is accomplished by a decision step 298 on FIG. 14, which causes the logic flow to essentially wait a short amount of time before continuing to the next logic steps.

Once the dwell timer has finished at step 298, the logic flow is directed to a decision step 300 that determines if the solenoid "on time" has been exceeded. If the answer is YES, the logic flow is directed to a step 302 that turns off the solenoid. This situation does not necessarily mean the tool is being misused or is not functioning properly, and therefore the logic flow does not travel to a "stop step" from the step 302. Instead, the logic flow is directed to a decision step 304, discussed below.

If the solenoid on time has not been exceeded, then the logic flow also is directed to the decision step 304, which determines if the cam limit switch has received a first signal. This is the limit switch 130 that detects the presence or absence of the fourth pin 114 of the lifter. If the tool of the illustrated embodiment is being used, the lifter 110 will make two complete rotations when lifting the driver and piston from their bottom-most positions to their top-most positions. Therefore, the cam limit switch 130 will receive two different signals during this lift. Step 304 determines if the first signal has occurred. If not, then a decision step 310 determines whether the motor timeout has occurred. If the answer is NO, then the logic flow is directed back to decision step 300. On the other hand, if the motor run timer has indeed timed out, then the logic flow is directed to a step 312 that sends the logic flow to a "STOP" routine at step 370. This would likely indicate that there is a problem with the tool, or a problem with the way the user is attempting to operate the tool.

Referring back to decision step 304, if the first signal from the cam has occurred, then the logic flow is directed to a step 306 that turns off the solenoid. This will allow the latch 120 to engage the teeth 92 of the driver 90, in case there has been some type of jam, or other type of unusual operation while the driver and piston are being lifted. It also allows the latch 120 eventually to properly engage the bottom-most tooth 126 of the driver, which is the normal operation once the driver and piston have been raised to their top-most (or firing) position.

The logic flow is now directed to a decision step 320 that determines whether a second signal has been received from the cam limit switch. If the answer is NO, then the logic flow is directed to a decision step 322 that determines whether or not the motor run timer has timed out. If the answer is NO, then the logic flow is directed back to decision step 320. On the other hand, if the motor timer has timed out, the logic flow is directed to a step 324 that directs the logic flow to the "STOP" routine at 370, and indicates that there is some type of problem.

Once decision step 320 determines that the second signal from the cam has been received, then the logic flow is directed to a step 330 that turns off the motor, then to a step 332 that starts a "reset" timeout referred to as "all switches on." In this mode, it is either assumed that both the actuation (input) devices are still actuated, or at least that the controller needs to make an examination of those input devices to see what the proper status of the tool should be. Accordingly, the logic flow is directed to a decision step 340 that determines if the safety is still actuated. If the answer is NO, then the logic flow is directed to a step 342 that then sends the logic flow to the "FIRST 1" routine at step 220 on FIG. 13. On the other hand if the safety is still actuated, the logic flow is directed to a decision step 350 that determines if the trigger is still pulled. If the answer is NO, then the logic flow is directed to a step 352 that also directs the logic flow to the "FIRST 1" step at 220 on FIG. 13. Finally, if the trigger is still pulled, then a decision step 360 determines whether or not a "reset" timeout has occurred, and if the answer is YES, the logic flow is directed to a step 362 that sends the logic flow to the "STOP 1" routine at step 380 on FIG. 15. If the reset timeout has not yet occurred at step 360, then the logic flow is directed back to the decision step 340 and the inspection of all of the switches will again be performed.

The logic flow is continued on FIG. 15, in which there are two different types of stop routines. The routine called "STOP" at step 370 will first turn off the motor at a step 372, turn off the solenoid at a step 374, and turn off the work light at a step 376. The STOP routine will then clear the timers at a step 378. The logic flow then becomes a "DO-Loop," and continues back to the STOP routine at step 370. This is a fault mode, and the tool must be inspected. As a minimum, it needs to be reset to terminate the DO-Loop processing of the software, which means that the battery must be disconnected from the tool. If the user has been using the tool properly, this may be an indication that there is some operational problem with the tool itself, or that a fastener perhaps has jammed somewhere in the tool and the operator did not notice that fact.

The other type of STOP routine is the "STOP 1" routine at step 380. Once that occurs, a step 382 turns off the motor, turn off the solenoid at a step 384, and turn off the work light at a step 386. The STOP 1 routine will then clear the timers at a step 388, and a decision step 390 determines whether or not the trigger is still pulled. If the answer is YES, then the logic flow is directed back to the STOP 1 routine at step 380. If the trigger is not pulled at step 390, the logic flow is then directed to a decision step 392 that determines if the safety is still actuated. If YES, the logic flow is directed back to the STOP 1 routine at step 380. However, if the safety is not actuated, the logic flow is directed to a step 398 that sends the logic flow to the "FIRST 1" routine at step 220 on FIG. 13. At this point, the tool has been successfully used, and is ready for the next firing (driving) actuation.

Figure 16:
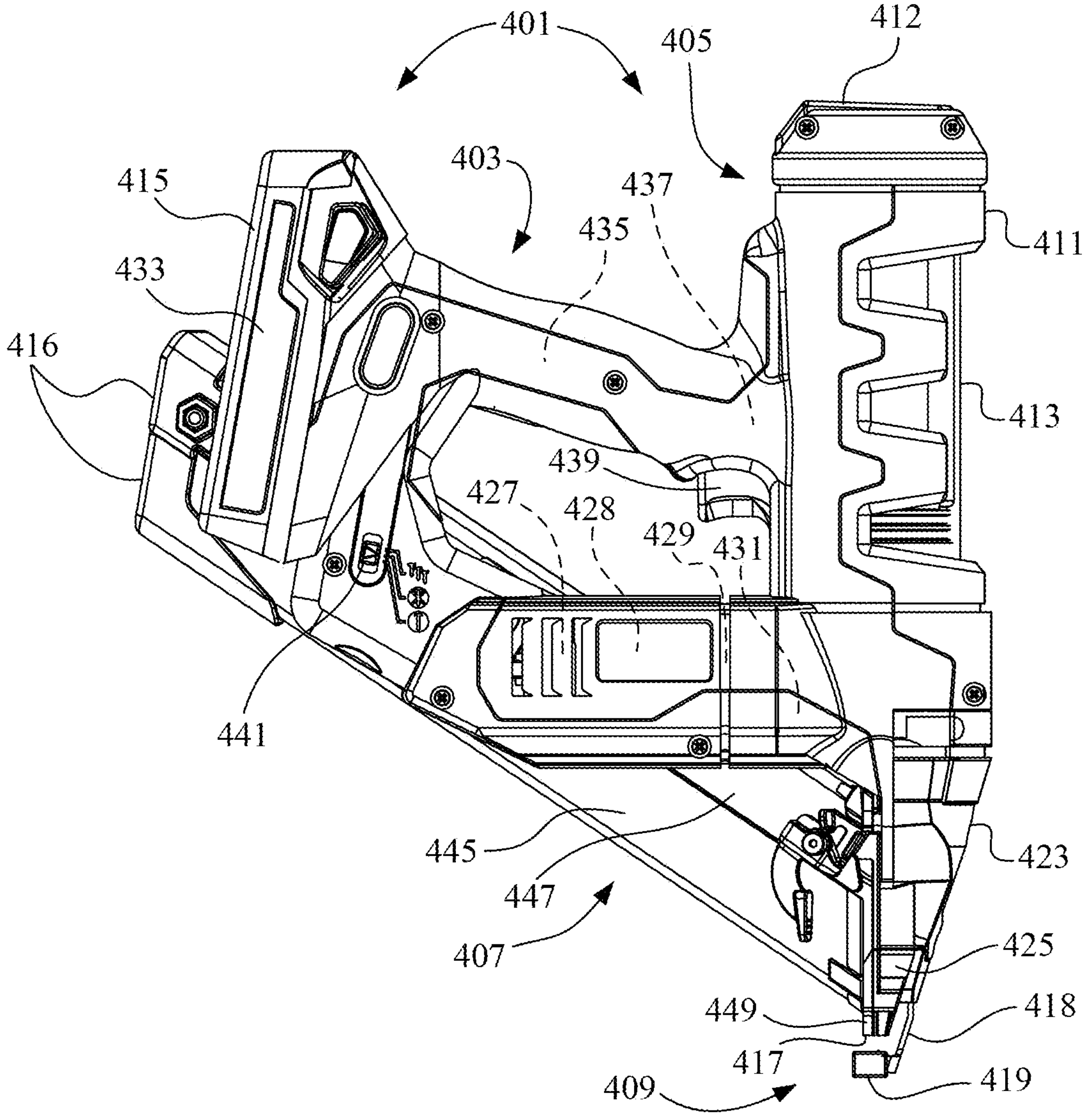
FIG. 16 is a side, elevational view of a second embodiment of a fastener driving tool constructed according to the principles of the present invention.

Referring now to FIG. 16, a second embodiment of a fastener driving tool is generally designated by the reference numeral 401. Tool 401 is mainly designed to linearly drive fasteners such as nails and staples. Tool 401 includes a handle portion 403, a fastener driver portion 405, a fastener magazine portion 407, and a fastener exit portion 409.

A "right" outer cover or "housing" of the driver portion is indicated at 411. A "top" cover is indicated at 412, while a "front" outer cover of the driver portion is indicated at 413. A "rear" cover for the handle portion is indicated at 415 (which is also the battery pack cover), while a "rear" cover of the magazine portion is indicated at 416. It will be understood that the various directional nomenclature provided above is with respect to the illustration of FIG. 16, and the second embodiment fastener driving tool 401 can be used in many other angular positions, without departing from the principles of the present invention.

The area of the second embodiment tool 401 in which a fastener is released is indicated approximately by the reference numeral 417, which is the "bottom" of the fastener exit portion of tool 401. Before the tool is actuated, a safety contact element 418 extends beyond the bottom 417 of the fastener exit, and this extension of the safety contact element is depicted at 419, which is the bottom or "front" portion of the safety contact element. Other elements that are depicted in FIG. 16 include an upper guide body 421 and a front cover 423; the upper guide body generally is in mechanical communication with the magazine portion 407.

Figure 18:
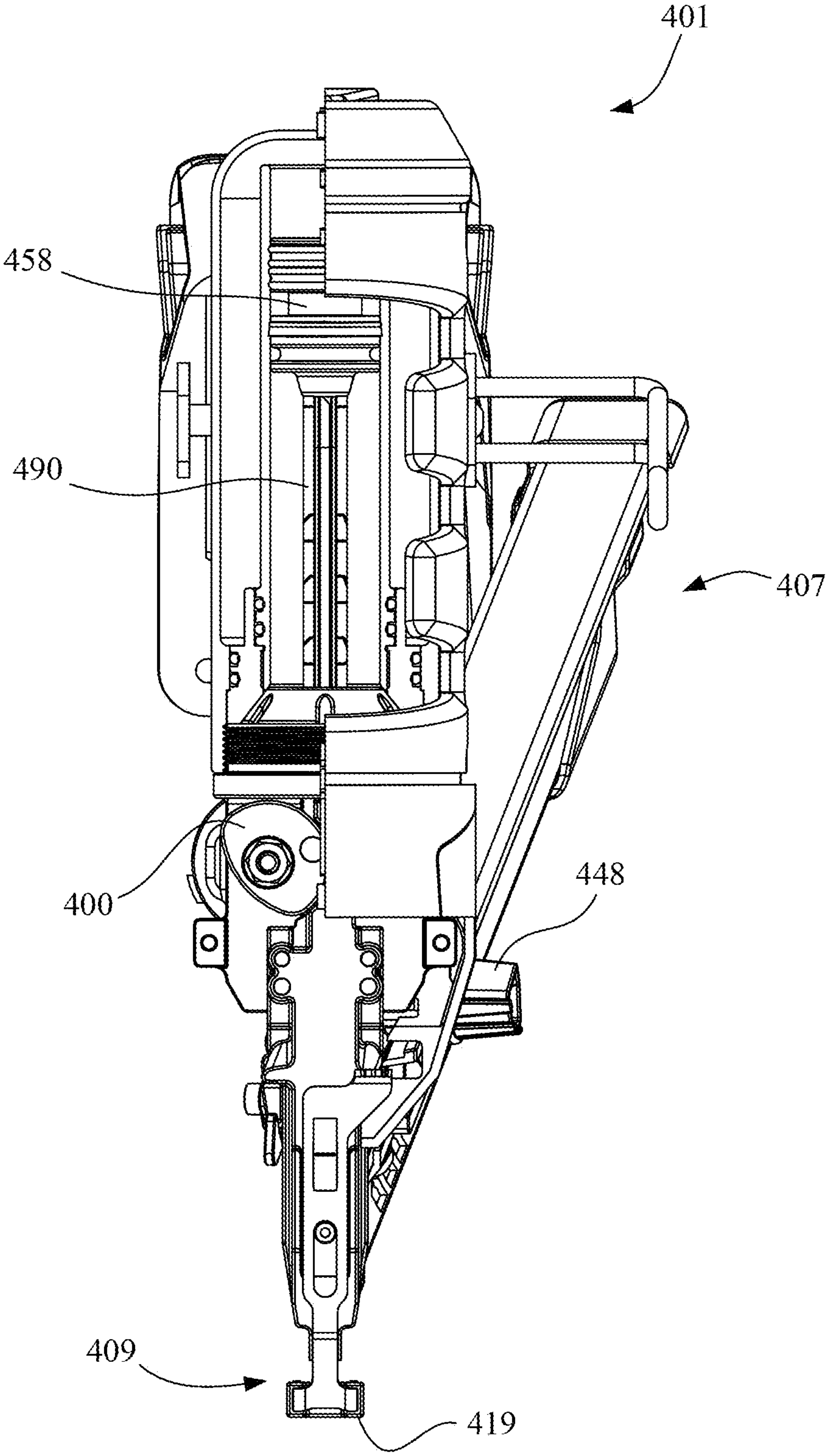
FIG. 18 is a front, elevational view in partial cross-section of the second embodiment fastener driving tool of FIG. 16.

Reference numeral 445 indicates a magazine housing, while reference numeral 447 indicates a fastener track through which the individual fasteners run while they remain within the magazine portion 407. A feeder carriage 448 (see FIG. 18) is used to feed an individual fastener from the magazine into the drive mechanism area, and a back plate 449 is used to carry an individual fastener while it is being driven. In the illustrated embodiment, the feeder carriage 448 positions a fastener to a position within the upper guide body 421 that is coincident with the path of the driver member 490 (see FIG. 20), so that when the driver 490 moves through a driving stroke, its driving end will basically intercept the fastener and carry that fastener to the exit end of the tool 401, essentially at the bottom portion 417 of the tool's exit area.

Figure 17:
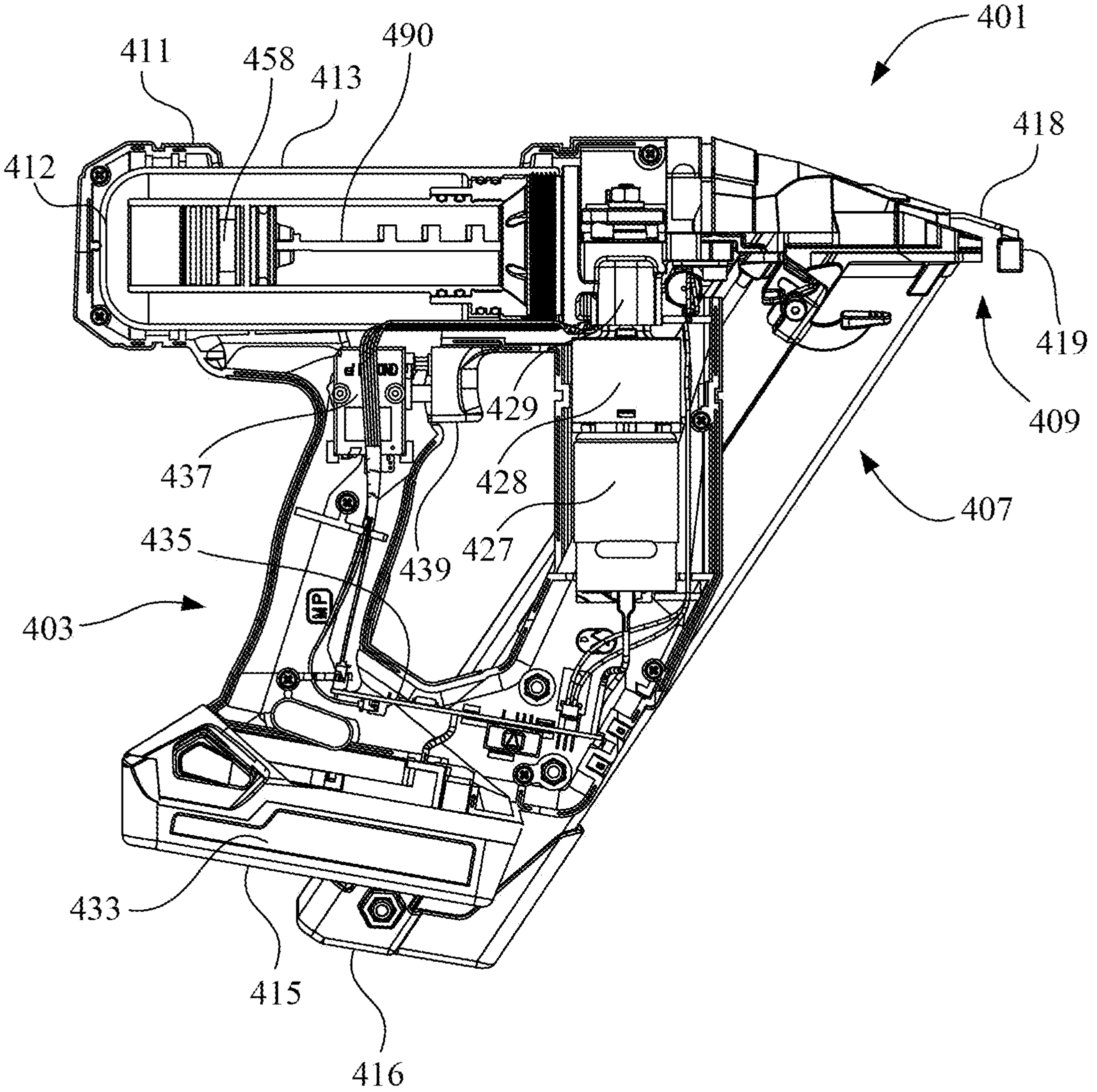
FIG. 17 is a side view in partial cross-section of the second embodiment fastener driving tool of FIG. 16.

The second embodiment fastener driving tool 401 also includes a motor 427 (see FIG. 17) which acts as a prime mover for the tool, and which has an output that drives a gearbox 428 (see FIG. 17). An output shaft 429 (see FIG. 17) of the gearbox drives a lifter drive shaft 402 (see FIG. 27). A solenoid 431 (see FIG. 17) is included in tool 401, and further details of its operation are discussed below. A battery 433 is attached near the rear of the handle portion 403, and this battery provides electrical power for the motor 427 as well as for a control system.

A printed circuit board (see FIG. 17) that contains a controller is generally designated by the reference numeral 435, and is placed within the handle portion 403 in this embodiment. A trigger switch 437 (see FIG. 17) is activated by a trigger actuator 439. As can been seen by viewing FIG. 16, the handle portion 403 is designed for gripping by a human hand, and the trigger actuator 439 is designed for linear actuation by a person's finger while gripping the handle portion 403. Trigger switch 437 provides an input to the control system 435.

A three-position selector switch, acting as a "mode" control switch, is mounted on tool 401 at 441. This switch 441 allows the user (the tool's operator) to select an operating "Mode A" or an operating "Mode B", or to turn the tool OFF. These operating modes are described in detail below, and in conjunction with logic flow charts in the drawings.

There also are one or more light-emitting diodes (LEDs) 443 mounted on tool 401, which provides an indication as to certain functions of the tool. This is described below in greater detail, in the description of the logic flow charts. There are also other input devices for the controller, however those input devices are not seen in FIG. 16.

The controller at 435 will typically include a microprocessor or a microcomputer device that acts as a processing circuit. At least one memory circuit will also typically be part of the controller, including Random Access Memory (RAM) and Read Only Memory (ROM) devices. To store user-inputted information (if applicable for a particular tool model), a non-volatile memory device would typically be included, such as EEPROM, NVRAM, or a Flash memory device.

Figure 19:
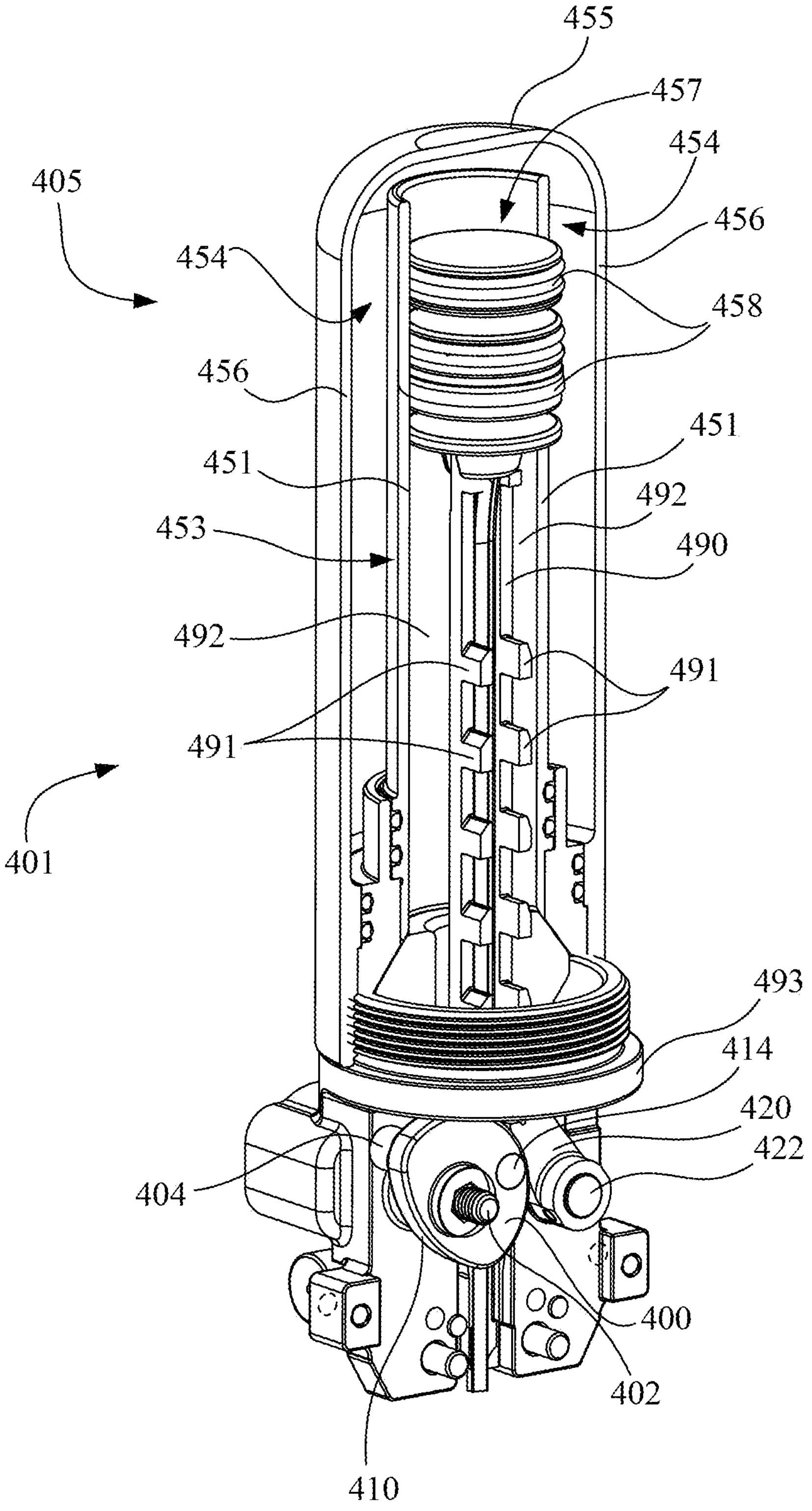
FIG. 19 is a perspective view mainly from the side, but also from above, and in partial cross-section, of the gas spring cylinder mechanism of the second embodiment fastener driving tool of FIG. 16.
Figure 20:
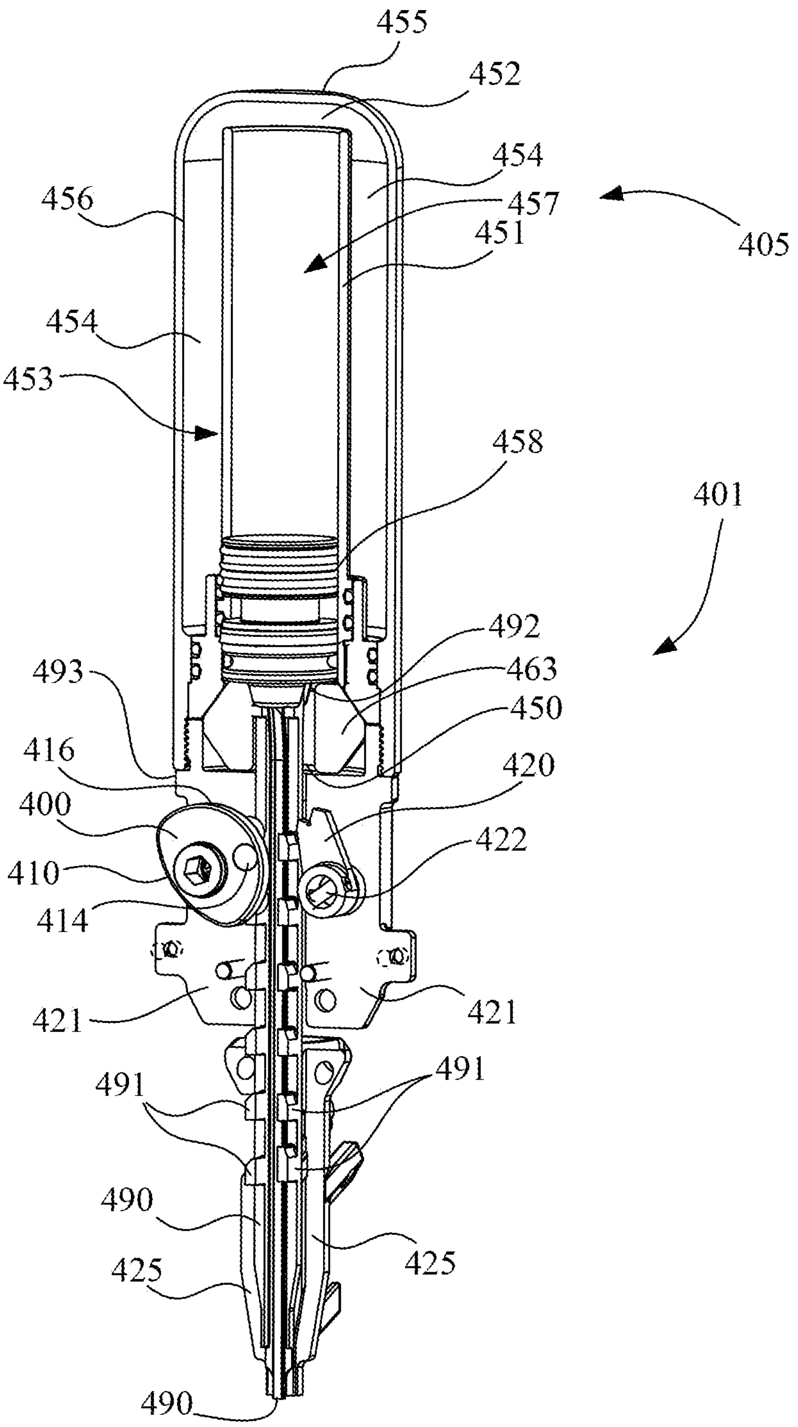
FIG. 20 is another perspective view from the side and somewhat from above and in partial cross-section of the gas spring cylinder portion of the second embodiment fastener driving tool of FIG. 16, better showing the driver mechanism, with the piston at its lowest "driven" position.
Figure 28:
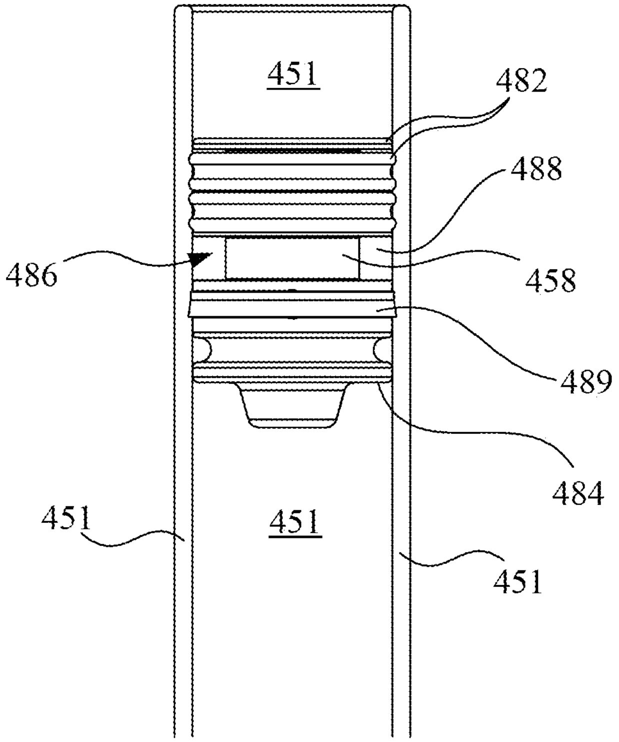
FIG. 28 is an elevational side view in cross-section of some of the details of the cylinder/piston components for the second embodiment fastener driving tool of FIG. 16.
Figure 29:
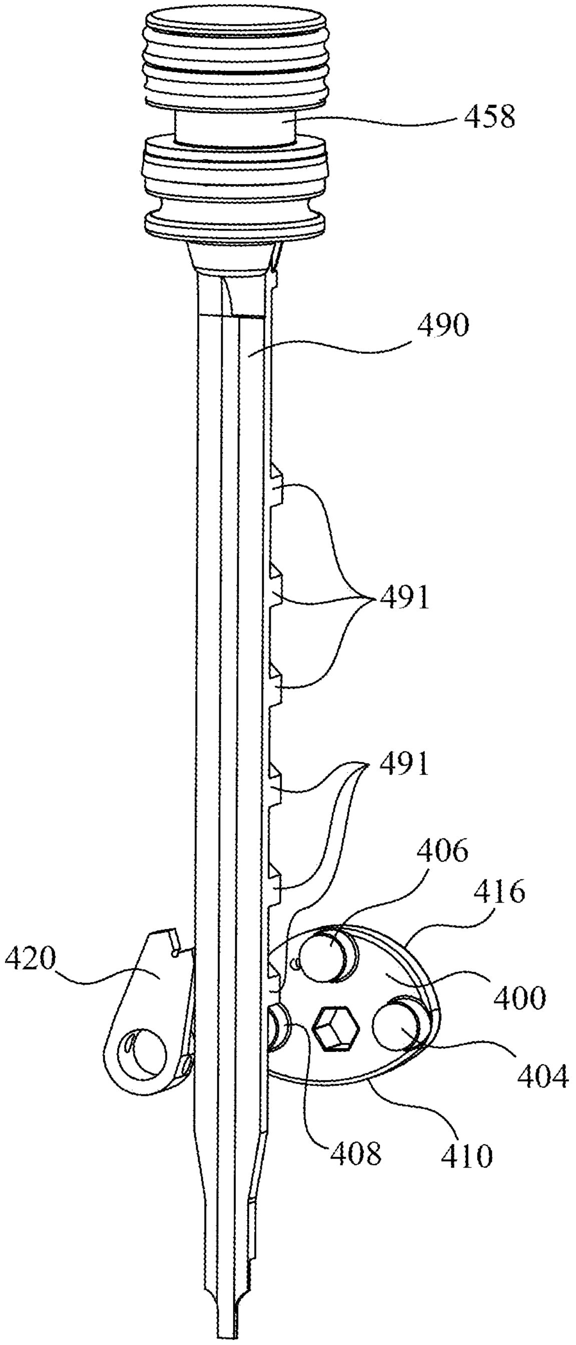
FIG. 29 is a perspective view from the opposite side of the rotary-to-linear lifter, used in the second embodiment fastener driving tool of FIG. 16.

Referring now to FIGS. 19 and 20 (which are similar to FIGS. 2 and 3), a working cylinder subassembly is designated by the reference numeral 453, and this is included as part of the fastener driver portion 405. The working cylinder 453 includes a cylinder wall 451, and within this cylinder wall 451 is a movable piston 458. Further details of this piston arrangement are illustrated in FIG. 28, described below. Surrounding the cylinder wall 451, in the illustrated second embodiment, is a main storage chamber 454 (also sometimes referred to herein as a "pressure vessel storage space") and an outer pressure vessel wall 456 (which corresponds to the "front" cover 413 of FIG. 16, along the right portion of this view). At the top (as seen in these views) of the fastener driver portion 405 is an upper end portion at 455 for the cylinder mechanism.

Also within the fastener driver portion 405 are mechanisms that will actually drive a fastener into a solid object. This includes a driver 490, a cylinder "venting chamber" 492 beneath the piston 458 (which would typically always be at atmospheric pressure), a driver track (not seen in this view; however, see FIG. 21 at 494), a rotary-to-linear lifter 400, and a latch 420. The driver 490 is also sometimes referred to herein as a "driver member" and the rotary-to-lifter 400 is also sometimes referred to herein as a "lifter member," or simply as a "lifter." Driver 490 is rather elongated, and as an individual element can best be seen in FIGS. 23 and 24. There are multiple "teeth" 491 that are positioned along the driver. In the illustrated embodiment, these teeth 491 are spaced-apart not only in a transverse direction from the elongated centerline of driver 490, but they are also spaced-apart from one another along the outer longitudinal edges of the driver 490. The positions of teeth 491 are clearly illustrated in FIG. 24.

It will be understood that the precise positions for the teeth 92 and 491 could be different from those illustrated for the driver 90 or 490, without departing from the principles of the present invention. It will also be understood that the precise shapes of teeth 92 and 491 could be different from those illustrated for the driver 90 or 490, without departing from the principles of the present invention. It will be further understood that the longitudinal edges of the driver elements 90 and 490 do not necessarily have to be linear or straight, although a straight edge is probably the simplest to construct and use. Moreover, the longitudinal edges of the driver elements 90 and 490 do not necessarily need to be parallel to one another, or parallel to the longitudinal axis of the driver itself, although again, such parallel construction is probably the simplest to build and use.

There is a cylinder base 493 that mainly separates the gas pressure portions of the fastener driver portion 405 from the mechanical portions of that driver portion 405. The venting of air from the cylinder venting chamber 492 passes through the cylinder base 493, as seen at a vent 450 on FIG. 20. The mechanical portions of FIG. 20 begin with a rotary-to-linear lifter 400 which was briefly mentioned above, along with a lifter drive shaft 402. Drive shaft 402 protrudes through the center portions of the fastener driver portion 405 and through the center of the lifter 400, and this shaft is used to rotate the lifter, as desired by the control system. (See also FIG. 27.)

Lifter 400 can be designed with an entirely circular outer perimeter, or it can have a different shape. In the first embodiment of FIGS. 1-12, lifter 100 was arcuate and portions of its perimeter exhibited an eccentric shape of a cam (see FIG. 2). A portion of the lifter's outer perimeter was mainly circular for about half of a circle (designated by the reference numeral 116), but the other half of the lifter's outer perimeter was more eccentric, which provided an elliptical surface (designated by the reference numeral 110). In the second embodiment of FIGS. 16-29, the outer shape of lifter 400 is still illustrated as half-circular and half-eccentric. However, it will be understood that the lifter's exact outer shape is not important, so long as it provides a base to hold in place certain protrusions (or "pins") that will make physical contact with teeth on the driver 490, but in a manner that creates a discontinuous contact surface with those teeth. This will be discussed below in greater detail. (See, for example, FIGS. 30-33.)

The rotary-to-linear lifter 400 includes three cylindrical protrusions (or "extensions") that will also be referred to herein as "pins." The first such pin ("pin 1") is designated 404, the second pin ("pin 2") is designated 406, while the third pin ("pin 3") is designated 408. (See, FIG. 29.) These pins are mainly not visible on FIG. 19, since they face away from the viewer of this FIG. 19.

It should be noted that FIGS. 19 and 20 do not show a "boss portion" of the three pins 404, 406, and 408, (as did pins 104, 106, and 108 on FIG. 3), since such boss portions of the pins 404, 406, 408 are not entirely necessary for the proper functioning of the rotary-to-linear lifter 400. Instead, the surface of the lifter 400 may be perfectly smooth (e.g., flat) at those locations rather than exhibiting a "boss."

It should be understood that the "working side" of these three pins 404, 406, and 408 is on the opposite side of the lifter 400 in the view of FIG. 20. When discussing these pins 404, 406, and 408 with respect to FIG. 20 in this written description, it is with reference to the non-protruding side of those pins; however, the effects of the "working side" of those pins is discussed in some detail with respect to other structures that are also illustrated on FIGS. 20-25.

It should also be noted that pins 404, 406, and 408 are illustrated as having circular cross-sectional shapes, which is desirable for this embodiment, although other cross-sectional shapes could instead be used without departing from the principles of the present invention. For example, the pins could have a smooth arcuate outer surface along the portions that will come into contact with the protrusions or "teeth" of the lifter 490, and the remaining portion of the outer surface of the pins could exhibit a sharp angular cut-off edge, that for example, would have the appearance of a slice of pie. This alternative shape can apply both to the pins 104, 106, and 108 of the first embodiment and to the pins 404, 406, and 408 of the second embodiment, without departing from the principles of the present invention. Moreover, the pins do not necessarily need to protrude from the lifter surface at right angles.

In the first embodiment of FIGS. 1-12, there was a fourth cylindrical pin ("pin 4") that protruded from the opposite side of the lifter 100, designated pin 114. In this second embodiment of FIGS. 16-29, there is no fourth pin at all. Instead a small permanent magnet at 414 is placed in the lifter 400. A Hall effect sensor (described below) is used to sense the movements of this magnet 414, and thus the movements of lifter 400.

The latch 420 that was briefly noted above is depicted on FIG. 20, and has a latch shaft 422 protruding therethrough, and this shaft rotates the latch 420 as determined by the controller. Latch 420 includes a latch "catching surface" at 424 (see FIG. 22), and this will be more fully explained below.

In FIG. 19, the piston 458 depicted at or near its uppermost or top-most position (in this view), and a gas pressure chamber 457 can be seen above the top-most area of the piston, near the top piston seal 482 (see FIG. 28). It will be understood that the gas pressure chamber 457 and the main storage chamber (or storage space) 454 are in fluidic communication with one another. It will also be understood that the portion to the interior of the cylinder wall 451 forms a displacement volume that is created by the stroke of the piston 458. In other words, the gas pressure chamber 457 is not a fixed volume, but this chamber will vary in volume as the piston 458 moves up and down (as seen in FIGS. 19 and 20). As noted above, this type of mechanical arrangement is often referred to as a "displacement volume," and that terminology will mainly be used herein for this non-fixed volume 457.

In FIG. 20, the piston 458 is piston is depicted at or near its bottom-most travel position (in this view), and a gas pressure chamber 457 can be seen above the top-most area of the piston. It will be understood that the gas pressure chamber 457 and the main storage chamber (or storage space) 454 are in fluidic communication with one another. It will also be understood that the portion to the interior of the cylinder wall 451 forms a displacement volume that is created by the stroke of the piston 458. In other words, the gas pressure chamber 457 is not a fixed volume, but this chamber will vary in volume as the piston 458 moves up and down. This type of mechanical arrangement is often referred to as a "displacement volume," and that terminology will mainly be used herein for this non-fixed volume 457.

It will be further understood that the main storage chamber 454 preferably comprises a fixed volume, which typically would make it less expensive to manufacture; however, it is not an absolute requirement that the main storage chamber actually be of a fixed volume. It would be possible to allow a portion of this chamber 454 to deform in size and/or shape so that the size of its volume would actually change, during operation of the present invention, without departing from the principles of the present invention.

In the illustrated embodiment for the second embodiment fastener driving tool 401, the main storage chamber 454 substantially surrounds the working cylinder 453. Moreover, the main storage chamber 454 is annular in shape, and it is basically co-axial with the cylinder 453. This is a preferred configuration of the illustrated second embodiment, but it will be understood that alternative physical arrangements could be designed without departing from the principles of the present invention.

Figure 34:
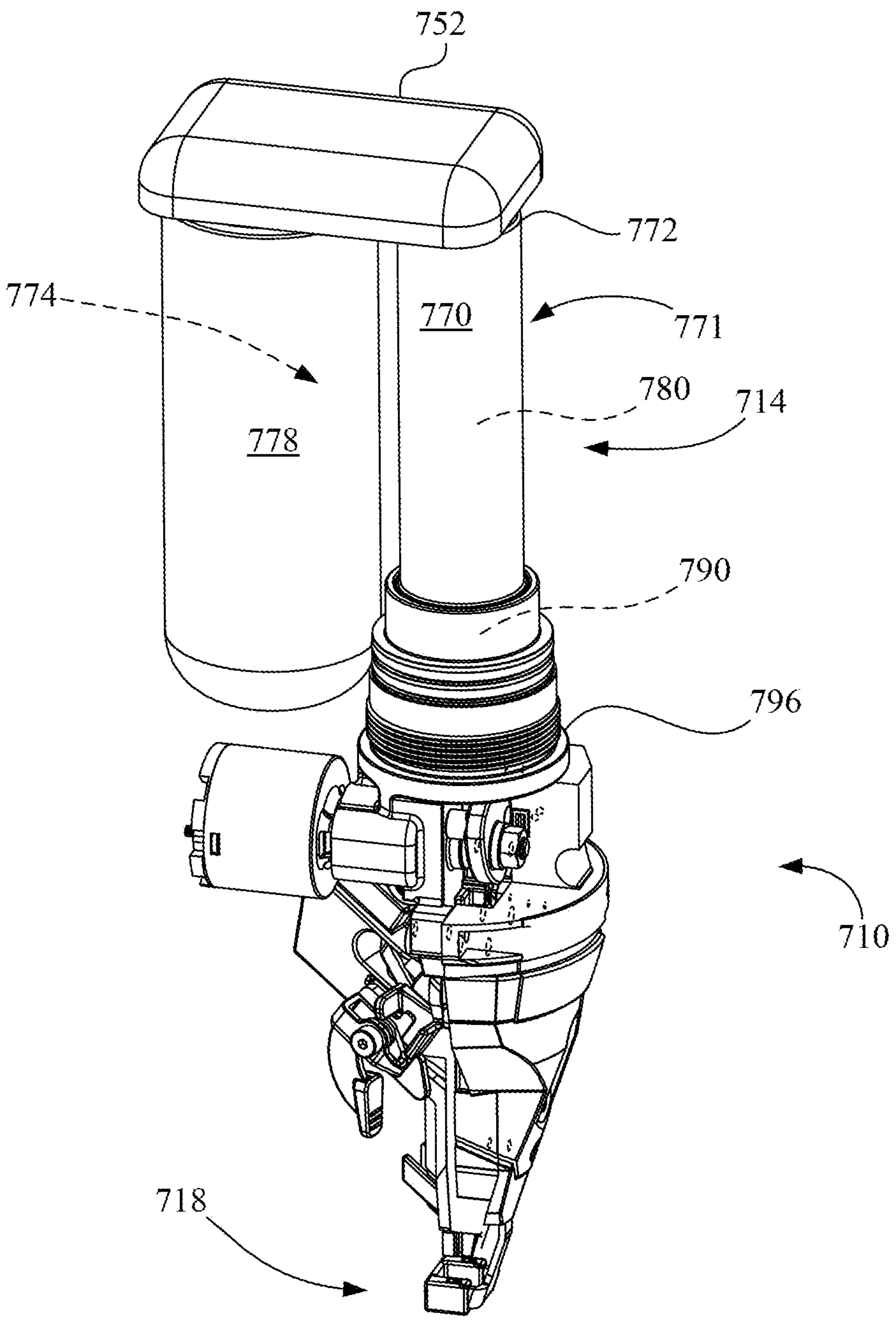
FIG. 34 is a side, elevational view of a third embodiment of a fastener driving tool constructed according to the principles of the present invention, in which the storage chamber does not surround the working cylinder.

For example, FIG. 34 illustrates a fastener driver mechanism 714 in which a main storage chamber 774 is not co-axial with a working cylinder 771 of the fastener driving tool, which is generally designated by the reference numeral 710. In other words, storage chamber 774 does not substantially surround the working cylinder 771, and instead is located off to one side of this working cylinder. This arrangement allows for various physical component arrangements of the tool 710, and offers a different possible center of mass, which might be advantageous for some special applications.

In FIG. 34, the main storage chamber 774 has an outer pressure vessel wall 778, and the working cylinder 771 has a cylinder wall 770. These two spaces 774 and 771 are pneumatically in communication with one another by way of a passageway 752, near the top (in this view) of the working cylinder, at 772. Within cylinder wall 770 is a movable piston 780 (not visible in this view), which can be constructed in a similar manner to the movable piston 458 illustrated in FIG. 28, described above. Also within the fastener driver portion 714 is a driver member 790 (not visible in this view), which can be constructed in a similar manner to the driver 490 illustrated in FIGS. 23 and 24, and described above.

A cylinder base 796 separates the gas pressure portions of the fastener driver portion 714 from the mechanical portions of that fastener driver portion 714. The tool 710 can include a handle portion (not shown), a fastener magazine portion

407 (not shown), and a fastener exit portion 718. The remaining parts of tool 710 can be very similar, or identical, to other parts of the second embodiment tool 401, illustrated in FIGS. 16-29.

Referring again to FIG. 20, the piston 458 is depicted near or at its bottom-most travel position, and in this configuration, the displacement volume 457 and the main storage chamber 454 are at their largest combined volumes, while the cylinder venting chamber 492 is at its minimum volume. This bottom position is also sometimes referred to herein as the "driven position." In FIG. 20, movable piston 458 is now in contact with the stationary piston stop 463, which is why the cylinder venting chamber 492 is at its minimum (or zero) volume. In FIG. 20, the driver 490 is also at its bottom-most travel position, and its lower-most tip can be seen extending out the exit port at the bottom of a lower guide body 425.

In FIG. 20, the rotary-to-linear lifter 400 and the latch 420 are in their respective positions at the end of a firing (driving) stroke, and the latch 420 has its latching surface 424 in a location that will not interfere with the teeth 491 of the driver 490. This is necessary so that the driver 490 can make a driving stroke from its top-most position to its bottom-most position (see also, FIG. 22). However, the latch 420 will later be slightly rotated by the latch shaft 422 (which is spring-loaded) so that its catching surface 424 will be able to interfere with the teeth 491.

In the configuration depicted on FIG. 20, the fastener driving tool 401 has been used to drive a fastener, and the tool now must cause the driver 490 to be "lifted" back to its top-most position for a new firing (driving) stroke. This is accomplished by rotating the lifter 400, which is actuated by the motor 427, through its gearbox 428, etc.

As rotary-to-linear lifter 400 rotates counterclockwise (as seen in FIG. 20) at least one of its pins 404, 406, or 408 will come into contact with one of the teeth 491 along the left side (as seen in FIG. 20) of the driver 490. This will cause the driver 490 to be "lifted" upward (as seen in FIG. 20) in a "return" stroke. As the lifter 400 rotates, one of the teeth 491 will be in contact with one of the rotating pins 404, 406, 408 throughout a portion of the rotational travel of the lifter, and the "next" pin will then come into contact with the "next" tooth 491 so that the driver 490 continues to be moved upward. This lifting procedure will continue until the controller determines that the driver has been moved to its proper position for a new driving stroke. When this occurs, the latch 420, which is spring-loaded, will have its latch catching surface 424 in a proper location to "catch" the closest tooth 491 along the right-hand side (as seen in FIG. 20) of the driver 490, thereby preventing the driver from falling downward for any significant distance. After this occurs, the "next" lifter pin (which will be the pin 404) will then come along and again make contact with one of the teeth 491 along the left-hand side (as seen in FIG. 20) of the driver 490, thereby continuing to lift the driver toward the top (as seen in FIG. 20) of the cylinder 453.

Figure 21:
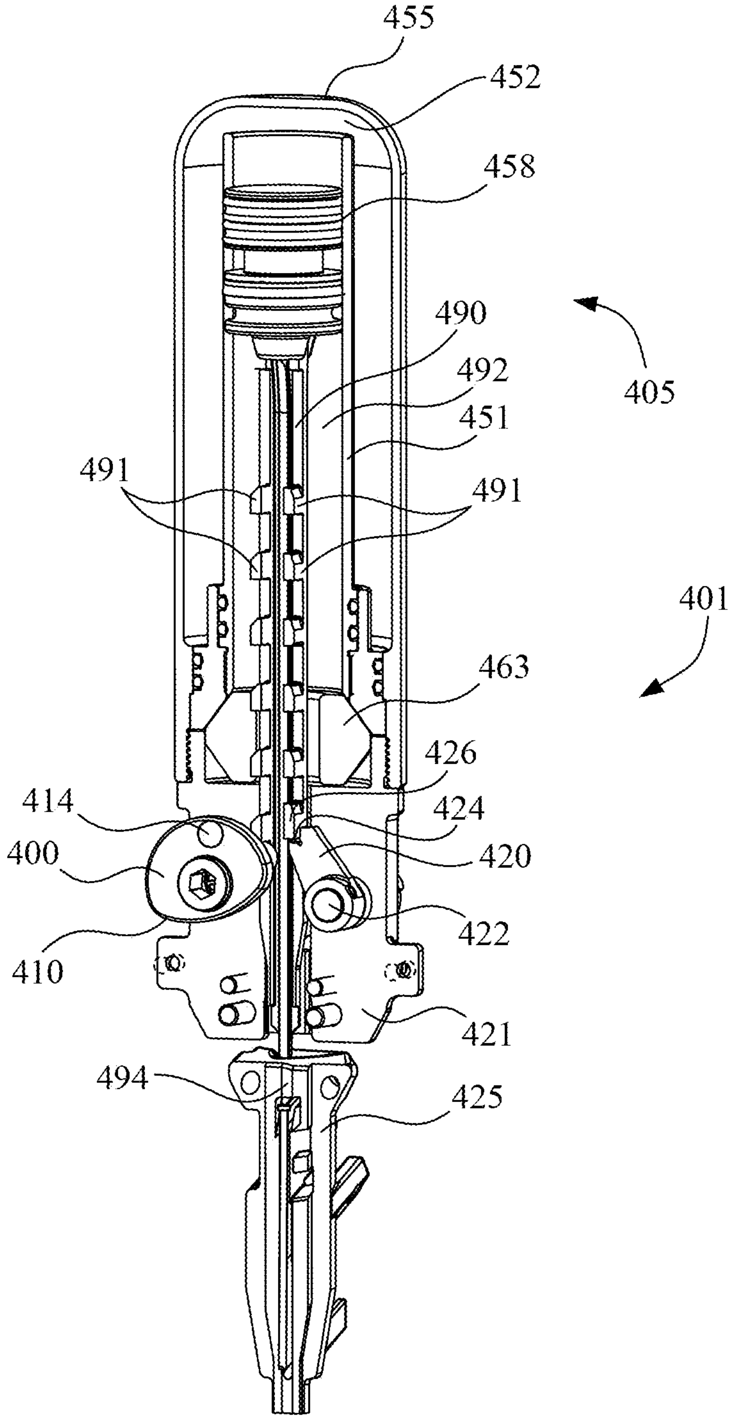
FIG. 21 is another perspective view from the side and somewhat from above and in partial cross-section of the gas spring cylinder portion of the second embodiment fastener driving tool of FIG. 16, in which the driver and piston are near their top-most position, and the latch is in its interfering position.

In the illustrated embodiment of the second embodiment fastener driving tool 401, the rotary-to-linear lifter 400 makes two complete rotations to lift the driver 490 from its bottom-most position to its top-most position. (The upper position is also sometimes referred to herein as the "ready position.") At the end of the second rotation, the parts will be configured as illustrated in FIG. 21. The piston 458 will again be near the top of the cylinder 453, and the combined volumes of the main storage chamber 454 and displacement volume 457 have now been reduced to a smaller volume, which means their gases are under a greater pressure, since the gas that was above the piston and in chamber 454 was compressed during the lift of the driver. (As noted above, the actual volume of the main storage chamber 454 does not change in the illustrated embodiment.) During the lift of the driver, the latch 420 was "engaged" with the teeth 491, however, the latch has a smooth surface in one direction that allows the teeth 491 to push the latch out of the way during the upward lift of the driver. This is much like a ratchet-type action, remembering that the latch is spring-loaded (and thus has a mechanical bias) so as to act in this manner.

Figure 23:
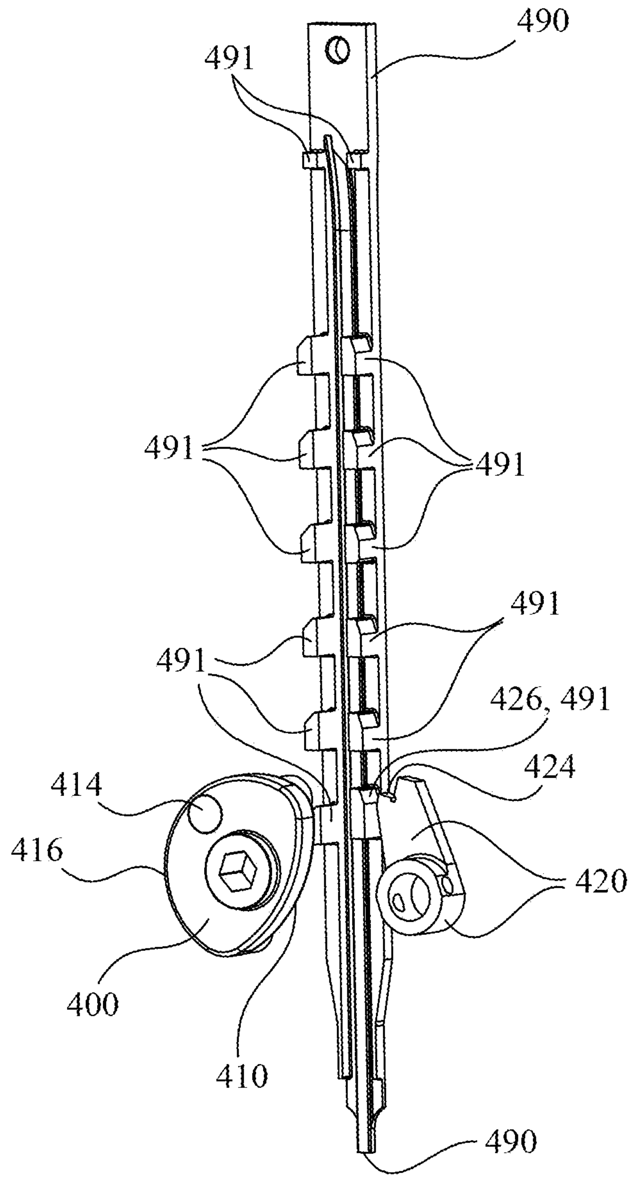
FIG. 23 is a perspective view of driver, rotary-to-linear lifter, and latch portions of the driver mechanism for the second embodiment fastener driving tool of FIG. 16.

At the end of the piston's normal upward movement, the "last" tooth along the right-hand side (as best seen in FIG. 23) of the driver 490 is engaged with the latch catching surface 424, and so latch 420 now prevents the driver from being moved downward (as seen in this view). (This is similar to the arrangement of components depicted in FIG. 4, for the first embodiment.) The third pin 408 is still in contact with the lower-most tooth 491 along the left-hand side of the driver 490, at this point in the rotational travel of the rotary-to-linear lifter 400. There is a sensor which, in the illustrated embodiment, is a Hall effect sensor 430 (see FIG. 25) that detects the rotational movements of the lifter 400. This sensor detects the magnet 414, as discussed below in greater detail.

When the sensor 430 detects the magnet 414 a first time (in this second embodiment), the control system turns off the solenoid 431, which will then allow the latch 420 to engage the right-hand teeth (in these views) of the lifter 400. Note that the solenoid can also be turned off earlier during the lift, if desired. When sensor 430 detects this magnet 414 a second time (in the second embodiment), the current to the motor 427 is turned off, and the motor thus is de-energized and stops the lifting action of the driver 490. As described herein, the solenoid 431 acts as a latch actuator.

In the second illustrated embodiment tool 401, the latch surface 424 is not in contact with the driver teeth 491 when the driver 490 has been moved to its "ready" position. In this second illustrated embodiment, the gearbox 428 has an attribute by which it essentially is self-locking from its output side (i.e., from its output shaft 429), and this prevents the lifter 400 from allowing the driver 490 to move "backward," which is the "down" direction in FIG. 21. Therefore, the driver/piston subassembly will not drift downward a small distance, and thus, the driver teeth 491 do not come into contact with the latch, even in view of the gas pressure above piston 458 (in the space 457).

At the "ready" position for the driver 490, the latch 420 may be positioned such that it would interfere with the driver teeth 491 (i.e., in an "interfering position") as a safety feature (i.e., in which the latch surface 424 would "catch" the teeth 491 of the driver 490, if the driver somehow would move downward). However, the gearbox/lifter combination does not allow the "last tooth" 426 to contact that latch 420 at this point in the tool's operation.

This is the position illustrated in FIG. 21 of the second embodiment tool, and this configuration is considered to be the "rest" position of the tool 401. Although the gas pressure in the combined main storage chamber 454 and displacement volume 457 is at its maximum, the gearbox prevents the driver 490 from being moved further downward (in this view), so the piston/driver combination is essentially locked in this position until something else occurs. In a preferred mode of the invention, the pressure vessel may be pressurized at about 130 PSIG to 140 PSIG, just before a driving stroke.

It should be noted that, for the second embodiment tool 401, the gearbox can be of yet another alternative construction. For example, instead of being self-locking from its output side, a "regular" gearbox could be used if provided with a "one-way" feature, such as an adjacent one-way clutch (or a one-way clutch constructed therewithin). In this manner, the driver 490 would still be prevented from moving down (in FIG. 21) and contacting the latch surface 424, just before a driving stroke.

When it is time to drive a fastener, the next action in the illustrated second embodiment is to cause the motor 427 to become energized once again, so that the lifter 400 rotates further in its original direction. This occurs by two independent actions by the user: in some modes of the invention, these two independent actions can occur in either order. (There is also an optional "restrictive mode" of operation, in which the two independent actions must occur in a specific order.) These two actions are: pressing the nose 419 of the safety contact element 418 against a solid surface, and depressing the trigger actuator 439. The trigger actuator will cause the trigger switch 437 to change state, which is one condition that will start sending current to the motor 427. The safety contact element 418 has an upper arm 434 (see FIG. 25) that will be moved as the nose 419 is pushed into the tool 401, and this upper arm 434 will actuate another sensor which, in the illustrated embodiment, is a small limit switch 432 (see FIG. 25).

Figure 22:
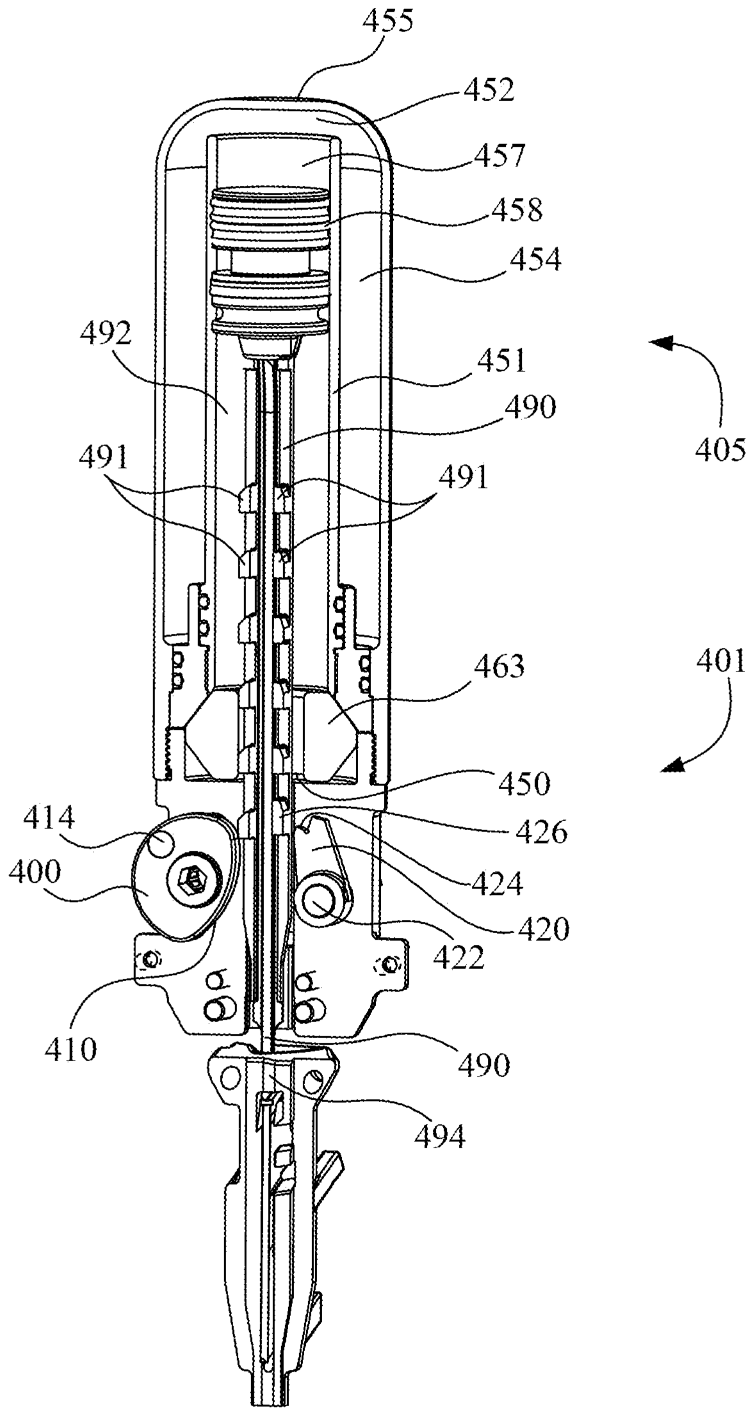
FIG. 22 is another perspective view from the side and somewhat from above and in partial cross-section of the gas spring cylinder portion of the second embodiment fastener driving tool of FIG. 16, in which the driver and piston are near their top-most position, and the latch is in its non-interfering position, in which the mechanism is now ready for firing (driving).
Figure 24:
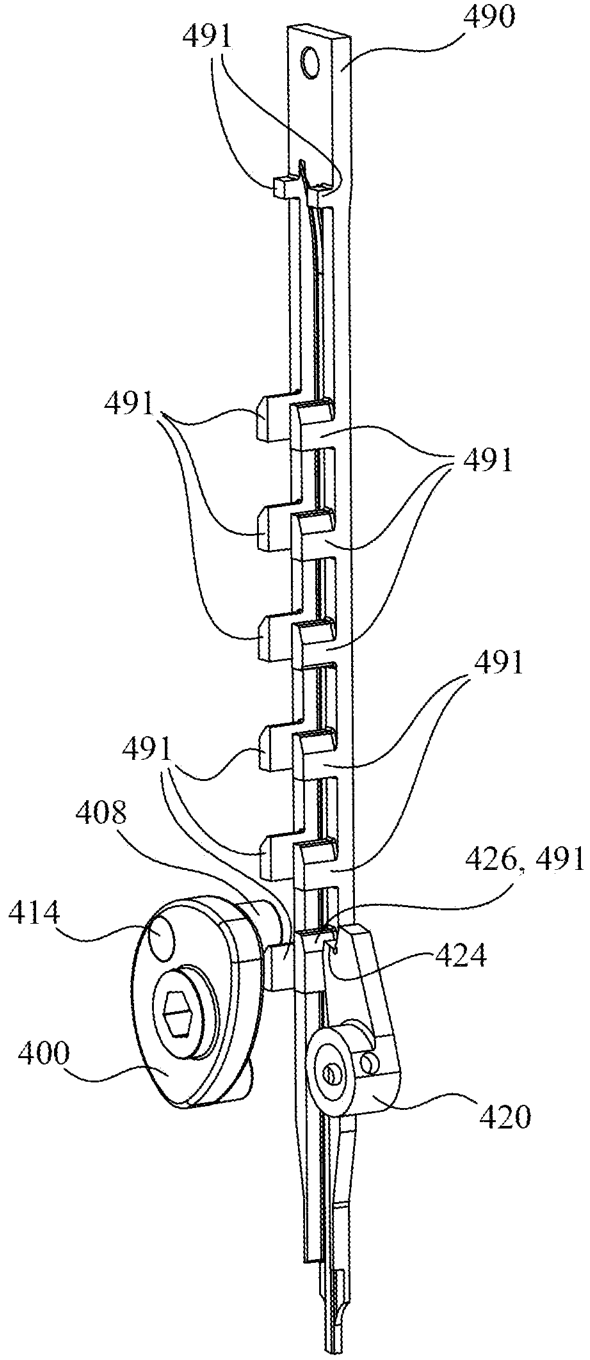
FIG. 24 is another perspective view from a different angle of the same components of FIG. 23.

When both of these actions occur simultaneously, current is delivered to the motor 427 which will once again turn the rotary-to-linear lifter 400 a short distance. Also, the controller energizes the solenoid 431, which rotates the latch 420 a small angular distance clockwise (as seen in FIG. 20) to move the latch catching surface 424 from an interfering position, so that the latch will not prevent the driver 490 from moving downward when it is correctly time for a driving stroke. Therefore, the "last" tooth 426 of driver 490 (as seen in FIGS. 21 and 22) would not "catch" on this latch catching surface. Note that FIGS. 23 and 24 show details of the same structure depicted in FIG. 22 at different perspective angles.

Now that all this has occurred, the latch 420 is in its disengaged position so that its catching surface 424 will not interfere with any of the teeth 491 along the right-hand side (as seen in FIG. 20) of the driver 490; and none of the three "working" pins of the lifter 400 will interfere with those left-hand teeth 491. Once the driver tooth 491 "drops off" the last lifting pin 408, the driver 490 is quickly thrust downward in a driving stroke, due to the high gas pressure within the main storage chamber 454 and displacement volume 457. (This is the "gas spring" effect.) Along the way, the driver 490 will pick up a fastener that is waiting at the feeder carriage 448, and drive that fastener along the back plate 449 to the exit area at the bottom (at the area 417 on FIG. 16). After this action has occurred, the driver 490 will be situated at its lower-most position, as viewed in FIG. 20.

The pressure of the gas in the combined main storage chamber 454 and displacement volume 457 is sufficiently high to quickly force the driver 490 downward, and such pneumatic means is typically much faster than a nail driving gun that uses exclusively mechanical means (such as a spring) for driving a fastener. This is due to the "gas spring" effect caused by the high gas pressure within the main storage chamber 454 and displacement volume 457 that, once the driver is released, can quickly and easily move the driver 490 in a downward stroke.

As the driver 490 is being moved downward, the piston 458 and the movable piston stop 459 are forcing air (or possibly some other gas) out of the cylinder venting chamber 492 that is below the piston. This volume of air is moved through a vent to atmosphere 450, and it is desired that this be a low resistance passageway, so as to not further impede the movement of the piston and driver during their downward stroke. The gas above the piston is not vented to atmosphere, but instead remains within the displacement volume 457, which is also in fluidic communication with the main storage chamber 454.

One aspect of the present invention is to provide a rather large storage space or volume to hold the pressurized gas that is also used to drive the piston downward during a driving stroke of the driver 490. There is a fluidic passage 452 between the upper portion of the cylinder and the main storage chamber 454. (In the illustrated second embodiment, the cylinder wall 451 does not extend all the way to the top end region 455.) It is preferred that the volume of the main storage chamber be larger than the total volume of the cylinder working spaces (i.e., the displacement volume) by a volumetric ratio of at least 2.0:1, and more preferably at least 3.0:1. This will allow for a powerful stroke, and a quick stroke; moreover, it provides for an efficient operating air spring.

The illustrated second embodiment of the present invention allows for both a quick firing (or driving) stroke time and also a fairly quick "lifting" time to bring the driver back to its upper position, ready for the next firing (driving) stroke. Both of these mechanical actions can sequentially occur in less than 340 milliseconds (combined time), and allow a user to quickly place fasteners into a surface. In one operating mode of the present invention, the human user can hold the trigger in the engaged position and quickly place a fastener at a desired location merely by pressing the nose (or "bottom") of the tool against the working surface to actuate the fastener driver and place the fastener. Then the user can quickly remove the fastener driver tool from that surface, and move it to a second position along the work surface, while still depressing the trigger the entire time, and then press the nose (or bottom) of the tool against the working surface at a different position, and it will drive a fastener at that "different" position. This is referred to as a "bottom fire" capability, and when using the illustrated embodiment it can occur virtually as fast as a human can place the tool against a surface, then pick up the tool and accurately place it against the surface at a different position, and thereby repeat these steps as often as desired until emptying the magazine of fasteners. This type of mode of operation will be discussed in greater detail below in connection with the logic flow chart starting at FIG. 35, with respect to the control system of the fastener driving tool 401.

Figure 25:
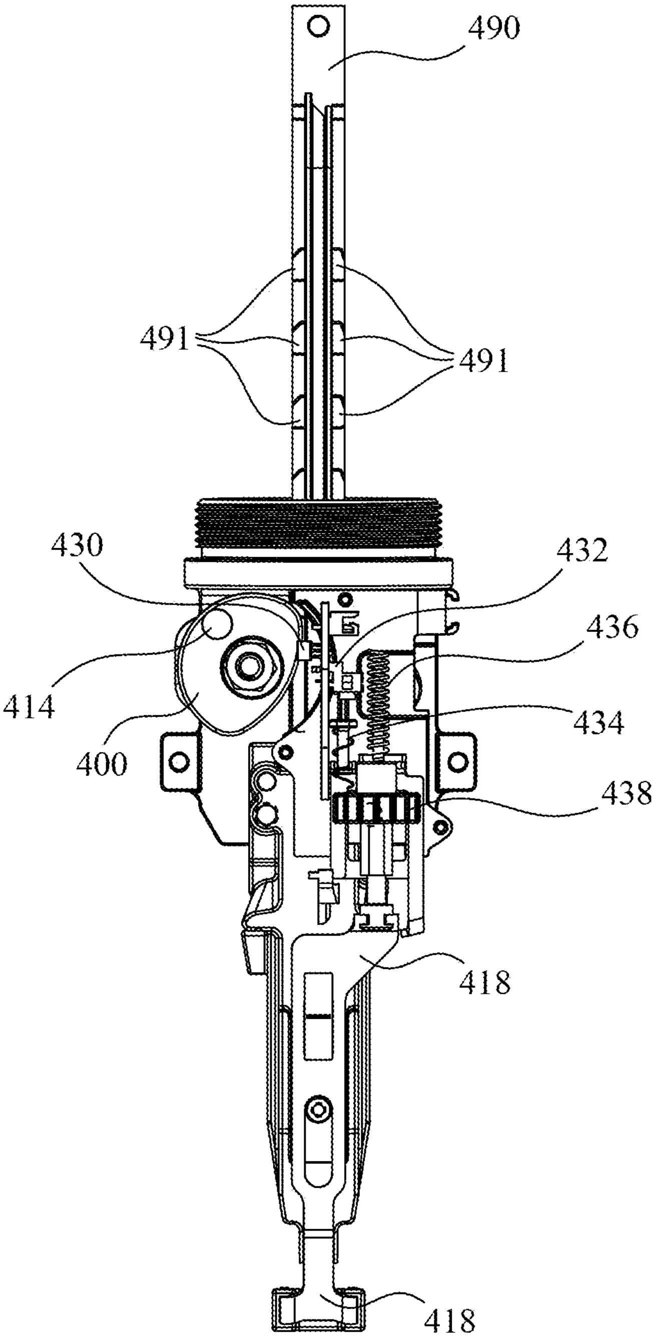
FIG. 25 is a side elevational view in partial cross-section of major portions of the driving mechanisms for the second embodiment fastener driving tool of FIG. 16.

Referring now to FIG. 25, another side sectional view is provided that shows some of the elements beneath the latch and other portions of the second embodiment fastener driving tool 401. There are two limit switches 430 and 432. The limit switch 430 is a Hall-effect sensor that detects movements of the magnet 414 of the rotary-to-linear lifter 400 (as noted above). The limit switch 432 is a small electromechanical limit switch that detects movement of the upper arm 434, which is a portion of the safety contact element 418 that is pushed rearward (or "up" in these views) with respect to the overall tool 401 when the nose of the tool is pressed against a working surface. These limit switches provide electrical input signals to the controller, which is discussed below in greater detail. It will be understood that other types of sensors could be used instead of electromechanical limit switches or Hall-effect switches, such as optoelectronic sensors, or magnetic sensors, or even a metal-sensing proximity switch.

Also viewed on FIG. 25 is a return spring 436, which causes the safety contact element 418 to be pushed back downward (in this view) once the user releases the nose of the tool 401 from the working surface. In addition, there is a depth of drive adjustment at 438.

Figure 26:
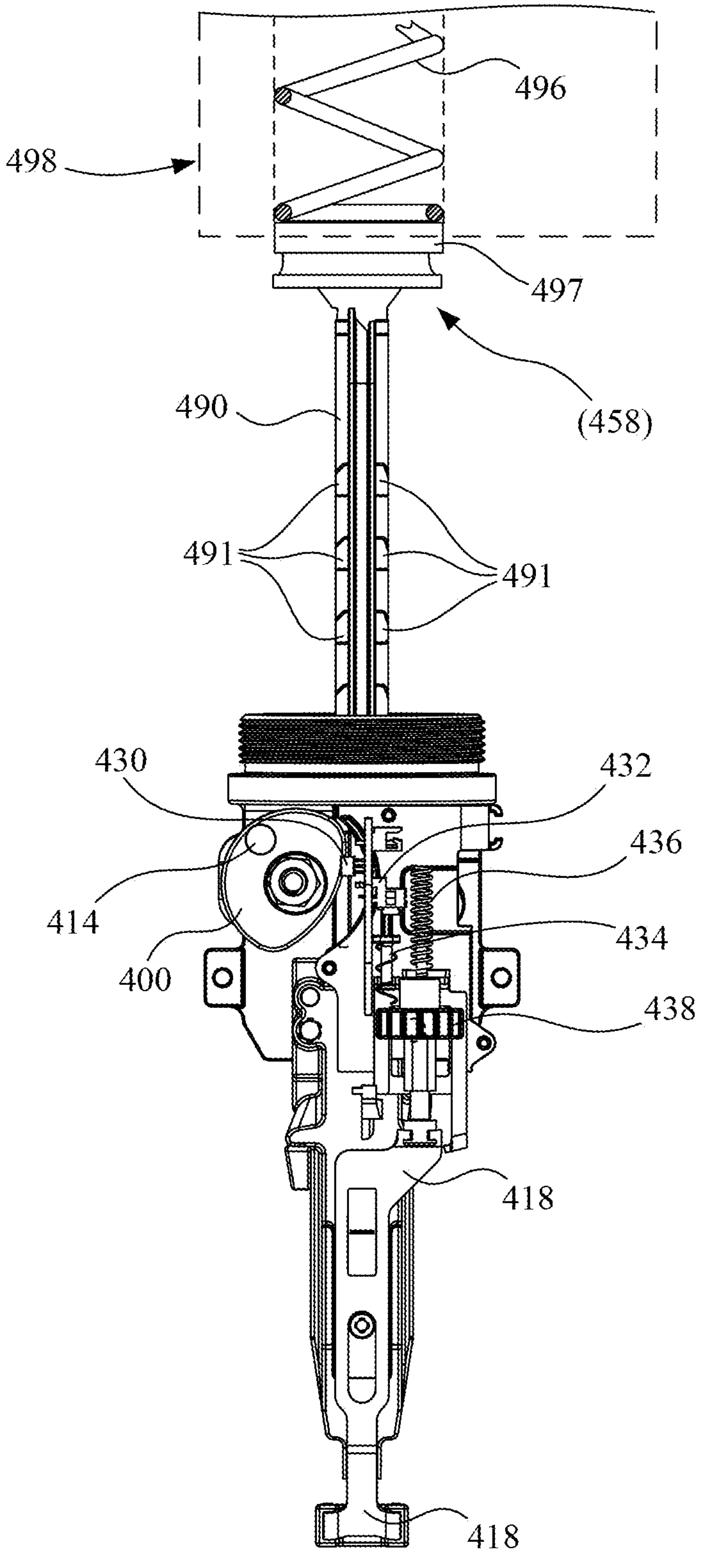
FIG. 26 is a side view in partial cross-section of major portions of the driving mechanisms for a third embodiment fastener driving tool somewhat similar to that of FIG. 16, however, using a mechanical drive spring attached to the driver, rather than a gas drive spring in a cylinder.

As generally indicated on FIG. 26 at a reference numeral 498, the driver 490 may be driven toward the exit end by a type of driver actuation device other than a gas spring. For example, the driver member 490 could have a top circular area 497 that is forced downward (in this view) by a mechanical spring 496, which could be a fast-acting coil spring, for example, thereby also causing driver 490 to move downward (in this view). Or an alternative driver actuation device could use a different type of mechanical force, for example, applied by compressed foam (in the area at 498). In such alternative embodiments, there would be no need for a cylinder at all, and instead the spring 496 (or other device at 498) would merely need a mechanical guide to keep it moving in a correct motion.

Further alternative ways to force the driver 490 of FIG. 26 to move in a driving stroke toward the exit end are the use of a fast-acting motor, or the use of a compressed gas valve (releasing compressed air into a cylinder against, for example, a piston 458 instead of the circular area 497), or perhaps a pressurized liquid valve (releasing pressurized hydraulic fluid into a cylinder against the piston 458, for example). If a piston 458 is used with compressed gas or pressurized liquid, then a cylinder (not shown) would also be added to the unit of FIG. 26, instead of merely using a mechanical guide.

Figure 27:
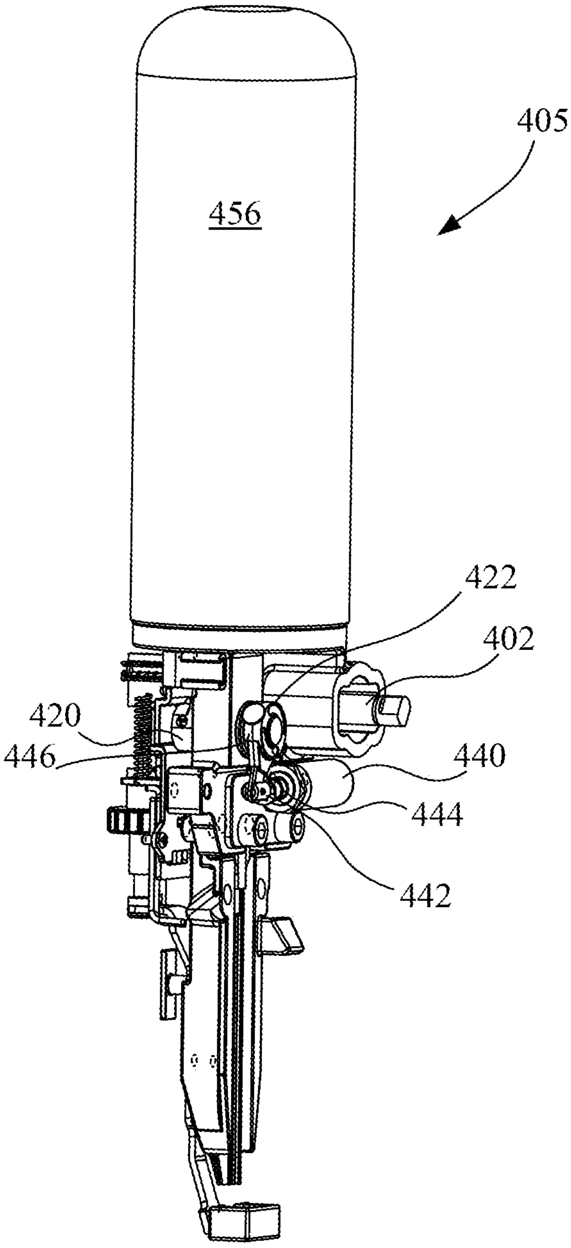
FIG. 27 is a perspective view mainly from the left side, but angled to better see the details of the latch mechanism including its solenoid, for the second embodiment fastener driving tool of FIG. 16.

Referring now to FIG. 27, further details of the solenoid are viewed. In FIG. 27, the solenoid 440 has a plunger 442 that will move linearly either in or out from the main coil body of the solenoid 440. When the solenoid is energized, it pulls the plunger 442 in toward the solenoid body 440, which rotates a solenoid arm 446 (part of the solenoids "linkage"), which in turn rotates the latch shaft 422 that also rotates the latch 420 a small arcuate distance. This causes the latch 420 to disengage from an interfering position with the driver 490. On the other hand, when the solenoid 440 becomes de-energized, the plunger will be pushed out by the plunger spring 444, which will rotate the solenoid arm 446 a short distance, and that in turn rotates the latch shaft 422 and the latch 420. This will tend to cause the latch to engage the teeth 491 along the right-hand side (as seen in FIG. 20) of the driver 490. However, since this is a spring action, the teeth 491 can slide against the surface of the latch 420 and move the latch out of the way if the teeth are attempting to move upward along with the driver 490. However, the spring action of the solenoid plunger spring will be strong enough to push the latch 420 into its engaged position, and any teeth 491 attempting to move downward will be caught by the catching surface 424 of the latch 420.

This "catching" action of the latch 420 has more than one benefit. In the first place, the latch remains in its interfering position as the piston 458 is lifted to its top or "firing" position. The driver 490 cannot be fired until the latch 420 is moved out of the way, as discussed above. On the other hand, if there is some type of jam or an improper use of the tool by a user such that the driver 490 does not totally complete its travel during a firing (driving) stroke, the latch 420 will also prevent a misfire from occurring at an inconvenient time.

More specifically, if the driver jams during a driving stroke, and if a person tries to clear the jam, and if there was no precaution taken to prevent the remainder of the stroke from occurring at that moment, then possibly an injury could occur when the driver 490 suddenly becomes released from its jammed condition. In other words, a fastener could be driven during the attempt to clear the jam, and that fastener would likely be directed somewhere that is not the original target surface. In the present invention, the latch 420 will have its solenoid 440 become de-energized once the jam occurs (because solenoid 440 will de-energize after a "timeout" interval occurs), and therefore the latch 420 will be engaged and the catching surface 424 will be in a position to interfere with the downward movement of the driver teeth 491. By use of this configuration, the driver could only move a short distance even if the jam was suddenly cleared, because the latch catching surface 424 will literally "catch" the "next" tooth 491 that unexpectedly comes along during a downward travel of the driver 490. This makes the tool much safer in situations where a complete driving stroke has not occurred.

The process for controlling the solenoid and the moments when the solenoid will either be energized or de-energized are discussed below in connection with the flow chart that begins on FIG. 35.

It will be understood that the latch 120 or 420 could be controlled by a device other than a solenoid, without departing from the principles of the present invention. For example, the solenoid 140 or 440 could be replaced by motor, or some type of air or hydraulic valve, if desired. Moreover, the latch action could be linear rather than rotational (pivotable), if desired.

With respect to various types of firing (or driving) modes, a "trigger fire" mode is where the user first presses the tool nose against a working surface, and then depresses the trigger actuator 439. It is the trigger being depressed that causes the driving stroke to occur in this situation. With respect to a "bottom fire" mode, the trigger is actuated first, and then the user presses the nose of the tool against a work surface, and it is the work surface contact that causes the driving stroke to occur. As discussed above, the user can continue to hold the trigger down while pressing against and releasing the tool from the work surface multiple times, and obtain quick multiple firing strokes (or driving strokes), thereby quickly dispensing multiple fasteners into the working surface at various locations.

There is also an optional "restrictive firing mode," in which the nose of the tool must be first placed against a working surface before the trigger is pulled. If the sequence of events does not unfold in that manner, then the driving stroke will not occur at all. This is strictly an optional mode that is not used by all users, and certainly in not all situations.

With regard to alternative embodiments of the present invention second embodiment, an exemplary fastener driving tool can be made with a main storage chamber volume of about 11.25 cubic inches and a cylinder displacement volume of about 3.75 cubic inches. This would provide a volumetric ratio of the main storage chamber versus the displacement volume of about 3.0:1. As discussed above, it is desirable for the volumetric ratio of the main storage chamber's volume to the displacement volume to be at least 2.0:1, and it could be much higher if desired by the fastener driving tool's designer.

The working pressure in the system could be around 120 PSIG, and should probably be at least 100 PSIG for a quick-firing tool. By the term "working pressure" the inventors are referring to the pressure in the displacement volume 457 (and main storage chamber 454) at the time the piston 458 is at its "ready" position, which is when it is at (or proximal to) its uppermost travel position.

It should be noted that other gases besides air can be used for the main storage chamber and the displacement volume, if desired. While air will work fine in many or most applications, alternative gases could be used as the "charge gas," such as carbon dioxide or nitrogen gas. Moreover, the use of nitrogen gas can have other benefits during the manufacturing stage, such as for curing certain adhesives, for example.

In the illustrated second embodiment, there is no fill valve on the fastener driving tool 401 at the storage tank (main storage chamber) 454. This is a preferred mode of the present invention, although an optional fill valve could be provided, if desired by a tool designer. The design of the preferred mode of the present invention is such that the charge gas should not significantly leak from the tool, and therefore a fill valve would not be required.

Another feature of the present invention is that a variable stroke is possible by causing the rotary-to-linear lifter 400 to be rotated a multiple number of times to create a shorter or longer firing (driving) stroke, if desired. In the illustrated second embodiment, the lifter 400 makes a complete rotation two times to lift the piston from its lower-most position to its top-most position. This number of rotations of the lifter could be increased to three times or four times if desired, or even could be decreased to a single turn for a shorter stroke tool, if desired.

Another possible variation is to use a composite sleeve for the internal cylinder wall 451, which would make contact with the seals of the piston 458. In addition, the outer pressure vessel wall 456 could also be made of a composite material, if desired. The use of a carbon fiber composite, for example, would decrease weight, but would maintain the desired strength.

Referring now to FIG. 28, some of the details of the piston arrangement are illustrated in cross-section for the second embodiment 401 of the present invention. This piston is designated by the reference number 458. There are upper and lower seals at 482 and 484, respectively. Between these seals is an annular space 486 that is at least partially filled with lubricating fluid, such as oil. This oil will tend to lubricate the movements of the piston 458 along the inner surface of the cylinder wall 451. Part of the piston mechanism of this embodiment includes a piston scraper 489.

The seals 482 and 484 are designed to hold the oil 488 within the annular space 186 indefinitely, or at least to lose the oil only at a very slow rate. In a preferred mode of the invention, the seals have a "slick" coating material to provide a long operational life. In the illustrated embodiment, an exemplary material for this coating is XYLAN, which is a TEFLON™ material that includes molybdenum powder.

The driver element 90 of tool 10 and the driver element 490 of tool 401 both retract into their respective working cylinder areas 71 and 453. This is a unique arrangement, in that some of the driver's latching protrusions (or "teeth") 92 and 491 also retract into the working cylinder areas 71 and 453. This is made possible by the positioning of the respective lifters 100 and 400, and by the shapes of the driver elements 90 and 490, and also by the sealing arrangement of the pistons 80 and 458, discussed in the previous paragraphs.

It will be understood that the fastener magazine portion 16 of tool 10 and the fastener magazine portion 407 of the tool 401 are essentially optional features. In other words, the fastener driving tools 10 and 401 could be constructed to act as "single-shot" devices, and no magazine would be provided for such a tool. Alternatively, the tools 10 and 401 could be provided with a standard detachable magazine, but the tools themselves could also be constructed to work in a "single-shot mode" such that a single fastener is placed in the tool 10 or 401, near its front end or tip (e.g., near 30) and that single fastener is then driven by tool 10 or 401. In this mode, the magazine 16 or 407 could be dismounted from the tool 10 or 401 during the single-shot procedure; later, the magazine 16 or 407 could be re-mounted to the tool 10 or 401, and the collated fasteners in the magazine could then be driven by the tool, as desired by the user.

Figure 30:
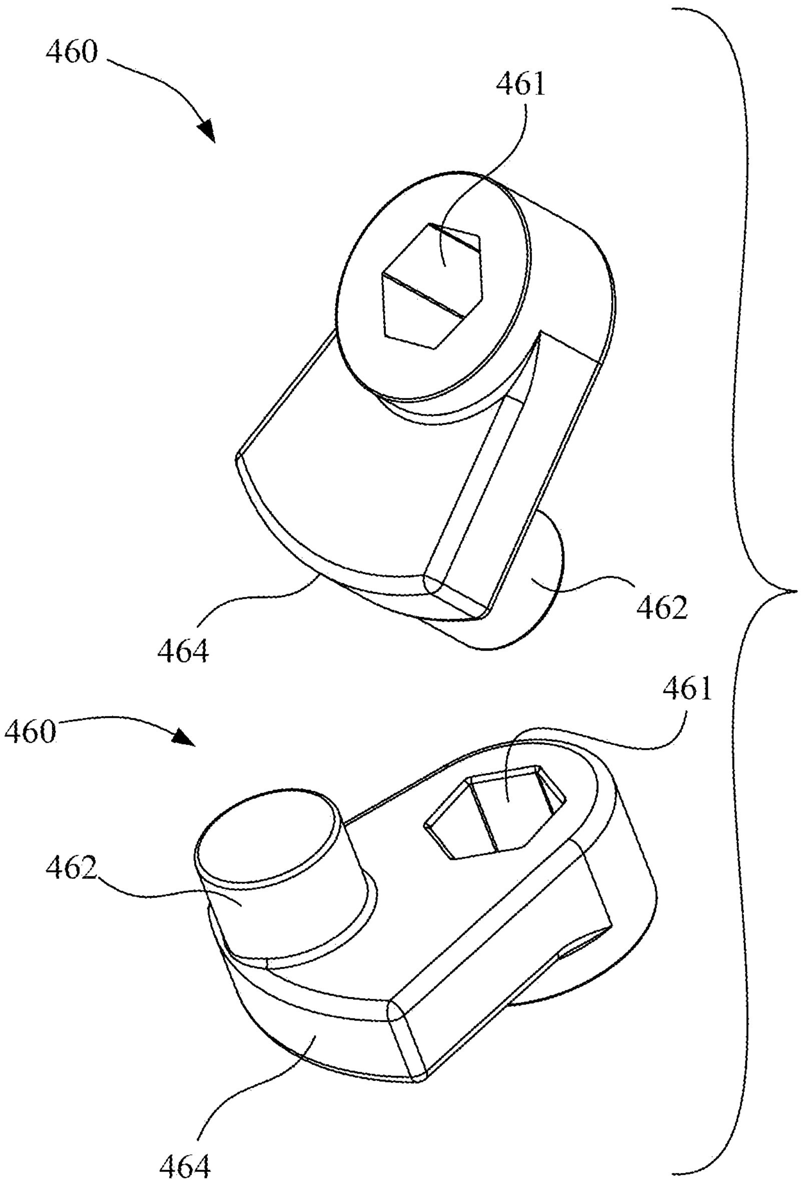
FIG. 30 are perspective views showing some of the details of a first particular arrangement of a rotary-to-linear lifter and the surfaces that engage the driver, in which the lifter exhibits a single "tooth" and has an arcuate outer perimeter shape, which can be used with the fastener driving tools of FIG. 1 or FIG. 16.

Referring now to FIG. 30, an alternative embodiment rotary-to-linear lifter is illustrated, generally designated by the reference numeral 460. Lifter 460 has only a single protrusion (or "pin") at 462, and the lifter 460 rotates about a pivot axis at 461. The outer perimeter shape of lifter 461 is mainly arcuate at 464, and only comprises a small sector of a full circle. Yet lifter 460 can achieve the goals of the present invention, in that its protrusion 462 will provide a discontinuous contact surface with the "teeth" of a driver element, such as the driver 90 or driver 490. Lifter 460, having only a single "pin" would need to rotate more quickly that the other lifters 100 and 400, described above and in the drawings showing the first and second embodiments of a tool 10 or 401 (assuming that it was attempting to lift a driver having the same size and shape, and "teeth" spacings, as those previously described drivers).

Figure 31:
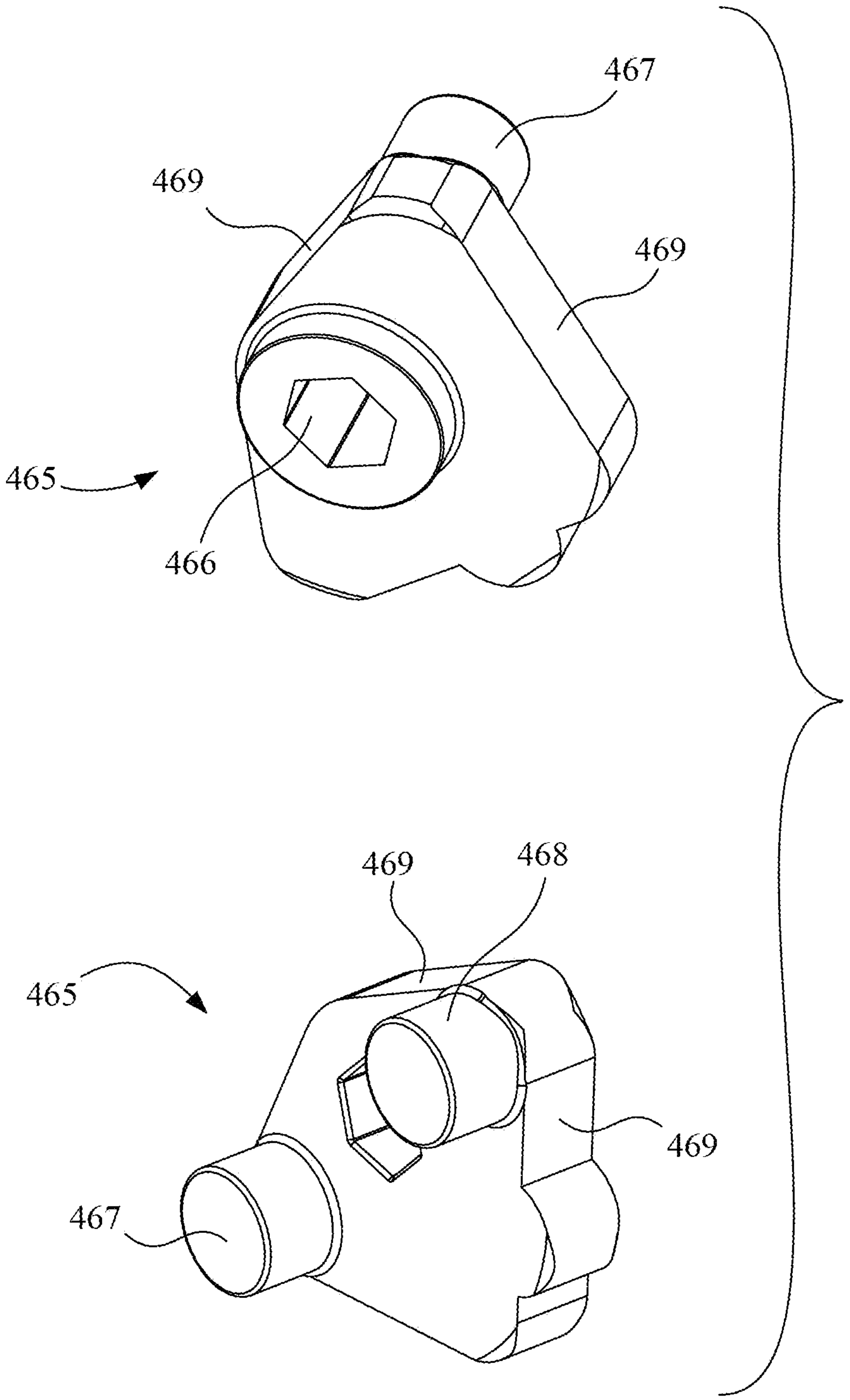
FIG. 31 are perspective views showing some of the details of a second particular arrangement of a rotary-to-linear lifter and the surfaces that engage the driver, in which the lifter exhibits two "teeth" and has an irregular outer perimeter shape, which can be used with the fastener driving tools of FIG. 1 or FIG. 16.

Referring now to FIG. 31, another alternative embodiment rotary-to-linear lifter is illustrated, generally designated by the reference numeral 465. Lifter 465 has two protrusions (or "pins") at 467 and 468, and the lifter 465 rotates about a pivot axis at 466. The outer perimeter shape of lifter 465 has a very irregular geometric shape at 469. Yet lifter 465 can achieve the goals of the present invention, in that its protrusions 467 and 468 will provide a discontinuous contact surface with the "teeth" of a driver element, such as the driver 90 or driver 490. Lifter 465, having only two "pins" would need to rotate more quickly that the other lifters 100 and 400, described above and in the drawings showing the first and second embodiments of a tool 10 or 401 (assuming that it was attempting to lift a driver having the same size and shape, and "teeth" spacings, as those previously described drivers).

Figure 32:
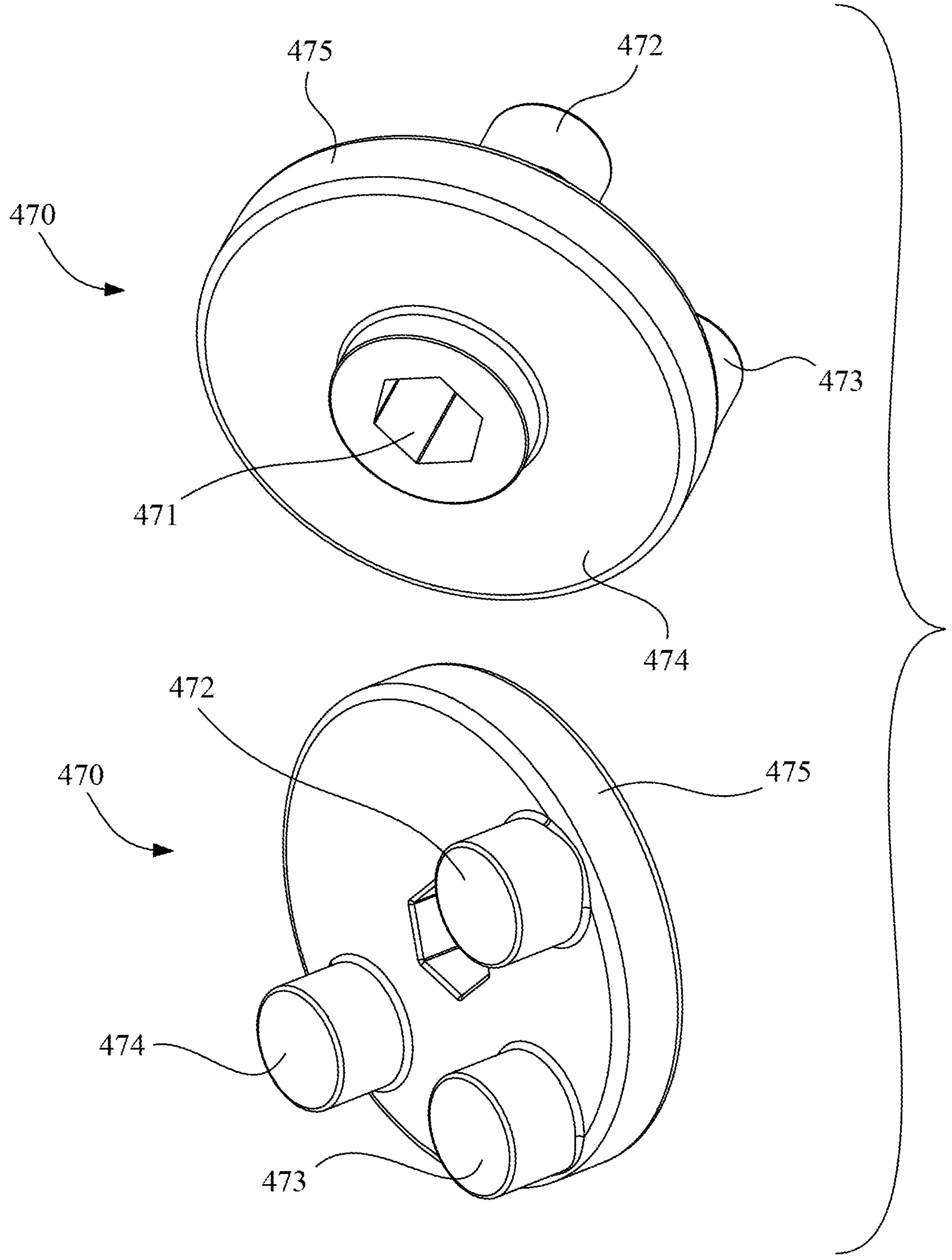
FIG. 32 are perspective views showing some of the details of a third particular arrangement of a rotary-to-linear lifter and the surfaces that engage the driver, in which the lifter exhibits three "teeth" and has a circular outer perimeter shape, which can be used with the fastener driving tools of FIG. 1 or FIG. 16.

Referring now to FIG. 32, yet another alternative embodiment rotary-to-linear lifter is illustrated, generally designated by the reference numeral 470. Lifter 470 has three protrusions (or "pins") at 472, 473, and 474, and the lifter 470 rotates about a pivot axis at 471. The outer perimeter shape of lifter 471 has a very regular geometric shape at 475, which is that of a circle. Yet lifter 470 can achieve the goals of the present invention, in that its protrusions 472, 473, and 474 will provide a discontinuous contact surface with the "teeth" of a driver element, such as the driver 90 or driver 490. Lifter 470, having three "pins" would need to rotate generally at the same speed as the other lifters 100 and 400, described above and in the drawings showing the first and second embodiments of a tool 10 or 401 (assuming that it was attempting to lift a driver having the same size and shape, and "teeth" spacings, as those previously described drivers).

Figure 33:
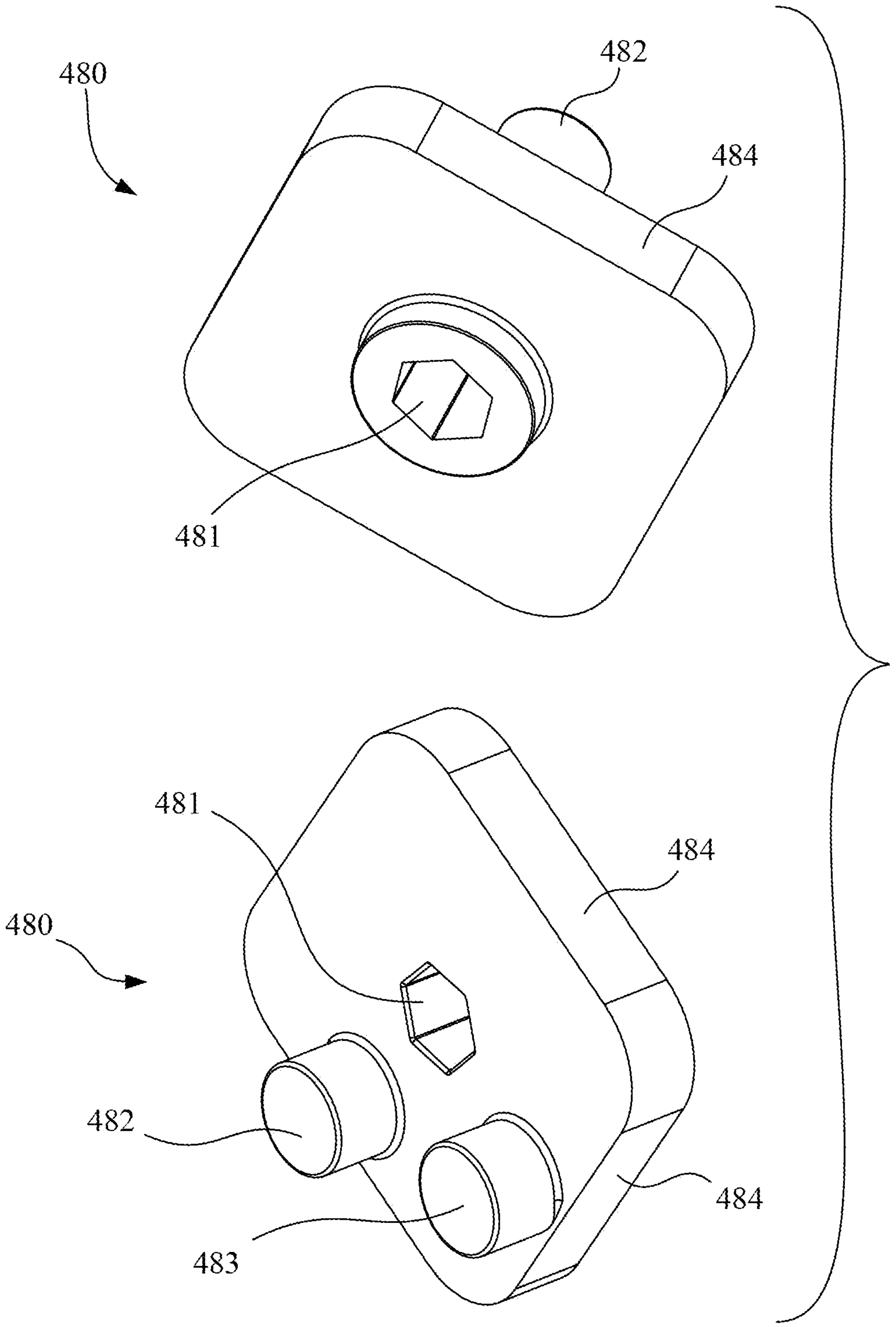
FIG. 33 are perspective views showing some of the details of a third particular arrangement of a rotary-to-linear lifter and the surfaces that engage the driver, in which the lifter exhibits three "teeth" and has a square outer perimeter shape, which can be used with the fastener driving tools of FIG. 1 or FIG. 16.

Referring now to FIG. 33, still another alternative embodiment rotary-to-linear lifter is illustrated, generally designated by the reference numeral 480. Lifter 480 has two protrusions (or "pins") at 482 and 483, and the lifter 480 rotates about a pivot axis at 481. The outer perimeter shape of lifter 481 has a very regular geometric shape at 484, which is that of a square. Yet lifter 480 can achieve the goals of the present invention, in that its protrusions 482 and 483 will provide a discontinuous contact surface with the "teeth" of a driver element, such as the driver 90 or driver 490. Lifter 480, having only two "pins" would need to rotate more quickly that the other lifters 100 and 400, described above and in the drawings showing the first and second embodiments of a tool 10 or 401 (assuming that it was attempting to lift a driver having the same size and shape, and "teeth" spacings, as those previously described drivers).

Figure 35A:
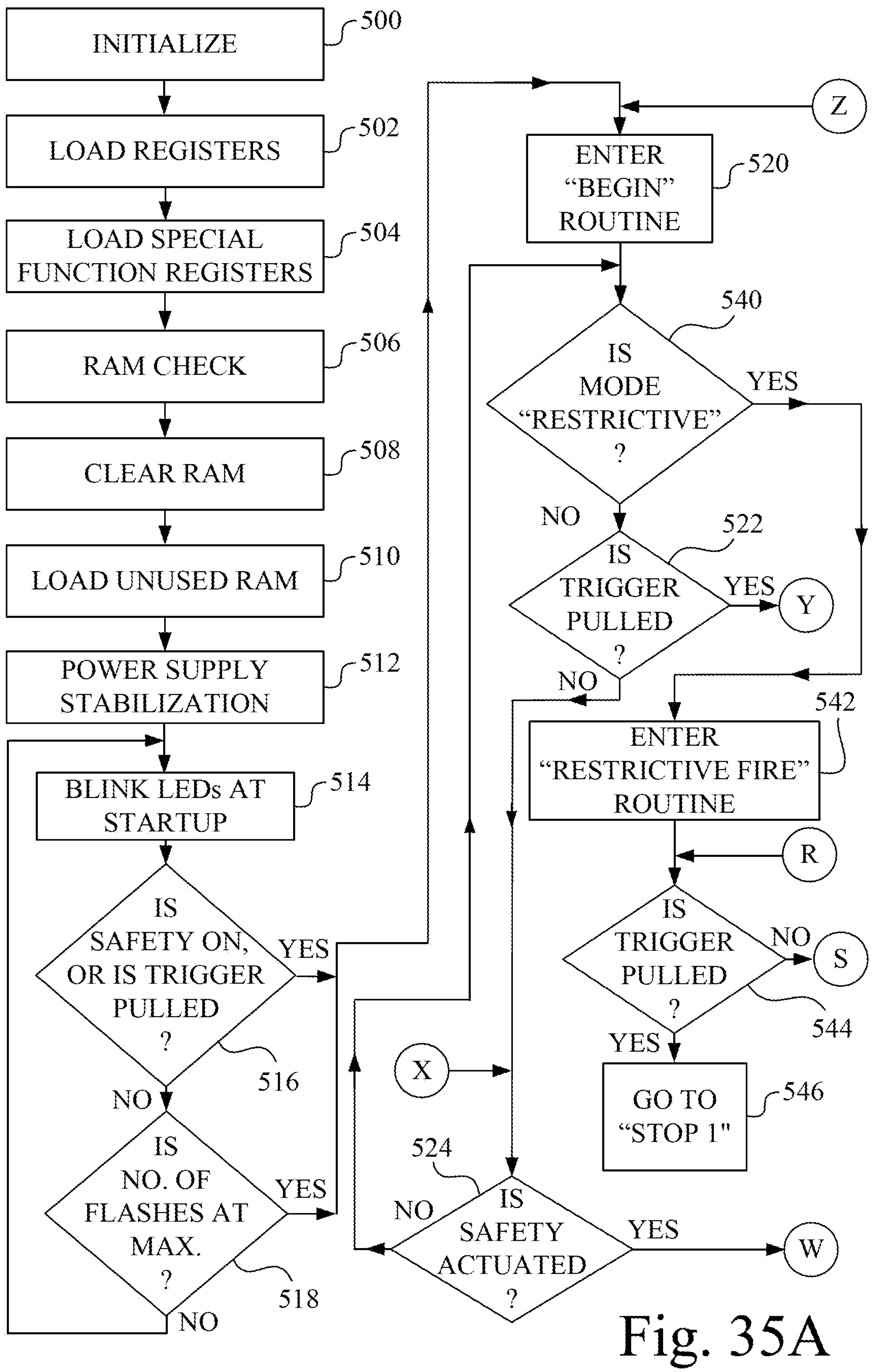
FIG. 35A, FIG. 35B, and FIG. 35C (as a group, sometimes referred to hereinbelow as a "FIG. 35") are a first portion of a flow chart showing some of the important logical steps performed by the controller of the second embodiment fastener driving tool of FIG. 16.
Figure 35B:
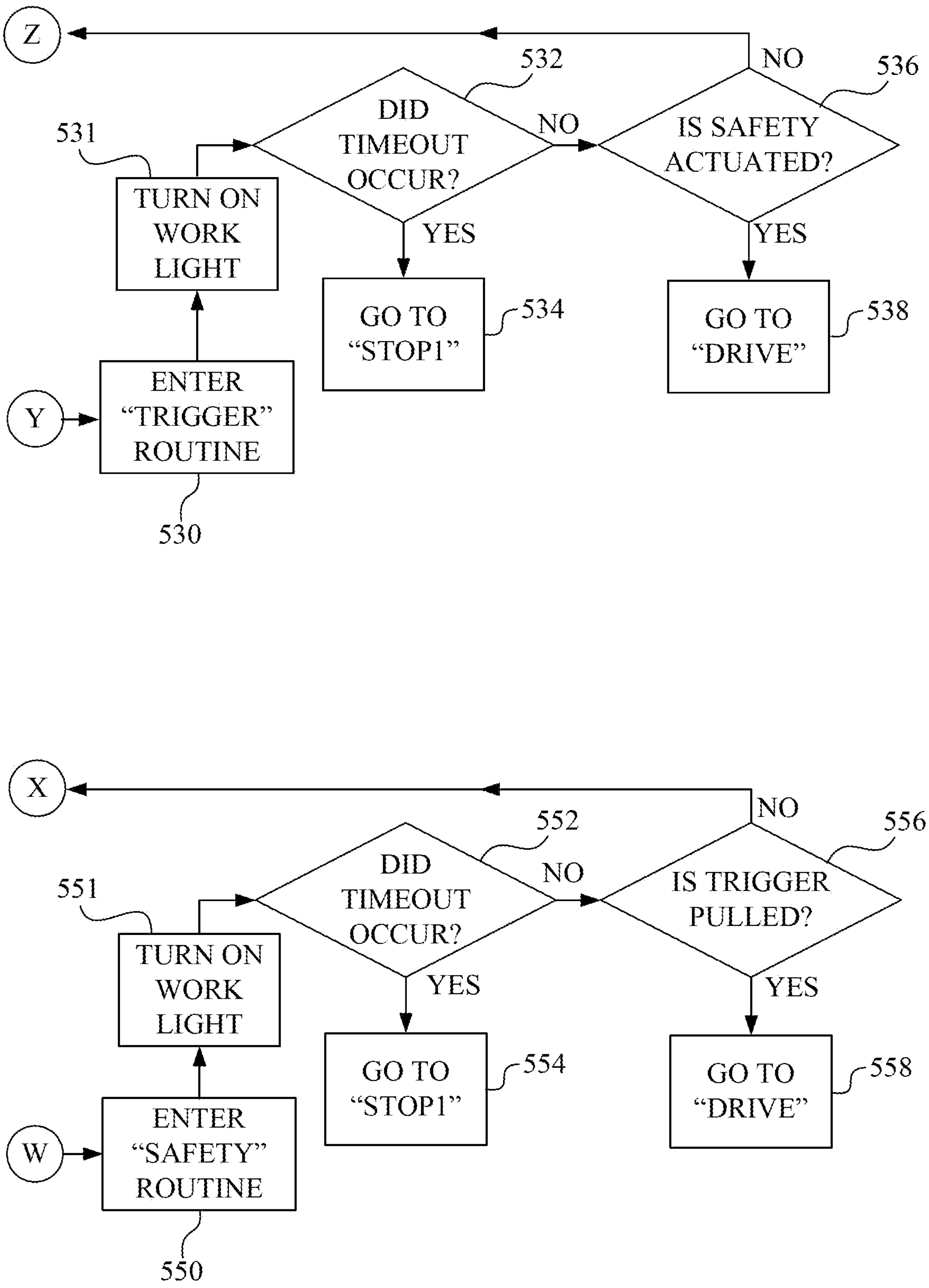
Figure 35C:
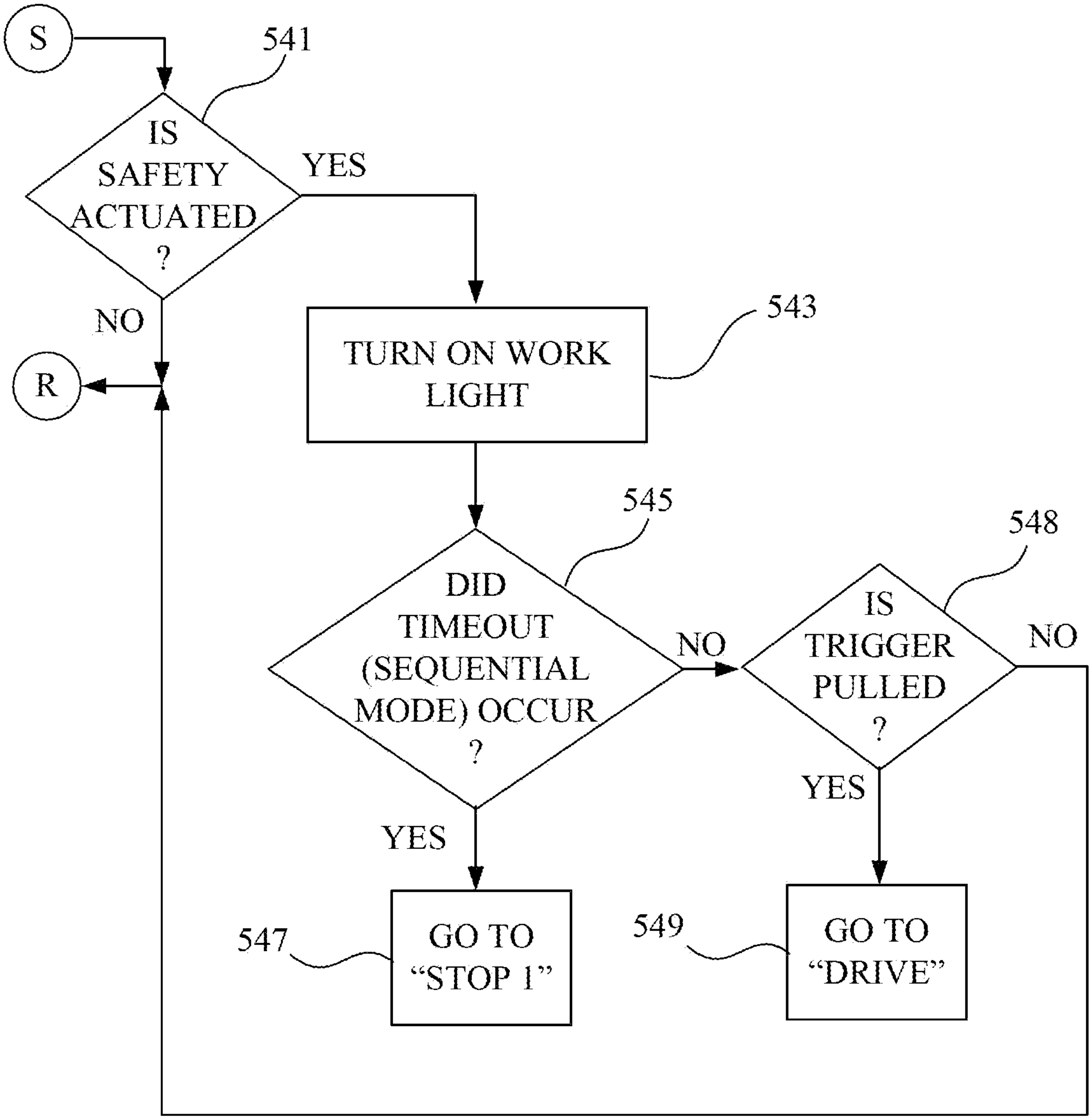
Figure 36A:
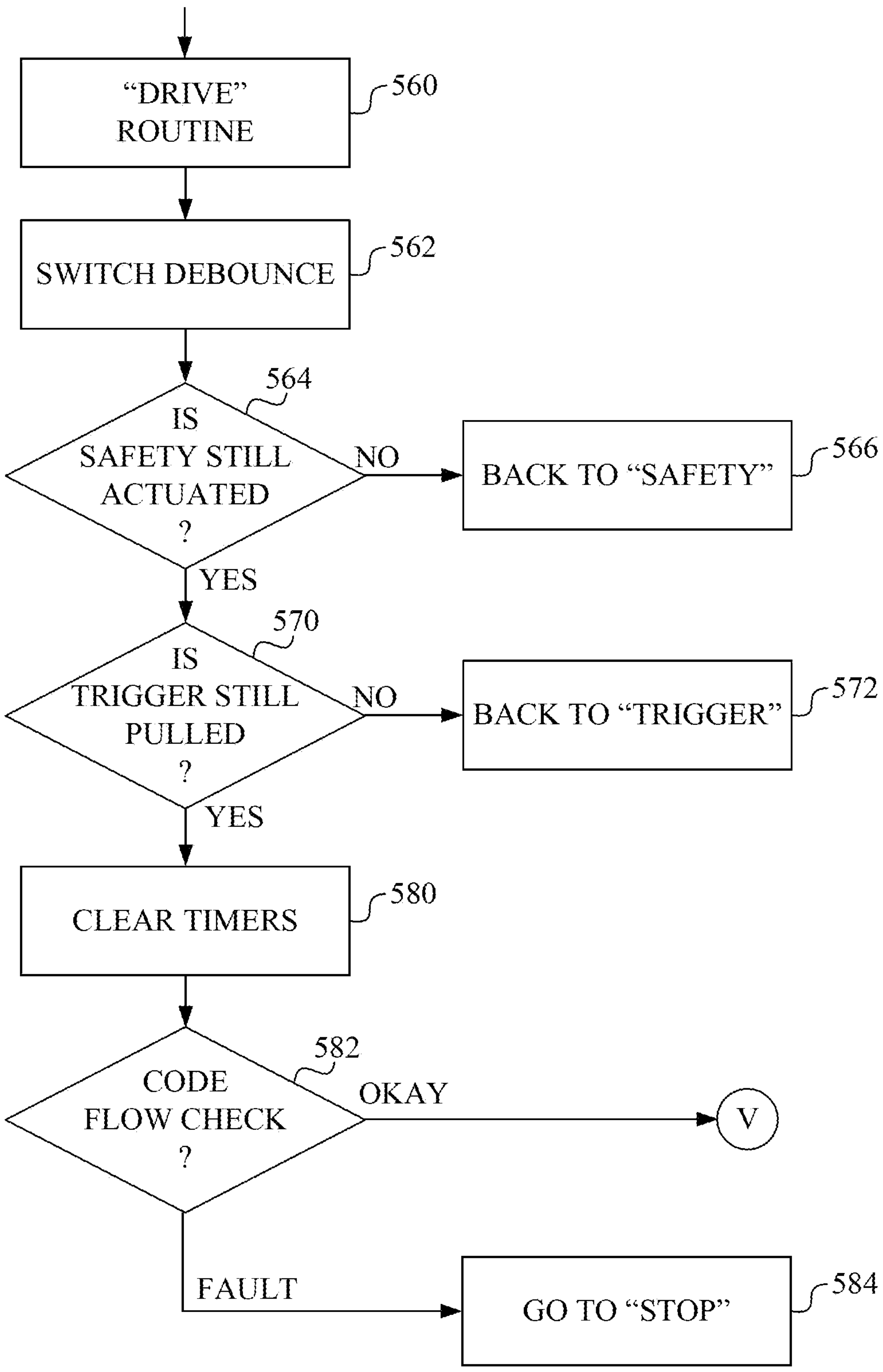
FIG. 36A, FIG. 36B, FIG. 36C, and FIG. 36D (as a group, sometimes referred to hereinbelow as a "FIG. 36") are a second portion of the flow chart starting at FIG. 35A.
Figure 36B:
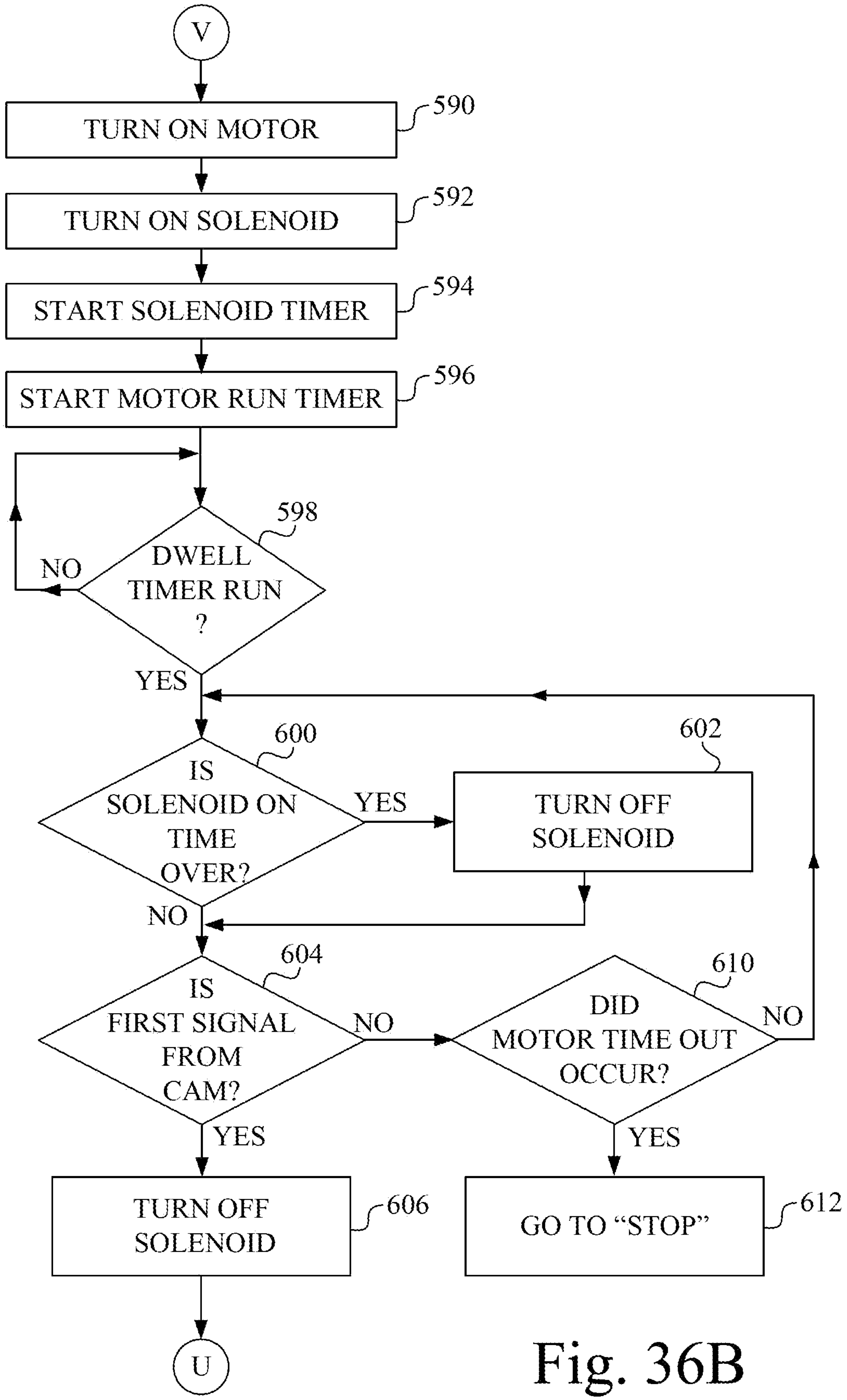
Figure 36C:
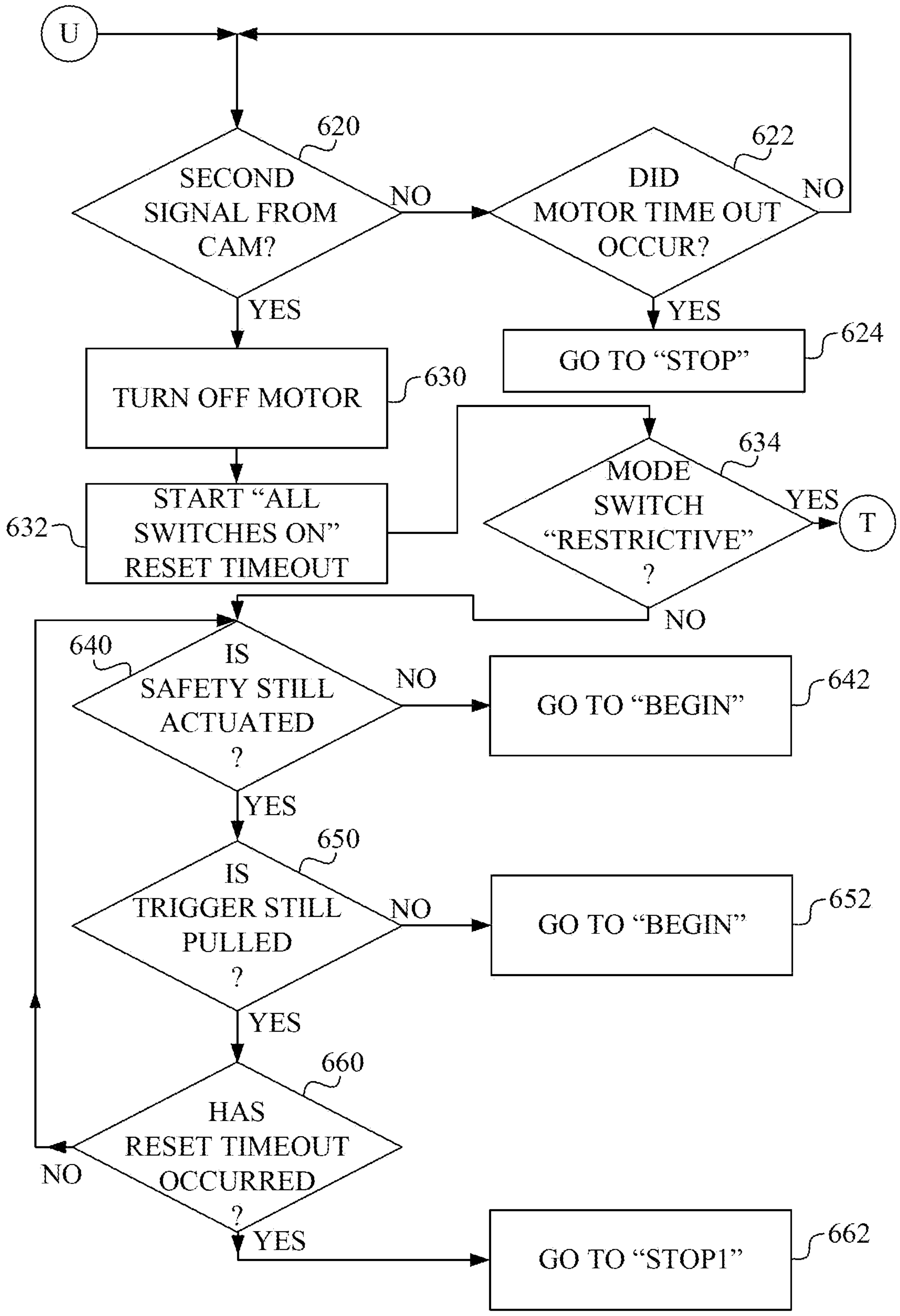
Figure 36D:
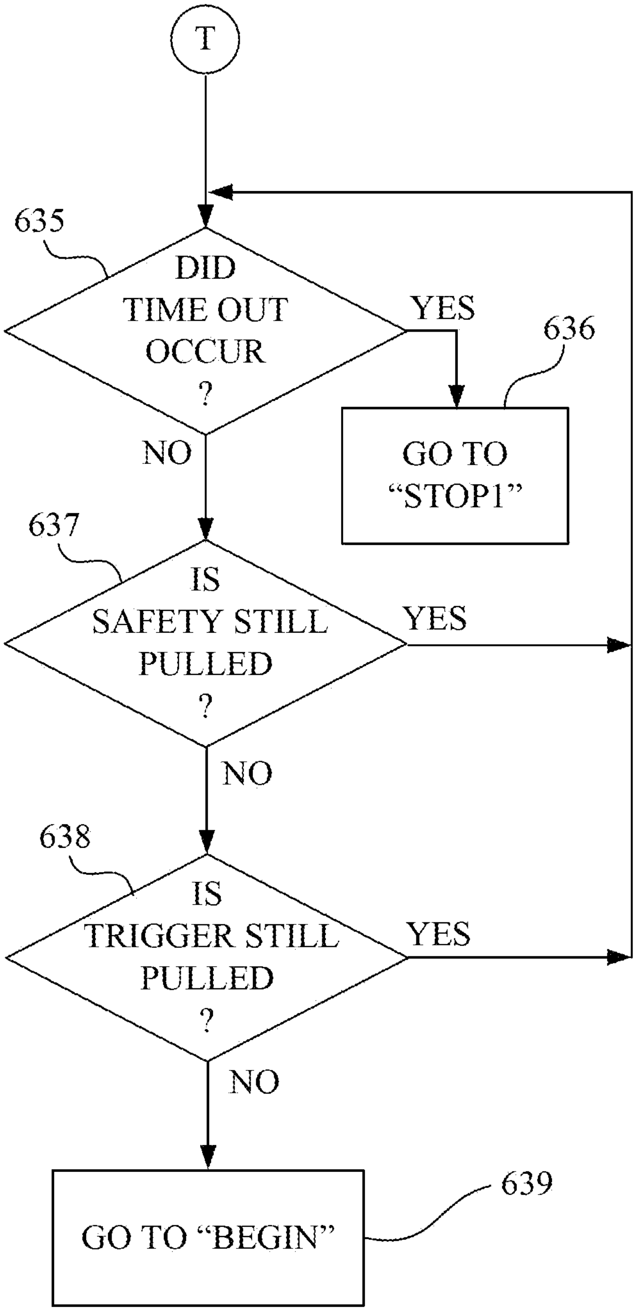

Referring now to FIG. 35, a logic flow chart is provided to show some of the important steps used by a system controller for the fastener driving tool 401 of the second illustrated embodiment for the present invention. Starting at an initializing step 500, a step 502 loads registers with predetermined values, and a step 504 loads special function registers with predetermined values. A step 506 now "checks" the RAM (Random Access Memory) to be sure it is functioning properly, and then a step 508 clears the RAM. A step 510 now loads unused RAM with predetermined values, based on the software coding for the system controller (typically in firmware or hard-coded).

A step 512 now determines the stability of the system electrical power supply. Then a step 514 causes an electrical output to blink one or more LEDs (light-emitting diodes) 443 on tool 510, so the user is made aware that the tool 510 has entered its "startup" mode of operation. Step 514 also initializes the interrupts that will be used for the controller, and the controller is now ready to enter into an operational routine.

A decision step 516 now determines if the safety has been actuated (i.e., whether the safety contact element 418 has been pressed against a solid object to an extent that actuates the sensor, e.g., limit switch 432). Step 516 also determines if the trigger 439 has been pulled. If the answer is YES for either of these questions, then the logic flow is directed to a step 520. If the answer is NO for both of these questions, then the logic flow is directed to another decision step 518.

Step 518 determines whether or not the LEDs 443 have flashed a predetermined maximum number of times. If the answer is YES, then the logic flow is directed to step 520. If the answer is NO, then the logic flow loops back to step 514.

At a step 520, the control logic enters a "BEGIN" routine. A decision step 540 now determines whether or not the current operating mode is the "RESTRICTIVE" mode. This determination involves inspecting the current state of the selector switch 441 which, as noted above, has three positions: "Off", "Mode A", or "Mode B". This three-position switch 441 is part of an exemplary arrangement of the second embodiment of the fastener driving tool 401, and in this description of the second tool embodiment, Mode A and Mode B are also referred to as a "Restrictive Mode," and a "Contact Actuation Mode."

If the current operating mode is not the RESTRICTIVE mode, then the logic flow is directed to a decision step 522. On the other hand, if the current mode is the RESTRICTIVE mode, then the logic flow is directed to a step 542 in which the tool enters a "restrictive fire" routine. The logic flow is directed now to a decision step 544 that determines if the trigger has been pulled. If the answer is NO, then the logic flow is directed to a decision step 541. On the other hand, if the trigger has been pulled, then the logic flow is directed to a step 546 that will further direct the logic flow to the "STOP 1" function (or routine) at a step 680 on FIG. 37. It should be noted that, in the "restrictive fire" mode of operation, the trigger cannot be pulled first; instead the nose of the fastener driving tool must be pushed against the solid surface before the trigger is pulled. In other words, this particular "firing mode" is a predetermined sequential mode of operation (and the term "restrictive fire mode" is also referred to herein as the "sequential mode").

If the logic flow at decision step 544 resulted in a NO result, the logic flow at decision step 541 determines whether or not the safety has been actuated. If the answer is NO, then the logic flow is directed back to the "restrictive fire" routine, just before step 544. However, if the answer is YES, the logic flow is directed to a step 543, in which the controller turns on the "work light," which is a small electric lamp (e.g., an LED) that illuminates the workpiece where the fastener is to be driven.

Figure 37:
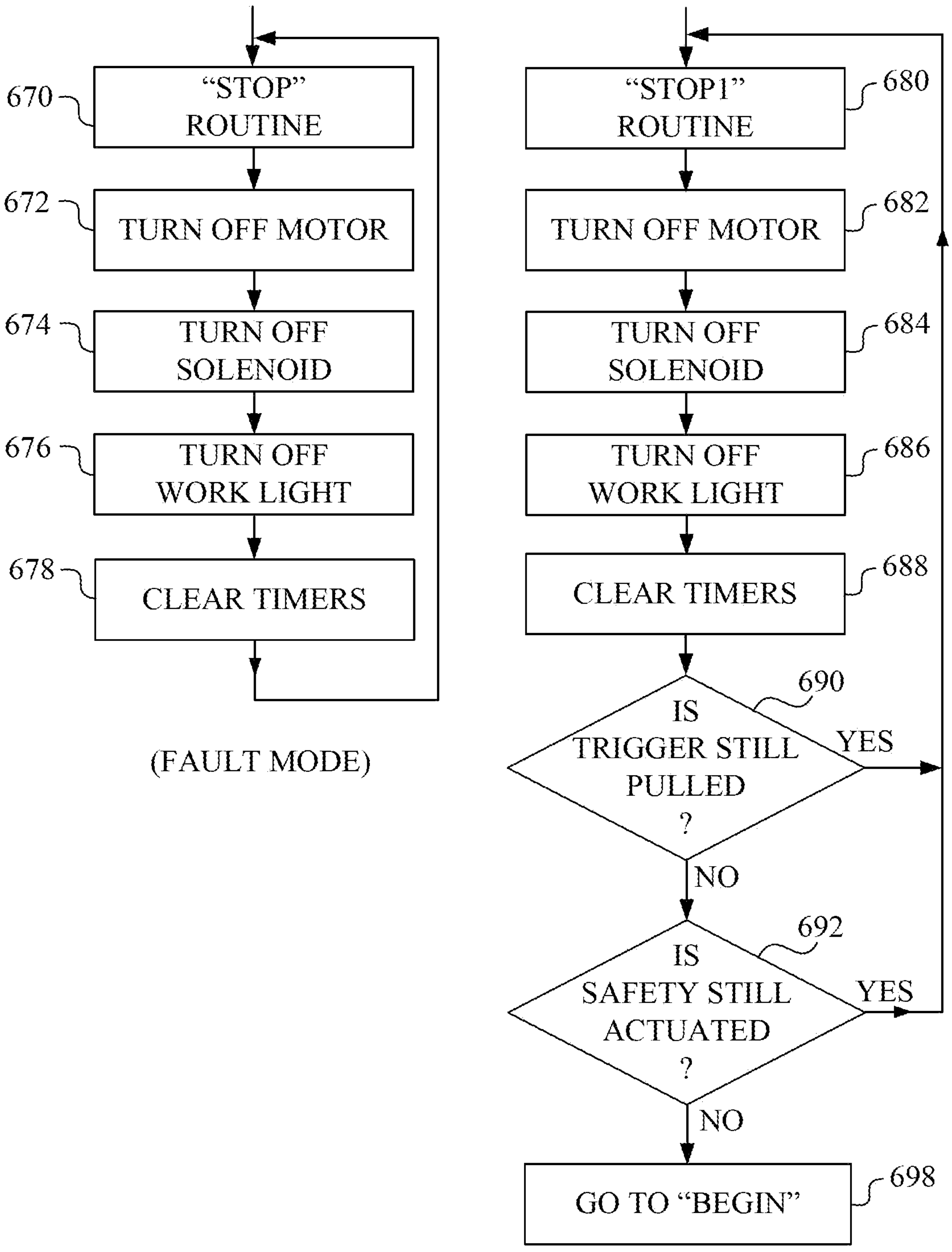
FIG. 37 is a third portion of the flow chart starting at FIG. 35A.

A decision step 545 now determines whether or not a "sequential mode timeout" has occurred, and if the answer is YES, the logic flow is directed to a step 547 that directs the logic flow to the "STOP 1" function at step 680 on FIG. 37. This temporarily stops the tool from operating. On the other hand, if the timeout has not yet occurred, the logic flow is directed to a decision step 548 that determines whether the trigger has been pulled. If the answer is NO, the logic flow is directed back to the decision step 544. On the other hand, if the answer is YES, the logic flow is directed to a step 549 that causes the tool to enter the "DRIVE" mode of operation at step 560 on FIG. 36.

If the answer at step 540 was NO, the decision step 522 now determines whether or not the trigger has been pulled. If the answer is YES, the logic flow is directed to a step 530 in which the logic flow enters a "TRIGGER" routine. A step 531 turns on a "work light," which is the same lamp/LED that was discussed above in reference to step 543.

A decision step 532 now determines whether or not a predetermined "trigger timeout" has occurred, and if the answer is YES, a step 534 directs the logic flow to a "STOP 1" routine, that is illustrated on FIG. 37 at a step 680. What this actually means is that a user pulled the trigger, but then did not actually use the tool against a solid surface, and rather than having the tool ready and primed to fire a fastener at any moment for an indefinite period of time, a predetermined amount of time will pass (i.e., the "timeout" interval), and once that has occurred, the system will be basically deactivated in the STOP 1 mode. This is not a permanent stoppage of the functioning of the tool, but is only temporary. Note that the "timeouts" are interrupt driven, in an exemplary embodiment of the present invention.

If the timeout has not occurred at decision step 532, then a decision step 536 determines if the safety has been actuated. If the answer is NO, then the logic flow is directed back to the BEGIN routine 520. On the other hand, if the safety has been actuated at step 536, then the logic flow is directed to a step 538 that will send the logic flow to a "DRIVE" routine, which is on FIG. 36 at a step 560. This will be discussed below in greater detail.

If, at step 522, the trigger was not yet pulled, then the logic flow is directed to the decision step 524. When the logic flow reaches decision step 524, the logic now determines whether or not the safety has been actuated. This step determines whether or not the safety contact element 418 has been pressed against a solid object to an extent that actuates the sensor (e.g., limit switch 432), which means that the tool is now pressed against a surface where the user intends to place a fastener. If the answer is NO, the logic flow is directed back to the mode switch query at decision step 540. However, if the answer is YES, the logic flow is directed to a step 550 in which the controller enters a "SAFETY" routine.

Once at the SAFETY routine at step 550, a step 551 turns on the "work light," which is the same lamp/LED that was discussed above in reference to step 531. A decision step 552 now determines whether or not a "safety timeout" has occurred, and if the answer is YES, the logic flow is directed to a step 554 that directs the logic flow to the "STOP 1" function at step 680 on FIG. 37. This temporarily stops the tool from operating. On the other hand, if the timeout has not yet occurred, the logic flow is directed to a decision step 556 that determines whether the trigger has been pulled. If the answer is NO, the logic flow is directed back to the decision step 524. On the other hand, if the answer is YES, the logic flow is directed to a step 558 that causes the tool to enter the "DRIVE" mode of operation at step 560 on FIG. 36.

As can be seen by reviewing the flow chart of FIG. 35, unless the tool 401 is in the restrictive fire mode (at step 542), the tool can be actuated with either one of the two important triggering steps occurring first: i.e., the trigger could be pulled before the safety is actuated, or vice versa.

Referring now to FIG. 36, the logic flow from FIG. 35 is directed to the "DRIVE" routine 560 from two other steps on FIG. 35: these are step 538 and step 558. Once at the DRIVE routine 560, a switch debounce step 562 is executed to determine whether or not one or both of the triggering elements was somehow only actuated intermittently. If so, the system designers have determined that the tool should not operate until it is more certain that the input switches have actually been actuated. To do this, the logic flow is directed to a decision step 564 to determine if the safety is still actuated. If the answer is NO, then the logic flow is directed to a step 566 that sends the logic flow back to the SAFETY routine at step 550. On the other hand, if the safety still is actuated at step 564, then the logic flow is directed to a decision step 570 to determine if the trigger is still being pulled. If the answer is NO, then the logic flow is directed to a step 572 that sends the logic flow back to the TRIGGER routine at step 530.

On the other hand, if decision steps 564 and 570 are both answered affirmatively, then a step 580 clears the operational timers, and the logic flow is then directed to a decision step 582 that determines if the software code flow is within certain parameters. This is a fault-checking mode of the software itself, and if the system does not determine a satisfactory result, then the logic flow is directed to a step 584 that sends the logic flow to a "STOP" routine at a step 670 on FIG. 37. This will ultimately turn the tool off and require a safety inspection of the tool, or at least have the tool reset. However, the tool does not need to be completely disabled, and after the safety inspection and tool reset procedure, the tool will be ready to use again without being sent to a service center. In an exemplary mode of the invention, the code flow check step determines if a correct number resides in a register or memory location; this number is the result of being incremented at predetermined executable steps of the software for the system controller.

If the software code flow check is within acceptable parameters at decision step 582, then the logic flow is directed to a step 590 that turns on the motor, and then a step 592 that turns on the solenoid. A step 594 now starts the solenoid timer and a step 596 now starts the motor run timer. As will be discussed below, these timers will be periodically checked by the system controller to make sure that certain things have occurred while the solenoid is on and while the motor is running Otherwise, after a predetermined maximum amount of time, the motor will be turned off and the solenoid will be turned off due to these timers actually timing out, which should not occur if the tool is being used in a normal operation, and if the tool is functioning normally.

In addition to the solenoid and motor run timers discussed above, a "dwell timer" is used to allow the tool to begin its normal operation before any further conditions are checked. This is accomplished by a decision step 598 on FIG. 36, which causes the logic flow to essentially wait a short amount of time before continuing to the next logic steps.

Once the dwell timer has finished at step 598, the logic flow is directed to a decision step 600 that determines if the solenoid "on time" has been exceeded. If the answer is YES, the logic flow is directed to a step 602 that turns off the solenoid. This situation does not necessarily mean the tool is being misused or is not functioning properly, and therefore the logic flow does not travel to a "stop step" from the step 602. Instead, the logic flow is directed to a decision step 604, discussed below.

If the solenoid on time has not been exceeded, then the logic flow also is directed to the decision step 604, which determines if the cam limit switch has received a first signal. This is the Hall effect sensor 430 that detects the presence or absence of the magnet 414 of the lifter. If the tool of the illustrated embodiment is being used, the lifter 410 will make two complete rotations when lifting the driver and piston from their bottom-most positions to their top-most positions. Therefore, the cam limit switch 430 will receive two different signals during this lift. Step 604 determines if the first signal has occurred. If not, then a decision step 610 determines whether the motor timeout has occurred. If the answer is NO, then the logic flow is directed back to decision step 600. On the other hand, if the motor run timer has indeed timed out, then the logic flow is directed to a step 612 that sends the logic flow to a "STOP" routine at step 670. This would likely indicate that there is a problem with the tool, or a problem with the way the user is attempting to operate the tool.

Referring back to decision step 604, if the first signal from the cam has occurred, then the logic flow is directed to a step 606 that turns off the solenoid. This will allow the latch 420 to engage the teeth 491 of the driver 490, in case there has been some type of jam, or other type of unusual operation while the driver and piston are being lifted. It also allows the latch 420 eventually to properly engage the bottom-most tooth 426 of the driver, which is the normal operation once the driver and piston have been raised to their top-most (or firing) position.

The logic flow is now directed to a decision step 620 that determines whether a second signal has been received from the cam limit switch. If the answer is NO, then the logic flow is directed to a decision step 622 that determines whether or not the motor run timer has timed out. If the answer is NO, then the logic flow is directed back to decision step 620. On the other hand, if the motor timer has timed out, the logic flow is directed to a step 624 that directs the logic flow to the "STOP" routine at 670, and indicates that there is some type of problem.

Once decision step 620 determines that the second signal from the cam has been received, then the logic flow is directed to a step 630 that turns off the motor, then to a step 632 that starts a "reset" timeout referred to as "all switches on." In this mode, it is either assumed that both the actuation (input) devices are still actuated, or at least that the controller needs to make an examination of those input devices to see what the proper status of the tool should be. Accordingly, the logic flow is first directed to a decision step 634, which determines whether the operator mode selector switch 441 is set to the Restrictive Mode, and if not, the logic flow is directed to a decision step 640 (discussed below).

If the answer is YES at step 634, the logic flow is directed to a decision step 635 that determines whether or not the reset timeout has occurred. If the answer is YES, then the logic flow is directed to a step 636, and the tool then enters the STOP1 routine at step 680 on FIG. 37. If the answer was NO at step 635, a decision step 637 determines whether or not the safety is still actuated (or "pulled"). If the answer is YES, then the logic flow is directed back to step 635; if the answer is NO, the logic flow is directed to a decision step 638 which determines whether or not the trigger is still being pulled. If the answer is YES, then the logic flow is directed back to step 635; if the answer is NO, the logic flow is directed to a step 639, and the tool then enters the BEGIN routine at step 520 on FIG. 35.

Back at step 634, if the current selector switch mode was not Restrictive, then the logic flow is directed to a decision step 640 that determines if the safety is still actuated. If the answer is NO, then the logic flow is directed to a step 642 that then sends the logic flow to the "BEGIN" routine at step 520 on FIG. 35. On the other hand if the safety is still actuated, the logic flow is directed to a decision step 650 that determines if the trigger is still pulled. If the answer is NO, then the logic flow is directed to a step 652 that also directs the logic flow to the "BEGIN" step at 520 on FIG. 35. Finally, if the trigger is still being pulled, then a decision step 660 determines whether or not a "reset" timeout has occurred, and if the answer is YES, the logic flow is directed to a step 662 that sends the logic flow to the "STOP 1" routine at step 680 on FIG. 37. If the reset timeout has not yet occurred at step 660, then the logic flow is directed back to the decision step 640 and the inspection of all of the switches will again be performed.

The logic flow is continued on FIG. 37, in which there are two different types of stop routines. The routine called "STOP" at step 670 will first turn off the motor at a step 672, turn off the solenoid at a step 674, and turn off the work light at a step 676. The STOP routine will then clear the timers at a step 678. The logic flow then becomes a "DO-Loop," and continues back to the STOP routine at step 670. This is a fault mode, and the tool must be inspected. As a minimum, it needs to be reset to terminate the DO-Loop processing of the software, which means that the battery must be disconnected from the tool. If the user has been using the tool properly, this may be an indication that there is some operational problem with the tool itself, or that a fastener perhaps has jammed somewhere in the tool and the operator did not notice that fact.

The other type of STOP routine is the "STOP 1" routine at step 680. Once that occurs, a step 682 turns off the motor, turn off the solenoid at a step 684, and turn off the work light at a step 686. The STOP 1 routine will then clear the timers at a step 688, and a decision step 690 determines whether or not the trigger is still pulled. If the answer is YES, then the logic flow is directed back to the STOP 1 routine at step 680. If the trigger is not pulled at step 690, the logic flow is then directed to a decision step 692 that determines if the safety is still actuated. If YES, the logic flow is directed back to the STOP 1 routine at step 680. However, if the safety is not actuated, the logic flow is directed to a step 698 that sends the logic flow to the "BEGIN" routine at step 520 on FIG. 35. At this point, the tool has been successfully used, and is ready for the next firing (driving) actuation.

In the above detailed description, there are a number of various timeouts that may occur during the operation of the tools built according to the present invention. As of the writing of this patent application, all of the timeout intervals are set for three (3) seconds. However, each of the timeouts is designed so as to be independently settable by the system designer, in case it becomes desirable to alter one or more of the individual timeout intervals (i.e., to a time value other than three seconds). Normally this would be done in software code (stored in the memory circuit), used to instruct the processing circuit in its operations, although hardware timers could instead be used.

It will also be understood that the logical operations described in relation to the flow charts of FIGS. 13-15 and FIGS. 35-37 can be implemented using sequential logic, such as by using microprocessor technology, or using a logic state machine, or perhaps by discrete logic; it even could be implemented using parallel processors. One preferred embodiment may use a microprocessor or microcontroller to execute software instructions that are stored in memory cells within an ASIC. In fact, the entire microprocessor or microcontroller, along with RAM and executable ROM, may be contained within a single ASIC, in one mode of the present invention. Of course, other types of circuitry could be used to implement these logical operations depicted in the drawings without departing from the principles of the present invention.

It will be further understood that the precise logical operations depicted in the flow charts of FIGS. 13-15 and FIGS. 35-37, and discussed above, could be somewhat modified to perform similar, although not exact, functions without departing from the principles of the present invention. The exact nature of some of the decision steps and other commands in these flow charts are directed toward specific future models of fastener driver tools (those involving Senco Products tools, for example) and certainly similar, but somewhat different, steps would be taken for use with other models or brands of fastener driving tools in many instances, with the overall inventive results being the same.

Other aspects of the present invention may have been present in earlier fastener driving tools sold by the Assignee, Senco Products, Inc. (or Senco Brands, Inc.), including information disclosed in previous U.S. patents and published applications. Examples of such publications are patent numbers U.S. Pat. Nos. 6,431,425; 5,927,585; 5,918,788; 5,732,870; 4,986,164; and 4,679,719.

All documents cited in the Background of the Invention and in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A portable fastener driving tool, comprising:
a housing;
a hollow cylinder that includes a movable piston;
a storage chamber proximal to and in fluidic communication with a first end of said hollow cylinder, wherein the storage chamber contains a pressurized gas that is always above atmospheric pressure, and wherein at least a portion of the pressurized gas in the storage chamber is colinear with and located above the first end of the hollow cylinder;
a movable driver that is in communication with said piston at least during a drive stroke;
a prime mover; and
an electrical connection at the housing to receive a removable source of electrical energy that is removably attached to said housing;
wherein:
said piston travels through said hollow cylinder between a higher pressure position and a lower pressure position; said piston has a rest position between operational cycles; and a location of said rest position is proximal to said higher pressure position; and
said pressurized gas is not vented to atmosphere after said drive stroke.

2. The tool of claim 1, further comprising:
said driver including at least one protrusion; and
a lifter including at least one extension, wherein said at least one extension of the lifter mechanically engages with said at least one protrusion of the driver during a return stroke.

3. The tool of claim 2, further comprising:
a guide body with a linear passageway for said driver,
wherein said lifter moves in a rotational motion and causes said driver to move in a linear motion along said linear passageway.

4. The tool of claim 2, wherein:
said cylinder and piston act as a gas spring during said drive stroke, and said lifter does not mechanically engage said driver during said drive stroke.

5. The tool of claim 1, further comprising:
a top cap located proximal to the first end of the hollow cylinder, wherein the piston is positioned inside the top cap when the piston is at or near the first end of the hollow cylinder.

6. The tool of claim 1, further comprising:
a top cover located proximal to the first end of the hollow cylinder, wherein the piston is positioned inside the top cover when the piston is at or near the first end of the hollow cylinder.

7. A portable fastener driving tool, comprising:
a housing;
a storage chamber,
a hollow cylinder that includes a movable piston, wherein:
(a) a first end of the hollow cylinder is always in fluidic communication with said storage chamber;
(b) said pressurized gas is not exhausted to atmosphere after a drive stroke; and
(c) the storage chamber is proximal to a first end of said hollow cylinder at least a portion of the pressurized gas in the storage chamber is colinear with and located above the first end of the hollow cylinder;
a movable driver that is in communication with said piston at least during the drive stroke;
a guide body with a linear passageway for said driver,
a handle portion, the handle portion having a rear end configured to receive an electrical connection of a removable battery pack positioned below the handle, wherein the battery pack provides energy for said motor when connected;
a motor that provides motive power to lift the driver;
a removable magazine configured to hold a plurality of fasteners, the magazine having a first end proximal to an exit end of said guide body and a second end that extends past said battery pack.

8. The tool of claim 7, wherein:
said driver includes at least one protrusion; and
further comprising: a lifter including at least one extension;
wherein, during a return stroke:
(a) said at least one extension of the lifter mechanically engages with said at least one protrusion of the driver; and
(b) said lifter moves in a rotational motion and causes said driver to move in a linear motion along said linear passageway.

9. The tool of claim 8, wherein:
said cylinder and piston act as a gas spring during said drive stroke, and said lifter does not engage said driver during said drive stroke.

10. The tool of claim 7, wherein:
a bottommost surface of said magazine is farther from a centerline of said exit end of the guide body than is a bottommost surface of said battery pack.

11. A portable fastener driving tool, comprising:
a housing;
a hollow cylinder that includes a movable piston;
a storage chamber proximal to and in fluidic communication with a first end of said hollow cylinder, wherein the storage chamber contains a pressurized gas that is always above atmospheric pressure, and wherein at least a portion of the pressurized gas in the storage chamber is colinear with and located above the first end of the hollow cylinder;
a movable driver that is in communication with said piston at least during a drive stroke;
a prime mover;
a guide body that is located proximal to said hollow cylinder, and having a linear passageway for said driver, and having an exit end that is located distal from said hollow cylinder;
a safety contact element proximal to said exit end, said safety contact element being disposed at a front portion of the tool, above said guide body; and
an electrical connection at the housing to receive a source of electrical energy that is removably attached to said housing;
wherein said piston travels through said hollow cylinder between a higher pressure position and a lower pressure position; said piston has a rest position between operational cycles;
and a location of said rest position is proximal to said higher pressure position; and
said pressurized gas is not vented to atmosphere after said drive stroke.

12. The tool of claim 11, further comprising:
an electric motor; and
wherein:
the removable source of electrical energy comprises a removable battery pack; and
the electric motor derives energy from said battery pack and provides motive power for said lifter.

13. The tool of claim 12, wherein:
said safety contact element prevents said drive stroke from occurring unless said safety contact element is pressed against a solid surface.

14. The tool of claim 12, wherein:
said driver includes at least one protrusion; and
the tool further comprises a lifter including at least one extension, wherein, during said return stroke:
(i) said at least one extension of the lifter mechanically engages with said at least one protrusion of the driver; and
(ii) said lifter moves in a rotational motion and causes said driver to move in a linear motion along said linear passageway.

15. The tool of claim 12, wherein:
said cylinder and piston act as a gas spring during said drive stroke, and said lifter does not engage said driver during said drive stroke.

16. The tool of claim 11, wherein:
said safety contact element is located directly above said guide body, and extends from said front portion of the tool toward a rear portion of the tool, extending along at least a surface of the guide body that is on the opposite side of the tool from where said battery pack is located.

17. The tool of claim 11, further comprising:
a top cap located proximal to the first end of the hollow cylinder, wherein the piston is positioned inside the top cap when the piston is at or near the first end of the hollow cylinder.

18. The tool of claim 11, further comprising:
a top cover located proximal to the first end of the hollow cylinder, wherein the piston is positioned inside the top cover when the piston is at or near the first end of the hollow cylinder.

19. A portable fastener driving tool, comprising:
a housing;
a hollow cylinder that includes a movable piston;
a storage chamber proximal to and in fluidic communication with a first end of said hollow cylinder, wherein the storage chamber contains a pressurized gas that is always above atmospheric pressure;
a movable driver that is in communication with said piston at least during a drive stroke;
a prime mover; and
an electrical connection at the housing to receive a source of electrical energy that is removably attachable to said housing;
wherein:
said piston travels through said hollow cylinder between a higher pressure position and a lower pressure position; said piston has a rest position between operational cycles; and a location of said rest position is proximal to said higher pressure position; and
said pressurized gas is not vented to atmosphere after said drive stroke.

20. The tool of claim 19, wherein:
said driver includes at least one protrusion; and
the tool further comprises a lifter including at least one extension, wherein said at least one extension of the lifter mechanically engages with said at least one protrusion of the driver during a return stroke.

21. The tool of claim 19, further comprising a guide body, wherein the guide body:
is located proximal to said hollow cylinder;
has a linear passageway for said driver; and
has an exit end that is located distal from said hollow cylinder.

22. The tool of claim 21, further comprising:
a safety contact element proximal to said exit end, said safety contact element being disposed at a front portion of the tool, above said guide body.

23. The tool of claim 21, wherein:
the housing comprises a handle portion having a rear end configured to receive an electrical connection of a removable battery pack positioned below the handle, wherein the battery pack provides energy for said motor when connected;
the tool further comprising:
a motor that provides motive power to lift the driver; and
a magazine to receive a plurality of fasteners, the magazine having a first end proximal to an exit end of said guide body and a second end that extends past said battery pack.

* * * * *